United States Patent
Thukral et al.

(10) Patent No.: US 11,069,014 B2
(45) Date of Patent: Jul. 20, 2021

(54) SYSTEM FOR LINKING FINANCIAL ASSET RECORDS WITH NETWORKED ASSETS

(71) Applicant: BDNA CORPORATION, Mountain View, CA (US)

(72) Inventors: Rohit Thukral, San Jose, CA (US); John Robert Thorpe, Sunnyvale, CA (US); Charles Larry Marker, II, Los Altos Hills, CA (US); Constantin Stelio Delivanis, Los Altos Hills, CA (US); Alistair D'Lougar Black, Los Gatos, CA (US); Chih-Po Wen, Redwood City, CA (US)

(73) Assignee: BDNA Corporation, Itasca, IL (US)

( * ) Notice: Subject to any disclaimer, the term of this patent is extended or adjusted under 35 U.S.C. 154(b) by 464 days.

(21) Appl. No.: 15/811,059

(22) Filed: Nov. 13, 2017

(65) Prior Publication Data
US 2018/0075560 A1 Mar. 15, 2018

Related U.S. Application Data

(62) Division of application No. 11/011,890, filed on Dec. 13, 2004, now abandoned.

(51) Int. Cl.
| | | |
|---|---|---|
| *G06Q 40/02* | (2012.01) | |
| *G06Q 50/26* | (2012.01) | |
| *G06Q 10/08* | (2012.01) | |

(52) U.S. Cl.
CPC .......... *G06Q 50/26* (2013.01); *G06Q 10/087* (2013.01); *G06Q 40/02* (2013.01)

(58) Field of Classification Search
CPC ....... G06Q 50/26; G06Q 10/087; G06Q 40/02
(Continued)

(56) References Cited

U.S. PATENT DOCUMENTS

| 5,805,819 A | 9/1998 | Chin et al. |
|---|---|---|
| 5,887,140 A | 3/1999 | Itsumi et al. |

(Continued)

FOREIGN PATENT DOCUMENTS

WO  WO 2018/191294  10/2018

OTHER PUBLICATIONS

Gupta, Sanchika, et al.; "A fingerprinting system calls appreach for intrusion detection in a cloud environment", Computational aspects of social networks (CASoN), 2012 fourth international conference on. IEEE, 2012. pp. 309-314 (Year: 2012).
(Continued)

*Primary Examiner* — Russell S Glass
(74) *Attorney, Agent, or Firm* — Knobbe, Martens, Olson & Bear, LLP

(57) ABSTRACT

A computer system to reconcile hard assets carried on the financial data reporting computer systems of a corporation or government entity with actual inventory assets discovered on the networks of said entity. Automatic discovery of inventory assets is performed by executing scripts specified in fingerprints of the types of machines the system can recognize. When a machine is found at a live P address, the fingerprint scripts determine the operating system type and extract data from the operating system regarding the attributes of the machine. Hard assets are then imported from the financial data reporting computer system, and automatic reconciliation rules are drafted by a user and run on the asset data to find inventory assets which match hard assets. Linking or pointer data is established to record each match. Then unmatched inventory and hard assets are displayed and manual matching occurs where in the user points to and selects inventory assets which match particular hard assets. Linking or pointer data is then generated for each manual match.

23 Claims, 36 Drawing Sheets

(58) Field of Classification Search
USPC .......................................................... 705/28
See application file for complete search history.

(56) References Cited

U.S. PATENT DOCUMENTS

| | | | |
|---|---|---|---|
| 6,189,032 B1 | 2/2001 | Susaki et al. | |
| 6,336,138 B1 | 1/2002 | Caswell et al. | |
| 6,347,336 B1 | 2/2002 | Song et al. | |
| 6,487,659 B1 | 11/2002 | Kigo et al. | |
| 6,574,662 B2 | 6/2003 | Sugiyama et al. | |
| 6,633,834 B2 | 10/2003 | Conrad et al. | |
| 6,636,973 B1 | 10/2003 | Novoa et al. | |
| 6,834,304 B1 | 12/2004 | Nisbet et al. | |
| 6,845,393 B1 | 1/2005 | Murphy et al. | |
| 6,871,230 B1 | 3/2005 | Fukunaga et al. | |
| 6,920,492 B2 | 7/2005 | Richard | |
| 6,988,134 B2 | 1/2006 | Thorpe et al. | |
| 7,089,306 B2 | 8/2006 | Thorpe | |
| 7,181,422 B1 * | 2/2007 | Philip | G06Q 40/00 705/35 |
| 7,493,388 B2 * | 2/2009 | Wen | G06F 9/50 705/28 |
| 7,720,950 B2 | 5/2010 | Joanovic et al. | |
| 8,051,298 B1 | 11/2011 | Burr et al. | |
| 8,874,621 B1 | 10/2014 | Goodwin et al. | |
| 8,924,302 B2 | 12/2014 | Bisbee et al. | |
| 2003/0014332 A1 | 1/2003 | Gramling | |
| 2003/0055749 A1 | 3/2003 | Carmody et al. | |
| 2003/0083947 A1 | 5/2003 | Hoffman et al. | |
| 2003/0101108 A1 | 5/2003 | Botham et al. | |
| 2003/0154199 A1 | 8/2003 | Thomas et al. | |
| 2003/0200294 A1 | 10/2003 | Thorpe et al. | |
| 2003/0200304 A1 | 10/2003 | Thorpe et al. | |
| 2004/0024662 A1 | 2/2004 | Gray et al. | |
| 2004/0064351 A1 * | 4/2004 | Mikurak | G06Q 10/087 705/22 |
| 2004/0122931 A1 | 6/2004 | Rowland et al. | |
| 2004/0215519 A1 * | 10/2004 | Shick | G06Q 10/087 705/15 |
| 2005/0033833 A1 | 2/2005 | Baldiga et al. | |
| 2005/0256973 A1 | 11/2005 | Holtz et al. | |
| 2006/0059262 A1 | 3/2006 | Adkinson et al. | |
| 2006/0129415 A1 | 6/2006 | Thukral | |
| 2006/0248187 A1 | 11/2006 | Thorpe | |
| 2007/0190609 A1 | 8/2007 | Black et al. | |
| 2008/0172583 A1 | 7/2008 | Mahajan et al. | |
| 2011/0218920 A1 | 9/2011 | Agrawal et al. | |
| 2018/0075561 A1 | 3/2018 | Thukral et al. | |
| 2018/0295494 A1 | 10/2018 | Meau | |

OTHER PUBLICATIONS

Kim, Gene H., and Eugene H. Spafford. "The design and implementation of tripwire: A file system integrity checker." Proceedings of the 2nd ACM Conference on Computer and Communications Security. ACM, 1994.pp. 18-29 (Year: 1994).
Mohammadzadeh, Hamid, Masood Mansoori, and Ian Welch. "Evaluation of fingerprinting techniques and a windows-based dynamic honeypot." Proceedings of the Eleventh Australasian Information Security Conference—vol. 138. Australian Computer Society, Inc., 2013.pp. 59-66 (Year: 2013).
U.S. Appl. No. 11/011,890 Final Office Action dated Sep. 6, 2018.
U.S. Appl. No. 15/706,526 Office Action dated Oct. 3, 2018.
U.S. Appl. No. 15/811,338, Rohit Thukral, System for Linking Financial Asset Records with Networked Assets, filed Nov. 13, 2017.
U.S. Appl. No. 15/706,464, Alexander Meau, Classification of Objects, filed Sep. 15, 2017.
U.S. Appl. No. 15/706,526, Alexander Meau, Unix File and Process Mapping, filed Sep. 15, 2017.
PCT/US18/26947, Classification of Objects, Apr. 10, 2018.
PCT Application No. PCT/US2018/026947 International Search Report and Written Opinion dated Jun. 28, 2018.
U.S. Appl. No. 11/011,890 Office Action dated Feb. 22, 2018.
U.S. Appl. No. 10/125,998 Office Action dated Jun. 29, 2005.
U.S. Appl. No. 11/416,654 Final Office Action dated Jan. 25, 2018.
U.S. Appl. No. 11/416,654 Office Action dated May 26, 2017.
U.S. Appl. No. 11/416,654 Final Office Action dated Apr. 20, 2017.
U.S. Appl. No. 11/416,654 Office Action dated Dec. 23, 2009.

* cited by examiner

ELEMENT / ATTRIBUTE DEF. & CATALOGUE

| | PARENT OR GRANDPARENT | CHILD OR GRANDCHILD |
|---|---|---|
| 1) | UNIX SERVER | UNIX FILE SYSTEM |
| 2) | UNIX SERVER | UNIX MAINTENANCE AGREEMENT |
| 3) | UNIX FILE SYSTEM | FILE TYPE 1 |
| 4) | UNIX SERVER | FILE TYPE 1 |

CONTAINMENT TABLE

FIG. 3

USER DEFINED CORRELATION TABLE

| SEMANTICS & FORMAT 48 | UNIX SERVER AVAILABLE BANDWIDTH INTEGER/4/MFLOPS | UNIX SERVER CPU SPEED INT./4/MHz | TERMINATION DATE STRING MM/DD/YYYY | ... | UNIX SERVER AVAILABLE DISK SPACE INT/5/MB | ... 28 |
|---|---|---|---|---|---|---|
| ACTUAL DATA INSTANCES ↓ | FIRST REFRESH ATTRIBUTE DATA TIME 1 | FIRST REFRESH ATTR. DATA | FIRST REFR. ATTR. DATA | | FIRST REFRESH ATTR. DATA TIME 1 | |
| | SECOND REFRESH ATTRIBUTE DATA TIME 2 | SECOND REFRESH ATTR. DATA | ⋮ | | " TIME 2 | |
| | ⋮ | ⋮ | | | ⋮ | |

COLLECTED DATA TABLE

FIG. 5

```
CPU COLLECTION
  ELEMENT TREE
    NAME, (ID, TYPEID) [ATTR. = VALUE]  ← 125
TYPES (1) ← 101
  OS (2) [TYPE, HOSTNAME]
  USER (3) [NAME, PASSWORD]
    SUPERUSER (4,3) [NAME, PASSWORD]
  FILE (5) [NAME, SIZE] ← 121
    UNIX (10,5) [NAME, SIZE, OWNER] ← 123
    WINDOWS (11,5) [NAME, SIZE, ARCHIVE]
  MEMORY (6) [SIZE, %USED]
  CPU (7) [CHIPID, TYPE, SPEED, %USED]
  PROCESS (8) [NAME]
  HTTP (9) [PORT, RESPONSE, TYPE, #PROCESSES]
FINGERPRINT (100) ← 103
  NETWORK (101) [NETWORK, MASK, BOTTOMIP, TOPIP] ← 107
  NIC (102) [ADDRESS, RESPONSE] ← 109
  SOLARIS 2.7 (103,2) [TYPE, HOSTNAME] ← 111
    HTTP (104,9) [PORT, RESPONSE, TYPE, #PROCESSES] ← 113
    SUPERUSER (105,4) [NAME, PASSWORD] ← 115
    MEMORY (106,6) [SIZE, %USED] ← 117
    CPU (107,7) [CHIPID, TYPE, SPEED, %USED] ← 119
    HTTP (108,5) [NAME] ← 131
DATA (1000) ← 105
  1.1.1.0 (1001,101) [NETWORK = 1.1.1.0, MASK = 255.255.255.0, BOTTOMIP = 1.1.1.2, TOPIP = 1.1.1.254] ← 127
  1.1.1.20 (1002,102) [ADDRESS = 1.1.1.20, RESPONSE = 25MS] ← 129
  SOLARIS 2.7 (1003,103) [TYPE = SOLARIS 2.7, HOSTNAME = SUN01] ← 131
    HTTP (1004,104) [PORT = 80, RESPONSE = <HTML..., TYPE = APACHE 1.3, #PROCESSES = 10] ← 133
    SUPERUSER (1005,105) [NAME = ROOT, PASSWORD = ######] ← 135
    MEMORY (1006,106) [SIZE = 512, %USED = 55] ← 137
    CPU (1007,107) [CHIPID = SPARC01, SPARC02, TYPE = SPARC, SPEED = 890,960, %USED = 75,45]
```

FIG. 7

| ELEMENTS ||||| 
|---|---|---|---|---|
| ID | NAME | TYPEID | COLLECTORID | REFRESH |
| 0 | ROOT | | | |
| 1 | TYPES | | | |
| 2 | OS | | | |
| 3 | USER | | | |
| 4 | SUPERUSER | 3 | | |
| 5 | FILE | | | |
| 6 | MEMORY | | | |
| 7 | CPU | | | |
| 8 | PROCESS | | | |
| 9 | HTTP | | | |
| 10 | UNIX | 5 | 206 | |
| 11 | WINDOWS | 5 | 207 | |
| 100 | FINGERPRINT | | | |
| 101 | NETWORK | | | |
| 102 | NIC | | | |
| 103 | SOLARIS 2.7 | 2 | | |
| 104 | HTTP | 9 | | |
| 105 | SUPERUSER | 4 | | |
| 106 | MEMORY | 6 | 216 | |
| 107 | CPU | 7 | 217 | |
| 108 | HTTPD | 8 | | |
| 1000 | DATA | | | |
| 1001 | 1.1.1.0 | 101 | | |
| 1002 | 1.1.1.20 | 102 | | |
| 1003 | SOLARIS 2.7 | 103 | | |
| 1004 | HTTP | 104 | | |
| 1005 | SUPERUSER | 105 | | |
| 1006 | MEMORY | 106 | | |
| 1007 | CPU | 107 | | |

FIG. 8

| ATTRIBUTES | | | |
|---|---|---|---|
| ID | NAME | COLNAME | DATATYPE |
| 49 | TYPE | A1 | STRING |
| 50 | HOSTNAME | A2 | STRING |
| 51 | NAME | A1 | STRING |
| 52 | PASSWORD | A2 | ENCRYPTED |
| 53 | NAME | A1 | STRING |
| 54 | SIZE | A2 | NUMBER |
| 55 | SIZE | A1 | NUMBER |
| 56 | %USED | A2 | NUMBER |
| 57 | CHIPID | A1 | STRING |
| 58 | TYPE | A2 | STRING |
| 59 | SPEED | A3 | NUMBER |
| 60 | %USED | A4 | NUMBER |
| 61 | NAME | A1 | STRING |
| 62 | PORT | A1 | NUMBER |
| 63 | RESPONSE | A2 | STRING |
| 64 | TYPE | A3 | STRING |
| 65 | #PROCESSES | A4 | NUMBER |
| 66 | OWNER | A3 | STRING |
| 67 | ARCHIVE | A4 | STRING |
| 68 | NETWORK | A1 | STRING |
| 69 | MASK | A2 | STRING |
| 70 | BOTTOMIP | A3 | STRING |
| 71 | TOPIP | A4 | STRING |
| 72 | ADDRESS | A1 | STRING |
| 73 | RESPONSE | A2 | STRING |

FIG. 9

MAPPING TABLE

| ELEMENT ATTRIBUTES | | | |
|---|---|---|---|
| ELEMENTID | ATTRID | COLLECTORID | REFRESH |
| 2 | 49 | | |
| 2 | 50 | 214 | |
| 3 | 51 | | |
| 3 | 52 | | |
| 4 | 51 | 201 | |
| 4 | 52 | 202 | |
| 5 | 53 | | |
| 5 | 54 | | |
| 6 | 55 | | |
| 6 | 56 | | |
| 7 | 57 | | |
| 7 | 58 | | |
| 7 | 59 | | |
| 7 | 60 | | |
| 8 | 61 | | |
| 9 | 62 | 203 | |
| 9 | 63 | 204 | |
| 9 | 64 | | |
| 9 | 65 | 205 | |
| 10 | 53 | | |
| 10 | 54 | | |
| 10 | 66 | | |
| 11 | 53 | | |
| 11 | 54 | | |
| 11 | 67 | | |
| 101 | 68 | 208 | |
| 101 | 69 | 209 | |
| 101 | 70 | 210 | |
| 101 | 71 | 211 | |
| 102 | 72 | 212 | |
| 102 | 73 | 213 | |
| 103 | 49 | 200 | |
| 103 | 50 | | |
| 104 | 62 | | |
| 104 | 63 | | |
| 104 | 64 | 215 | |
| 104 | 65 | | |
| 105 | 51 | | |
| 105 | 52 | | |
| 106 | 55 | | |
| 106 | 56 | | |
| 107 | 57 | | |

FIG. 10A

| | | | |
|---|---|---|---|
| 107 | 58 | | |
| 107 | 59 | | |
| 107 | 60 | | |

FIG. 10B

| CHILDREN | |
|---|---|
| ELEMENTID | CHILDELEMENTID |
| 0 | 1 |
| 1 | 2 |
| 1 | 3 |
| 1 | 4 |
| 1 | 5 |
| 1 | 6 |
| 1 | 7 |
| 1 | 8 |
| 1 | 9 |
| 5 | 10 |
| 5 | 11 |
| 0 | 100 |
| 100 | 101 |
| 101 | 102 |
| 102 | 103 |
| 103 | 104 |
| 103 | 105 |
| 103 | 106 |
| 103 | 107 |
| 103 | 108 |
| 0 | 1000 |
| 1000 | 1001 |
| 1001 | 1002 |
| 1002 | 1003 |
| 1003 | 1004 |
| 1003 | 1005 |
| 1003 | 1006 |
| 1003 | 1007 |

FIG. 11

| FINGERPRINTS | | | | |
|---|---|---|---|---|
| ELEMENTID | SEQ | RULE | TRUEWEIGHT | FALSEWEIGHT |
| 101 | 1 | NET.ISVALIDNET($THIS.NETWORK)=TRUE | 100 | 0 |
| 101 | 2 | NET.ISVALIDMASK($THIS.MASK)=TRUE | 100 | 0 |
| 102 | 1 | $RESPONSE != "NO REPLY" | 100 | 0 |
| 103 | 1 | $OS.TYPE = "SUN SOLARIS 2.7" | 100 | 0 |
| 104 | 1 | HTTP.RESPONSE != "" | 100 | 0 |

FIG. 12

| COLLECTORS | | | |
|---|---|---|---|
| ID | SEQ | METHOD | STATEMENT |
| 200 | 1 | QUESO | $ADDRESS 22 |
| 201 | 1 | DEFAULT | ROOT |
| 202 | 1 | EMAIL | TO: ROOT@$ADDRESS |
| 202 | 2 | EMAIL | SUBJECT: ROOT USER PASSWORD |
| 203 | 1 | DEFAULT | 80 |
| 204 | 1 | HTTP | PORT $THIS.PORT |
| 204 | 2 | HTTP | GET / HTTP1.1 |
| 205 | 1 | EXPR | $HTTPD.LENGTH |
| 206 | 1 | SSH | lS -l $THIS.NAME | AWK... |
| 207 | 1 | SMB | DIR $THIS.NAME... |
| 208 | 1 | CONFIG | TEXTBOX |
| 209 | 1 | CONFIG | TEXTBOX(255,255,255,0) |
| 210 | 1 | EXPR | NET.GETBOTTOMIP($THIS.NETWORK, $THIS.MASK) |
| 211 | 1 | EXPR | NET.GETTOPIP($THIS.NETWORK, $THIS.MASK) |
| 212 | 1 | DISCOVERY | |
| 213 | 1 | PING | PING $THIS.ADDRESS | AWK... |
| 214 | 1 | DNS | LOOKUP $ADDRESS |
| 215 | 1 | SSH | PS -AEF | AWK HTTPD... |
| 216 | 1 | SSH | VMSTAT | GREP... |
| 217 | 1 | SSH | SAR... |

FIG. 13

| DATA | | | | | |
|---|---|---|---|---|---|
| ELEMENTID | TIMESTAMP | ATTR1 | ATTR2 | ATTR3 | ATTR4 |
| 1001 | 40 | 1.1.1.0 | 255.255.255.0 | | |
| 1001 | 50 | 1.1.1.0 | 255.255.255.0 | 1.1.1.2 | 1.1.1.254 |
| 1002 | 50 | 1.1.1.20 | 25MS | | |
| 1003 | 60 | SOLARIS 2.7 | SUN01 | | |
| 1004 | 80 | 80 | <HTML... | | |
| 1005 | 90 | ROOT | ####### | | |
| 1006 | 100 | 512 | 55 | | |
| 1007 | 110 | SPARC01 | SPARC | 880 | 75 |
| 1007 | 110 | SPARC02 | SPARC | 950 | 45 |
| 1004 | 100 | 80 | <HTML... | APACHE 1.3 | 10 |

| | Date Acq | Cat. | Net Book | Total Cost | Serial # | Description | Vendor | Dept |
|---|---|---|---|---|---|---|---|---|
| 1 | 2/20/48 | AB001 | $189,953.80 | 2042038.634 | 808ef352 | Sun Microsystems sun4u Sun Ultra 30 UPA/PCI (UltraSPARC-II 296MHz) | Sun Micro | 125 |
| 2 | 2/21/48 | AB038 | $104,072.66 | 11868993.562 | 808d1e08 | Sun Microsystems sun4u Sun Ultra 2 UPA/PCI (2 x UltraSPARC-II 296 Sun Micro) | Sun Micro | 125 |
| 3 | 5/30/48 | AB038 | $99,593.60 | 1133757.541 | 2.004E+09 | 9000/785 | HP | 125 |
| 4 | 2/26/48 | AB034 | $27,703.34 | 1018768.039 | 8.099E+82 | Sun Microsystems sun4u Sun Ultra 5/10 UPA/PCI (UltraSPARC-IIi 300MH) | Sun Micro | 125 |
| 5 | 5/29/48 | AB034 | $55,857.90 | 1003150.66 | 832c9232 | Sun Microsystems sun4u Sun Ultra Fire 480R | Sun Micro | 125 |
| 6 | 2/25/48 | AB025 | $54,122.00 | 915776.5139 | 80d1afb3 | Sun Microsystems sun4u Sun Enterprise 420R (4 X UltraSPARC-II 450M) | Sun Micro | 125 |
| 7 | 6/6/48 | AB009 | $78,580.81 | 892802.1825 | 809ae8d7 | Sun Microsystems sun4u Sun (UltraSPARC-II 360MHz) | Sun Micro | 125 |
| 8 | 6/4/48 | AB009 | $78,580.81 | 892802.1825 | 80a16acb | Sun Microsystems sun4u Sun Ultra 60 UPA/PCI (UltraSPARC-II 360MHz) | Sun Micro | 125 |
| 9 | 9/3/48 | AB034 | $24,367.45 | 801337.4678 | 831946c9 | Sun Microsystems sun4u Sun Fire 880 | Sun Micro | 125 |
| 10 | 2/23/48 | AB038 | $49,171.77 | 790553.824 | 809add0a | Sun Microsystems sun4u Sun 5-slot Sun Enterprise E3500 | Sun Micro | 125 |
| 11 | 2/27/48 | AB008 | $96,292.12 | 1371518.062 | 809a3839 | Sun Microsystems sun4u Sun Enterprise 450 (2 X UltraSPARC-II 296MHz) | Sun Micro | 125 |
| 12 | 6/5/48 | AB038 | $56,414.17 | 597158.8749 | 7237ec16 | SUNW,SPARCstation-20 | Sun Micro | 125 |
| 13 | 2/17/48 | AB009 | $17,995.13 | 580705.356 | 80b360b0 | Sun Microsystems sun4u Sun Ultra 5/10 UPA/PCI (UltraSPARC-IIi 440MH) | Sun Micro | 125 |
| 14 | 2/18/48 | AB036 | $49,123.72 | 534995.916 | 80d1bf71 | Sun Microsystem sun4u SPARCengine(tm)Ultra(tm) Axi (UltraSPARC-I) | Sun Micro | 125 |
| 15 | 11/8/47 | AB036 | $49,123.72 | 534995.916 | 831fa875 | Sun Microsystems sun4u Sun Fire V100 (UltraSPARC-Ie 500MHZ) | Sun Micro | 125 |
| 16 | 5/26/48 | AB034 | $29,193.87 | 509708.1707 | | Sun-Fire-480R | Sun Micro | 708 |
| 17 | 2/27/48 | PR001 | $48,069.89 | 506874.9623 | 832ceaf0 | Sun Microsystems sun4u Sun Fire 480R | Sun Micro | 708 |
| 18 | 6/5/48 | PE075 | $26,663.97 | 489372.3942 | 80dabb38 | Sun Microsystems sun4u SPARCengine(tm)Ultra(tm) Axi (Ultra SPARC-I) | Sun Micro | 708 |
| 19 | 5/26/48 | AB018 | $12,777.03 | 444510.3957 | 8093263e | Sun Microsystems sun4u Sun Ultra 60 UPA/PCI (Ultra SPARC-II 296MHz) | Sun Micro | 708 |
| 20 | 2/23/48 | AB034 | $13,337.60 | 420829.9863 | 8089c5ca | Sun Microsystems sun4u Sun Ultra 2 UPA/SBus (UltraSPARC-II 296MHz) | Sun Micro | 708 |
| 21 | 2/26/48 | AB018 | $16,141.63 | 397331.0614 | 80b68da8 | Sun Microsystems sun4u Sun Ultra 5/10 UPA/PCI (UltraSPARC-II 333MH) | Sun Micro | 708 |
| 22 | 9/3/48 | AB039 | $28,472.18 | 393109.7044 | 809ba9d3 | Sun Microsystems sun4u 5-slot Sun Enterprise E3500 | Sun Micro | 708 |
| 23 | 6/6/48 | AB034 | $23,656.59 | 337707.5952 | 808d2224 | Sun Microsystems sun4u Sun Ultra 2 UPA/SBus (2X UltraSPARC-II 296) | Sun Micro | 708 |
| 24 | 9/6/48 | AB034 | $12,013.15 | 311335.4661 | 4.068E+09 | ia64 | HP | 708 |
| 25 | 2/22/48 | AB034 | $11,112.25 | 311275.5853 | 2.01E-09 | 9000/785 | HP | 708 |
| 26 | 11/18/47 | PR001 | $32,265.10 | 307080.629 | 10148469 | 9000/800 | HP | 708 |
| 27 | 6/6/48 | AB034 | $6,290.42 | 292425.5911 | | Ultra-60 | Sun Micro | 708 |
| 28 | 5/27/48 | AB025 | $27,377.92 | 292119.5584 | 000000a4C IBM | 7025-F50 | IBM | 708 |
| 29 | 5/27/48 | AB025 | $27,377.92 | 292119.5584 | 80b4ec0d | Sun Microsystems sun4u Sun Ultra 60 UPA/PCI (2X UltraSPARC-II 450MH) | Sun Micro | 708 |
| 30 | 9/5/48 | AB018 | $18,908.48 | 291587.1587 | 8960559 | 9000/770 | HP | 708 |
| 31 | 5/26/48 | AB018 | $18,908.48 | 291587.1587 | | Ultra-60 | Sun Micro | 708 |
| 32 | 9/5/48 | AB038 | $29,114.14 | 284024.9278 | | Ultra-5-10 | Sun Micro | 708 |

| | | | | | Assets are Reconciled via matching rules |
|---|---|---|---|---|---|

BDNA
Report Data Format Insert Submit Help

| Inventory | Reconciled | Unmatched Fixed Assets | | Reconciled Fixed Assets | Unmatched Inventory | | | |
|---|---|---|---|---|---|---|---|---|
| Reconciliation | 258 | Fixed Assets: Peoplesoft FA Q204 260 | | 262 | | | | |
| | | Description | Vendor | Dept. | Name | | | Inventory Model |
| Manage | 1 | Sun Microsystems sun4u Sun Ultra 30 UPA/PCI (UltraSPARC-II 296MHz) | Sun Micro | 125 | 173.5.100.4 | | | Sun Microsystems sun4u Sun Ultra 30 UPA/PCI (UltraSPARC-II 296MHz) |
| Data Sources | 2 | Sun Microsystems sun4u Sun Ultra 2 UPA/PCI (2 x UltraSPARC-II 296Sun Micro) | Sun Micro | 125 | admin0.corp.com | | | Sun Microsystems sun4u Sun Ultra 2 UPA/PCI (2 x UltraSPARC-II 296Sun Micro) |
| Data Loading | 3 | 9000/785 | HP | 125 | 11088507.corp.com | | | 9000/785 |
| Matching Rules | 4 | Sun Microsystems sun4u Sun Ultra 5/10 UPA/PCI (UltraSPARC-IIi 300MH) | Sun Micro | 125 | peterparc.corp.com | | | Sun Microsystems sun4u Sun Ultra 5/10 UPA/PCI (UltraSPARC-IIi 300MH) |
| Reconcile | 5 | Sun Microsystems sun4u Sun Ultra Fire 480R | Sun Micro | 125 | | | | Sun Microsystems sun4u Sun Ultra Fire 480R |
| Fixed Assets | 6 | Sun Microsystems sun4u Sun Enterprise 420R (4 X UltraSPARC-II 450M) | Sun Micro | 125 | tc13.corp.com | | | Sun Microsystems sun4u Sun Enterprise 420R (4 X UltraSPARC-II 450M) |
| Asset Management | 7 | Sun Microsystems sun4u Sun (UltraSPARC-II 360MHz) | Sun Micro | 125 | juice.corp.com | | | Sun Microsystems sun4u Sun (UltraSPARC-II 360MHz) |
| Analyze | 8 | Sun Microsystems sun4u Sun Ultra 60 UPA/PCI (UltraSPARC-II 360MHz) | Sun Micro | 125 | reddog.corp.com | | | Sun Microsystems sun4u Sun Ultra 60 UPA/PCI (UltraSPARC-II 360MHz) |
| Fixed Assets | 9 | Sun Microsystems sun4u Sun4u Sun Fire 880 | Sun Micro | 125 | clearcase12.corp.com | | | Sun Microsystems sun4u Sun4u Sun Fire 880 |
| Asset Management | 10 | Sun Microsystems sun4u 5-slot Sun Enterprise E3500 | Sun Micro | 125 | logm2.corp.com | | | Sun Microsystems sun4u 5-slot Sun Enterprise E3500 |
| Standards | 11 | Sun Microsystems sun4u Sun Enterprise 450 (2 X UltraSPARC-II 296MH) | Sun Micro | 125 | cron1.corp.com | | | Sun Microsystems sun4u Sun Enterprise 450 (2 X UltraSPARC-II 296MH) |
| Support | 12 | SUNW,SPARCstation-20 | Sun Micro | 125 | olympic.corp.com | | | SUNW,SPARCstation-20 |
| | 13 | Sun Microsystems sun4u Sun Ultra 5/10 UPA/PCI (UltraSPARC-IIi 440MH) | Sun Micro | 125 | nancho.corp.com | | | Sun Microsystems sun4u Sun Ultra 5/10 UPA/PCI (UltraSPARC-IIi 440MH) |
| | 14 | Sun Microsystem sun4u SPARCengine(tm)Ultra(tm) Axi (UltraSPARC-) | Sun Micro | 125 | foobar.corp.com | | | Sun Microsystem sun4u SPARCengine(tm)Ultra(tm) Axi (UltraSPARC-) |
| | 15 | Sun Microsystem sun4u Sun Fire V100 (UltraSPARC-Ie 500MHZ) | Sun Micro | 125 | cdc-tx32-vs14.crop.com | | | Sun Microsystem sun4u Sun Fire V100 (UltraSPARC-Ie 500MHz) |
| | 16 | Sun-Fire-480R | Sun Micro | 125 | tx32nbu1.crop.com | | | Sun-Fire-480R |
| | 17 | | | | | | | |
| | 18 | | | | | Assets reconciled via rule-based matching | | |
| | 19 | | | | | | | |
| | ... | | | | | | | |
| | 32 | | | | | | | |

| | | | Un-reconciled assets can be matched manually | | |
|---|---|---|---|---|---|

BDNA
Report  Data  Format  Insert  Submit  Help

| Inventory | Reconciled | Unmatched Fixed Assets | Look for | Reconciled Fixed Assets | |
|---|---|---|---|---|---|
| Reconciliation | | | | Unmatched Inventory | |

Fixed Assets: Computing Equipment over $5,000 — 276

| # | Description | Vendor | Dept |
|---|---|---|---|
| 1 | Sun Microsystems sun4u SunFire 480R | Sun Micro | 125 |
| 2 | Sun Microsystems sun4u SPARCengine™ Ultra™ Axi (UltraSPARC-III 44 | Sun Micro | 708 |
| 3 | Sun Microsystems sun4u Sun Ultra 20 UPA/SBus (UltraSPARC-II 296 MH) | Sun Micro | 708 |
| 4 | Sun Microsystems sun4u Sun Ultra 60 UPA/PCI (UltraSPARC-II 296 MHz) | Sun Micro | 708 |
| 5 | Sun Microsystems sun4u SunFire 420R | Sun Micro | 125 |
| 6 | Sun Microsystems sun4u SPARCengine™ Ultra™ Axis (UltraSPARC-III 4 | Sun Micro | 125 |
| 7 | Sun Microsystems sun4u Sun Ultra 22 UPA/SBus (UltraSPARC-II 296 MH | Sun Micro | 708 |
| 8 | Sun Microsystems sun4u Sun Ultra 60 UPA/PCI (UltraSPARC-II 296 MHz) | Sun Micro | 309 |
| 9 | Sun Microsystems sun4u Sun Ultra 60 UPA/PCI (UltraSPARC-II 296 MHz) | Sun Micro | 125 |
| 10 | Sun Microsystems sun4u SPARCengine™ Ultra™ Axis (UltraSPARC-III 44 | Sun Micro | 708 |
| 11 | Sun Microsystems sun4u Sun Ultra30 UPA/SBus (UltraSPARC-II 296 MH | Sun Micro | 309 |
| 12 | Sun Microsystems sun4u Sun Ultra30 UPA/PCI (UltraSPARC-II 296 MHz) | Sun Micro | 708 |

| Name | Inventory | Model |
|---|---|---|
| | SunFire 480R | |
| login.bdna.com | Sun Microsystems sun4u SunFire 480R | |
| helpdesk.bdna.com | Sun Microsystems sun4u SunFire 480R | |
| helpdesk.bdna.com | Sun Microsystems sun4u SunFire 480R — 278 | |

Manage
  Data Sources
  Data Loading
  Matching Rules
Reconcile
  Fixed Assets
  Asset Management
Analyze
  Fixed Assets
  Asset Management
Standards
Support

SYSTEM FOR LINKING FINANCIAL ASSET RECORDS WITH NETWORKED ASSETS

CROSS-REFERENCE TO RELATED APPLICATIONS

This application is a divisional of U.S. patent application Ser. No. 11/011,890, filed Dec. 13, 2004, the content of which is incorporated herein by reference.

BACKGROUND OF THE INVENTION

Corporations usually keep two different sets of records to track their capital assets and leased assets. This does not happen intentionally. It is just a historical accident based upon the way software for use in business developed. Assets are tracked for financial reporting purposes in financial systems, such as ERP (Enterprise Resource Planning) Fixed Asset modules such as SAP, Oracle and Peoplesoft. ERP systems are used to track purchasing, accounts payable, orders, capitalized assets, etc. One of the modules of ERP systems is to track fixed assets. ERP systems are used for the financial reporting requirements of large corporations.

The fixed asset module will be used by the financial people in the corporation to make entries for capital assets that are purchased. For example, assume a Sun server is purchased. The entry for this transaction will show that on a particular date, a Sun server was purchased for whatever the amount was and that it will be depreciated over 3 years. Possibly a serial number will be recorded, but no configuration data such as how much memory it has, how many drives it has and their capacity, how many CPUs it has, etc.

Separately, for management purposes assets are tracked by Information Technology (IT) departments of these same corporations. IT departments track assets using separate IT departmental systems called enterprise asset management systems which are different systems than the ERP systems mentioned above.

In ideal conditions, the ERP system gives the asset an asset number which gets encoded in a bar code label which is supposed to be attached to the machine. It is this barcode label which is supposed to be used to provide positive identification of this asset in both the ERP system and the enterprise asset management systems. The IT department personnel are supposed to scan the bar code label and use that information to record the asset in the enterprise asset management software. If the label was not attached to the asset or the IT department personnel do not scan the label, a discrepancy can be created.

The financial people do not use the enterprise asset management systems and the IT department does not use the ERP Fixed Asset modules. As a result, the records of which assets a corporation has develop independently in the two different types of software and discrepancies between the two different accounting representations of corporate assets just naturally have a way of happening.

These discrepancies represents a risk to the corporation. For example, if the corporation decides to shut down a certain division or other operation that is losing money, it is supposed to dispose of the assets being used by that business when it takes a charge against its earnings. If it takes such a charge but the assets are still being used, that creates an audit risk. Discrepancies complicate that picture and increase the risk that the charge will be excessive or assets actually being used but which are not on the books do not get written off.

In large corporations where there are large numbers of assets, the two sets of asset records are rarely if ever reconciled because of the enormity of the project and its difficulty and the fact that, for the most part, it has to be done manually. Reconciliation is a labor intensive process, and IT departments know that, even if they did it, as soon as they were done, their report would be likely to be obsolete and get more and more obsolete as every day passed. This labor intensive nature of the process plus the fact that an ongoing reconciliation is required to keep the two sets of records accurate and consistent tends to discourage IT departments from even trying to do a reconciliation.

The result is that a corporation's financial systems may be inadvertently, substantially under-reporting or over-reporting the corporation's assets on the corporate balance sheets which can be a serious violation of U.S. law.

Typically, public corporations have their books audited every year by external auditors. If the corporation is large and has many assets, the external auditors will not attempt to find and verify all the hard assets as it is too expensive. Typically, Fortune 500 companies have hundreds of locations worldwide, so it can be very expensive just in travel costs to send auditors to all locations to find all assets. It can also take 6 months on the road to visit all the sites. So external auditors frequently resort to just picking a subset of assets carried on the books and attempting to find those. External audits performed by accounting firms routinely find discrepancies between assets carried on the books and assets found in the corporation's actual physical facilities, even in smaller samples of assets. Typically, accounting firms do not audit to attempt to find every single asset and make sure it is properly reported. This is too time consuming, so they tend to sample and audit smaller collections of assets.

Because discrepancies are regularly found, corporations are forced to resort to taking financial reserves to cover the discrepancies to cover the possibility that some of the assets carried on the books may actually be missing. These reserves are taken out of the liquid assets of the corporation so they lock up capital that could be used for productive purposes if auditors could be assured that the corporation has complete, real-time visibility to all assets carried on their books. Because these reserves can be up to 10% of the total assets, this can amount to reserves in the millions of dollars for some businesses. This is a big problem because money in reserve cannot be ploughed back into the business or otherwise used. Therefore, there is a need for a product which would allow companies to have a much more accurate and easy to update picture of the actual physical assets they have so that they can minimize the amounts they must keep in reserve.

The Sarbanes-Oxley Act of 2002 was passed to require chief executives and chief financial officers to certify that their books present an accurate picture of the financial condition of the corporation. Sarbanes-Oxley also requires corporations to certify that they have mechanisms in place which can be used to validate that the data that is flowing into their books is accurate before it gets to shareholders. Auditor oversight boards are requiring outside auditors to now verify that their clients have mechanisms in place to verify the accuracy of the data shown on their books.

The only known solution to the problem mentioned above which is currently known by the inventors is: 1) taking a physical inventory of all assets; and 2) manual attempts to match the found assets to records kept in the financial system. Such a solution is too expensive, time consuming and is fraught with error. The physical inventory takes too long and may require expensive and extensive travel by the auditors to all locations of a large corporation. This costs too much. Further, manual linkage of inventoried assets to financial records is error prone.

Most large corporations cannot afford physical inventories more frequently than one in two years. The inventory can take many months to complete. By the time the manual linkage is done, the inventory is already out of date. In the interval between physical inventories, the corporation is in the dark about how big of a discrepancy exists between the representation of their physical assets on the books and the actual assets.

SUMMARY OF THE INVENTION

The process and apparatus of at least one embodiment of the invention contemplate an automated process carried out by one or more computers to delve into the discrepancies between assets found on a corporation's networks and assets carried on the corporation's financial records. The system of the invention links assets recorded in financial systems to actual network assets found on the company's network. The system of the invention does not deal with desks, typewriters, chairs or other non network assets. Those still have to be counted by hand. But a surprisingly high percentage of a company's high value assets are network assets such as servers, computer controlled machines in wafer fabrication facilitiers and on manufacturing floors, etc.

If an asset is found on the network, but there is no corresponding active record in the financial systems, the responsible party is notified by the system. If an asset is found on the financial records but there is no corresponding asset found on the company network, the responsible party is notified. The process carried out by the more narrow embodiments of the invention include the following steps:

1) automatic discovery of information technology assets on the company's networks;

2) unique identification of each device such as servers, printers etc. discovered during step 1;

3) discovery of fixed assets in financial systems;

4) creation of rules to link physical assets to financial asset records;

5) linkage of physical assets to financial asset records so that the physical and financial pictures of assets in a corporation or other entity stay synchronized once rule-based matching is done.

A broader statement of the invention includes only steps 3, 4, and 5 above. In the process above, scripts or fingerprints are used to collect a large number of attributes about machines found at live IP addresses on the corporation's networks. Attributes collected typically include: how many CPU are present, what operating system, manufacturer and version are present, what network interface card is present, how many disk drives are present, the capacities of the disk drives, what motherboard, manufacturer, serial number of the motherboard, etc. The whole collection of attributes which can be programmatically gathered define a unique fingerprint of the machine.

After gathering the attributes of each machine, the attributes are used in an algorithm which generates a unique identification number for the machine based upon those attributes. In subsequent scans of the corporation's networks, this same set of attributes can be searched for to ascertain if that particular machine has been moved or is present on a particular network. The algorithm generates a unique ID which is change tolerant. If an operating system is upgraded or memory is increased, this will not cause the machine to not be recognized as the same machine as previously found.

Unique identification of machines is important because machines can migrate from one facility to another. Without unique identification, moving a machine from one facility to another could lead to a discrepancy. Providing a unique identification of a machine by a means other than requesting a machine to return its serial number provides a way to positively identify an asset which has been moved from one network to another to avoid a discrepancy which could otherwise occur. Most Sun servers will not return a serial number when requested by a programmatic interface request, so this unique identification process is helpful. Even when a machine is assigned a physical serial number by the IT department, that serial number is not configured into the machine's operating system, so even if an operating system does return a serial number programmatically, it may not be the one physically attached to the machine by the IT department. So without the unique identification process that assigns a unique ID to each machine based upon its attributes, no positive identification of machines by an automated process could occur even if the machine has been physically assigned an identification number.

The automatic discovery process involves the use of scripts to find IT assets in the network in real time and find out what they are and their configurations, etc. The unique identification of devices step ensures that once a device is detected, it will always be recognized as the same device in subsequent scans of the network. Discovery of the fixed assets carried in the financial systems enables the system of the invention to find the financial representation of physical assets. Rules enabling the matching and linking of physical assets to their representation in the financial records are an essential part of the claimed invention. Creating linkage data to link the physical assets to the assets carried on the financial records of the corporation enable the system of the invention to keep the financial picture and the actual asset picture synchronized for the useful life of the assets.

Automatic discovery of assets on the network is already known and is disclosed in a U.S. patent application entitled APPARATUS AND METHOD TO AUTOMATICALLY COLLECT DATA REGARDING ASSETS OF A BUSINESS ENTITY, Ser. No. 10/125,952, filed Apr. 18, 2002, which is hereby incorporated by reference. Unique identification of devices is already known in the prior art and is covered by a patent application filed by the assignee of the present invention. Discovery of fixed assets disclosed in a financial system is not new. However, the creation of rules for matching physical assets to financial records is new as is creation of data structures for real-time, synchronized linkage of physical devices to asset records in financial systems.

The system of the invention provides, for the first time, real time linkage between the view of the company's assets provided by its financial records, and the physical view of the company's assets found from performing discovery on the company networks of what assets are present.

This real time linkage allows a corporation to determine at all times whether unauthorized appropriation, use or disposition of corporate assets is occurring which would have a material effect on their financial records. Public companies are required to disclose such material information to shareholders and securities regulators.

The system of the invention provides a much faster and more accurate way of determining the correct picture of its physical assets which should be presented on its financial records.

Chief financial officers of corporations or other entities will find the system of the invention to be useful to provide reasonable assurances to external auditors that they have effective controls over the safeguarding of the corporation's assets, and that unauthorized procurement, use or disposition of the corporation's assets is being detected on a timely basis. This is a key requirement of the Sarbanes-Oxley Act of 2002. The system of the invention will enable CFOs to free up capital that otherwise would be locked up in reserves so that it can be put to more productive uses.

A summary of the system which carries out step 1 of the invention to do automatic discovery of information technology assets on the company's networks follows.

A system within the genus of the automatic discovery of IT assets software and hardware (hereafter sometimes referred to as the automatic asset discovery system) provides methods and apparatus to collect information of different types that characterize a business entity and consolidate all these different types of information about the hardware, software and financial aspects of the entity in a single logical data store. Although the automatic discovery of IT assets software and hardware is capable of discovering information about non IT assets such as leases, its capabilities to discovery the attributes of IT assets on the network will be the focus of use of this system in the present invention to do financial linkage. The data store and the data collection system will have three characteristics that allow the overall system to scale well among the plethora of disparate data sources.

The first of these characteristics that all species within the genus of automatic asset discovery systems will share is a common way to describe all information as element/attributes structures. Specifically, the generic way to describe all information creates a different element/attribute data structure for each different type of information, e.g., server, software application program, software license. Each element in an element/attribute data structure contains a definition of the data type and length of a field to be filled in with the name of the asset to which the element corresponds. Each element/attribute data structure has one or more definitions of attributes peculiar to that type element. These definitions include the semantics for what the attribute is and the type and length of data that can fill in the attribute field. For example, a server element will have attributes such as the CPU server type, CPU speed, memory size, files present in the mounted file system, file system mounted, etc. The definitions of each of these attributes includes a definition of what the attribute means about the element (the semantics) and rules regarding what type of data (floating point, integer, string, etc.) that can fill in the attribute field and how long the field is. Thus, all attribute instances of the same type of a particular element that require floating point numbers for their expression will be stored in a common floating point format so programs using that attribute instance data can be simpler in not having to deal with variations in expression of the data of the same attribute. In some embodiments, all attribute data that needs to be expressed as a floating point number is expressed in the same format. The automatic discovery of IT assets software and hardware does not force all data sources to conform to it. Whatever format the data source provides the attribute data in, that data will be post processed to conform its expression in the collected data store to the definition for that attribute in the element/attribute data structure in terms of data type, data field length and units of measure.

A license type element will have attributes such as the license term in years or months, whether the license is worldwide or for a lesser territory, price, etc.

The second characteristic that all species within the genus of automatic asset attribute discovery systems which can be used in some embodiments of the invention will share is provision of a generic way to retrieve attribute data regardless of the element and the type of attribute to be received. This is done by including in each attribute definition in an element/attribute data structure a pointer to one or more "collection instructions" also referred to herein as "scripts". In some embodiments, the collection instruction for each attribute type is included in the attribute definition itself. These "collection instructions" detail how to collect an instance of that particular attribute from a particular data source such as a particular server type, a particular operating system, a particular individual (some collection instruction specify sending e-mail messages to particular individuals requesting a reply including specified information). More specifically, each attribute of each element, regardless of whether the element is a server, a lease, a maintenance agreement, etc., has a set of collection instructions. These collection instructions control data collectors to carry out whatever steps are necessary to collect an attribute of that type from whatever data source needs to be contacted to collect the data. The collection instructions also may access a collection adapter which is a code library used by the collector to access data using a specific access protocol.

The definition of each attribute in the element/attributes data structure may include a pointer to a "collection instruction". The collection instruction is a detailed list of instructions that is specific to the data source and access protocol from which the attribute data is to be received and defines the sequence of steps and protocols that must be taken or used to retrieve the data of this particular attribute from this particular type of source. Each time this "collection instruction" is executed, an instance of that attribute will be retrieved from the target machine at a specific IP address and stored in the collection data store. This instance will be post-processed to put the data into the predefined format for this attribute and stored in the collected data structure in a common data store at a location therein which is designated to store instances of this particular attribute.

As an example of a collection instruction, suppose CPU speed on a UNIX server element is the desired attribute to collect. For UNIX servers, there is a known instruction that can be given to a UNIX server operating system to cause it to retrieve and return the CPU speed. Therefore the "collection instruction" to collect the CPU speed for a UNIX server type element will be a logical description or computer program that controls the collection gateway to, across a protocol described by the collection instructions, give the UNIX server the predetermined instructions or invoke the appropriate function call of an application programmatic interface provided by UNIX servers of this type to request the server to report its CPU speed. The reported CPU speed would be received from the collection gateway and stored in the collected data table.

Another example of a "collection instruction" on how to collect data for a particular type of attribute would be as follows. Suppose the attribute data needed was the name of the database administrator for an Oracle database. The "collection instruction" for collection of this attribute would be a program that controls the collection gateway to send an email message addressed to a particular person asking that person to send a reply email giving the name of the Oracle database administrator. The program would then scan returning emails for a reply from this person and extract the name of the database administrator from the email and put it in the collected data table. Typically, the email would have a fixed format known to the definition program such that the definition program would know exactly where in the email reply the Oracle database administrator's name would appear. A "collection instruction" to extract the maintenance costs attribute of a software license type element typically would be a definition or code that controls the data collector program to access a particular license file, read file looking for a particular field or alphanumeric string with a semantic definition indicating it was the maintenance cost and extract the maintenance cost and put that data into the data store.

The third characteristic that all species within the genus of the automatic discovery of IT assets software and hardware system share is that information of all different types collected by the agent programs using the scripts is stored in a single common physical data store after post processing to conform the data of each attribute to the data type and field length in the attribute definition for that attribute of that element/attribute data structure. The element/attribute descriptions, containment or system-subsystem relationships between different element/attributes and collected data all are stored in one or more unique data structures in a common data store. By post processing to ensure that all attribute data is conformed to the data type and field length in the element/attribute definition, correlations between data of different types is made possible since the format of data of each type is known and can be dealt with regardless of the source from which the data was collected. In other words, by using a generic element/attribute defined structure for every type element and attribute, all the data collected can be represented in a uniform way, and programs to do cross-correlations or mathematical combinations of data of different types or comparisons or side-by-side views or graphs between different data types can be more easily written without having to deal with the complexity of having to be able to handle data of many different types, field lengths but with the same semantics from different sources. These characteristics of the data structures allow data of different types selected by a user to be viewed and/or graphed or mathematically combined or manipulated in some user defined manner. This allows the relationships between the different data types over time to be observed for management analysis. In some embodiments, the user specifications as to how to combine or mathematically manipulate the data are checked to make sure they make sense. That is a user will not be allowed to divide a server name by a CPU speed since that makes no sense, but she would be allowed to divide a server utilization attribute expressed as an integer by a dollar cost for maintenance expressed as a floating point number.

The descriptions of the type and length of data fields defining the element/attribute relationships are stored, in the preferred embodiment, in three logical tables. One table stores the element descriptions, another table stores the descriptions of the type and length of each attribute data field, and a third table stores the mapping between each element and the attributes which define its identity in a "fingerprint". All complex systems have systems and subsystems within the system. These "containment" relationships are defined in another table data structure. Once all the attribute data is collected for all the elements using the "collection instructions" and data collector, the data for all element types is stored in a one or more "collected data" tables in the common data store after being post processed to make any conversions necessary to convert the collected data to the data type and length format specified in the attribute definition. These "collected data" tables have columns for each attribute type, each column accepting only attribute data instances of the correct data types and field lengths defined in the element/attribute definition data structure and having the proper semantics. In other words, column 1 of the collected data table may be defined as storage for numbers such as 5 digit integers representing CPU speed in units of megahertz for a particular server element reported back by the operating system of that server element, and column two might be assigned to store only strings such as the server's vendor name. Each row of the table will store a single attribute instance data value.

An attribute data instance stored in the collected data table is a sample of the attributes value at a particular point in time. In the preferred embodiment, each entry in the data table for an attribute has a timestamp on it. The timestamp indicates either when the attribute data was collected or at least the sequence in which the attribute data was collected relative to when attribute data for other elements or attribute data for this element was previously created. There is typically a refresh schedule in the preferred species which causes the value of some or all of the attributes to be collected at intervals specified in the refresh schedule. Each element can have its own refresh interval so that rapidly changing elements can have their attribute data collected more frequently than other elements. Thus, changes over time of the value of every attribute can be observed at a configurable interval.

In addition to the refresh interval, data collection follows collection calendars. One or more collection calendars can be used to control at which time, day, and date data collection is to take place. Data collection may also take place as the result of user activity.

In the preferred embodiment, this data store can be searched simultaneously and displayed in a view or graph defined by the user to observe relationships between the different pieces of data over time. This is done using a "correlation index" which is a specification established by the user as to which attribute data to retrieve from the collected data table and how to display it or graph it. The data selected from the collected data tables is typically stored in locations in a correlation table data structure at locations specified in the "correlation index".

This use of a common data store allows easy integration of all data into reports and provides easy access for purposes of cross referencing certain types of data against other types of data.

A "collection instruction" is a program, script, or list of instructions to be followed by an agent computer called a "data collector" to gather attribute data of a specific attribute for a specific element (asset) or gather attribute data associated with a group of element attributes. For example, if the type of an unknown operating system on a particular computer on the network is to be determined, the "collection instruction" will, in one embodiment, tell the collection gateway to send a particular type or types of network packets that has an undefined type of response packet. This will cause whatever operating system is installed to respond in its own unique way. Fingerprints for all the known or detectable operating systems can then be used to examine the response packet and determine which type of operating system is installed. Another example of a "collection instruction" is as follows. Once the operating system has been determined, it is known what type of queries to make to that operating system over which protocols to determine various things such as: what type of computer it is running on; what file system is mounted; how to determine which processes (computer programs in execution) are running; what chip set the computer uses; which network cards are installed; and which files are present in the file system. A "collection instruction" to find out, for example, which processes are actually in execution at a particular time would instruct the agent to send a message through the network to the operating system to invoke a particular function call of an application programmatic interface which the operating system provides to report back information of the type needed. That message will make the function call and pass the operating system any information it needs in conjunction with that function call. The operating system will respond with information detailing which processes are currently running as listed on its task list etc.

A "fingerprint" is a definition of the partial or complete identity of an asset by a list of the attributes that the asset can have. The list of attributes the asset will have is a "definition" and each attribute either contains a link to a "collection instruction" that controls a data collector to obtain that attribute data for that element or directly includes the "collection instruction" itself. Hereafter, the "definition" will be assumed to contain for each attribute a pointer to the "collection instruction" to gather that attribute data. For example, if a particular application program or suite of programs is installed on a computer such as the Oracle Business Intelligence suite of e-business applications, certain files will be present in the directory structure. The fingerprint for this version of the Oracle Business Intelligence suite of e-business applications will, in its included definition, indicate the names of these files and perhaps other information about them. The fingerprint's definition will be used to access the appropriate collection instructions and gather all the attribute data. That attribute data will then be post processed by a data collector process to format the collected data into the element/attribute format for each attribute of each element defined in data structure #1. Then the properly formatted data is stored in the collected data store defined by data structure #4 which is part of the common data store. Further processing is performed on the collected data to determine if the attributes of an element are present. If they are sufficiently present, then the computer will be determined to have the Oracle Business Intelligence suite of e-business applications element installed. In reality, this suite of applications would probably be broken up into multiple elements, each having a definition defining which files and/or other system information need to be present for that element to be present.

Fingerprints are used to collect all types of information about a company and identify which assets the company has from the collected information. In one sense, a fingerprint is a filter to look at a collected data set and determine which assets the company has from that data. Almost anything that leaves a mark on an organization can be "fingerprinted". Thus, a fingerprint may have attribute definitions that link to collection instructions that are designed to determine how many hours each day each employee in each different group within the company is working. These collection instructions would typically send e-mails to supervisors in each group or to the employees themselves asking them to send back reply e-mails reporting their workload.

A fingerprint must exist for every operating system, application program, type of computer, printer, router, hub, switch, machine tool, or any other type of machine on a company's networks or a lease, license or other type of financial data or any other element that the system will be able to automatically recognize as present in the business organization.

One species within the genus of the automatic discovery of IT assets software and hardware system will first collect all the information regarding computers, operating systems that are installed on all the networks of an entity and all the files that exist in the file systems of the operating systems and all the financial information. This information is gathered automatically using protocols, utilities, or API's available on a server executing the instructions of "definitions" on how to collect each type of data to be collected. The collected attribute data is stored in a data structure, and the attribute data is then compared to "fingerprints" which identify each type of asset by its attributes. A determination is then made based upon these comparisons as to which types of assets exist in the organization.

Another species within the genus of the automatic discovery of IT assets software and hardware system will iteratively go through each fingerprint and determine which attributes (such as particular file names) have to be present for the asset of each fingerprint to be deemed to be present and then collect just that attribute data and compare it to the fingerprints to determine which assets are present. Specifically, the system will decompose each fingerprint to determine which attributes are defined by the fingerprint as being present if the element type corresponding to the fingerprint is present. Once the list of attributes that needs to be collected for each element type is known, the system will use the appropriate definitions for these attributes and go out and collect the data per the instructions in the definitions. The attribute data so collected will be stored in the data store and compared to the fingerprints. If sufficient attributes of a particular element type fingerprint are found to be present, then the system determines that the element type defined by that fingerprint is present and lists the asset in a catalog database.

BRIEF DESCRIPTION OF THE DRAWINGS

FIG. 3 is an example of a containment table which defines the system and subsystem relationships within the system.

FIG. 5 is an example of a collected data table where the collector processes store the instances of collected data.

FIG. 7 is an element tree data structure.

FIG. 8 is an element table that gives element names and Ids and pointers to collector programs.

FIG. 9 is a table of attribute names and Ids.

FIGS. 10A and 10B are a mapping table between element Ids, attribute Ids and collector ids.

FIG. 11 is a table mapping element Ids to child element Ids.

FIG. 12 is a fingerprints table that maps element Ids to fingerprint rules.

FIG. 13 is a collectors table that maps collector IDs to the corresponding collection instructions for each attribute mapped to the element and fingerprint currently being processed.

FIG. 14 is an example of a data table that stored collected attribute data.

FIG. 22 is a screen shot of a typical list of fixed assets imported from the financial systems of a corporation into the asset reconciliation and linkage system the processing of which is shown in the flowchart of FIG. 20.

FIG. 23 is a screen shot of a rule definition screen where automatic rules can be defined to match assets imported from the financial reporting system to assets found in inventory on the networks by the automatic discovery process.

FIG. 24 is a screen shot showing the results of application of the matching rules to the fixed assets imported from the financial system and the assets found in inventory on the networks.

FIG. 25 is a screen shot of a screen of unmatched fixed assets imported from the financial systems for which the automatic matching rules did not find a match among the assets in inventory discovered in the network by the automatic discovery process.

FIG. 26 is a screen shot of a screen wherein filter conditions are set to limit the number of unmatched fixed assets will be examined manually to attempt to find a match in inventory.

FIG. 27 is a screen shot of a screen used in the manual matching process showing fixed assets meeting the filter condition set in the screen of FIG. 26 and showing the unmatched assets in inventory from which a match may or may not be found.

DETAILED DESCRIPTION OF THE PREFERRED EMBODIMENT

Figure 1:
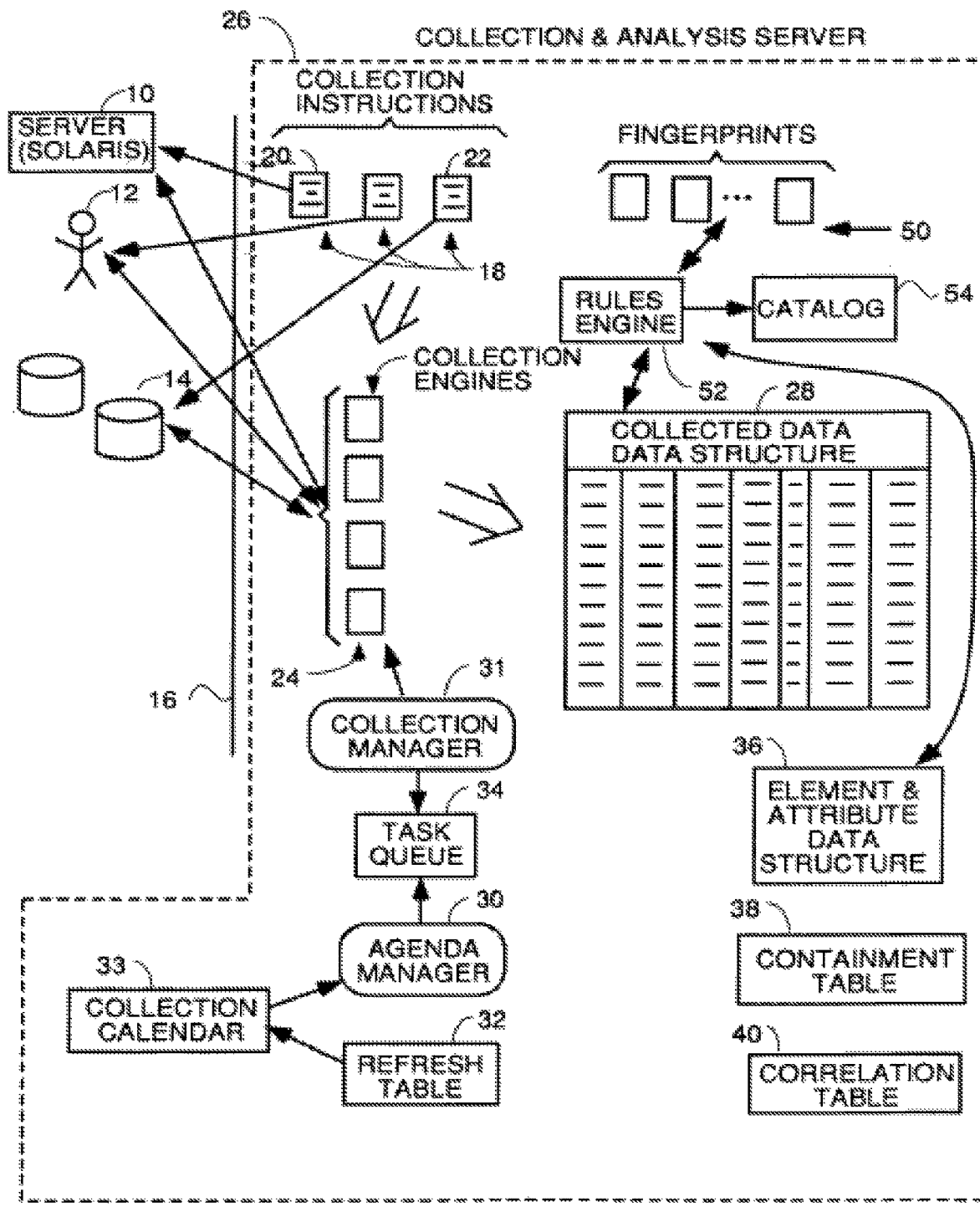
FIG. 1 is a block diagram illustrating the environment in which the invention works and some of the key elements of a system within the teachings of the invention.

Referring to FIG. 1, there is shown a block diagram illustrating the environment in which the invention works. FIG. 1 illustrates schematically the most important elements of a system within the teachings of the automatic asset discovery system which can automatically retrieve attribute data and determine from it the makeup or "DNA" of the organization. In other words, a system like that shown in FIG. 1 can automatically determine the number and type of computing hardware assets, installed software, key elements of information about the organization and extracted key information from the organization's leases, contracts, licenses, maintenance agreements, financial statements, etc. Essentially, all the important information that defines the makeup or "genes" of a business organization or government can be automatically gathered and assets automatically identified from their attributes. This information can be periodically re-gathered to present an up-to-date picture of the makeup of an organization to management at substantially all times.

The sources of data from which information is to be collected in this particular organization are server 10, person 12 and file system 14. All these sources of data are connected together by a data path such a local area network 16 (which can be fully or partially wireless) and suitable interface circuitry or, in the case of a human, a workstation including a network interface card and an e-mail application. None of this hardware and software that does not form part of the invention is shown in detail in FIG. 1.

Everything to the right of line 16, representing the data path, represents processes, programs or data structures within a collection and analysis server 26 which implements the methods and apparatus of the invention. Typically this server is located at the customer premises, but, in some embodiments, it could be located remotely and make connections to the local area network of the customer via the Internet or a dedicated WAN connection. Connections through the internet are more difficult to implement because businesses typically have firewalls and other security measures that must be dealt with before access to the internal LAN by a foreign computer will be granted.

A set of collection instructions or scripts, indicated generally at 18, are definitions and programs which serve to define what types of information can be gathered from each source and methods and protocols of doing so. For example, collection definition 20 may be for a server running a Solaris operating system and may define that one can get files, file systems mounted and processes currently in execution from such servers. Collection definition 22 for the file system 14 contains data indicating such things as the file system partitions, partition size, partition utilization, etc. can be gathered from the file system 14. The collection definitions then give specific step by step instructions to be followed by data collector processes, shown generally at 24. These collectors are processes in the collection server which can establish connections over existing protocols 16 to the various data sources under the guidance of the collection instructions 18. These processes actually collect the desired information needed by the system to identify which assets are present and extract information from people and documents that management desires to see. The collection instructions contain specific program instructions which control the collector processes 24 to traverse the network and communicate with the data source using the proper protocols and invoke predetermined function calls, read predetermined files or send predetermined e-mails addressed to specific people to extract the information needed.

The data collectors 24 can be any processes which are capable of running the program instructions of the collection instructions. The data collector processes must be capable of communicating with the data source devices, people or processes identified in the collection instructions using the necessary protocol(s). Those protocols include the various software layers and network communication hardware interface or gateway coupled to the collection and analysis server 26, the network protocols of whatever data path 16 the communication must traverse and the protocols to communicate with the appropriate process at the data source such as the operating system for server 10, the e-mail program of person 12 or the appropriate process in file system 14. Any collection process that can do this will suffice. In the preferred embodiment, the data collectors 24 are generic prior art "scrapers" which have been customized to teach them to speak the necessary protocols such as TCP/IP, SNMP, SSH, etc. which may be necessary to talk to the various data sources in the system.

Each data collection process 24 is identical in the preferred embodiment, and they are assigned to data collection tasks on availability basis. In the preferred embodiment, all the common processing is put into the data collectors such as libraries or adaptors for the different protocols the collector might have to use such as TCP/IP, IP only, UDP, Secure Sockets, SNMP, etc. This way, the collection instructions need not include all these protocols and can concentrate on doing the steps which are unique to gathering the specific data the collection instruction is designed to collect. In alternative embodiments, only the protocol libraries necessary to gather the particular data a collection instruction is designed to gather can be included in the collection instructions themselves. In other embodiments, the protocol libraries or adaptors can be shared by all the data collector processes and just accessed as needed.

Typically, data collection requests are queued and as a data collector process, running locally or across the network, becomes available, it retrieves the next data collection request and the appropriate collection instruction for that request if it has support for the requested collection protocol. Then it executes the collection instructions therein to retrieve the requested data and store it in the appropriate location in a collected data storage structure 28. In alternative embodiments, a single collection process can be used that has a queue of collection requests and processes them one by one by retrieving the appropriate collection instruction for each request and executing the instructions therein.

Collected data structures 28, an example of which is shown in FIG. 5, serve as the initial repository for the collected data obtained by the collectors. This is typically a table which has a column for storage of instances of each different attribute, with the rows in the column storing the value of that attribute at each of a plurality of different times. The intervals between the instances of the same attribute data vary from attribute to attribute, and are established by a refresh schedule in refresh table 32 in FIG. 1. Typically, all attributes are collected repeatedly on a "refresh schedule", subject to a collection calendar that drives at what time, day, and date collection shall take place. This allows analysis of how the value of an attribute changes over time.

An agenda manager process 30 consults the refresh schedule for each attribute in a refresh table 32 and also consults a collection calendar 33 to determine times and dates of collection of attributes. If this schedule data indicates it is time to collect an attribute, the agenda manager 30 puts a collection request in a task queue 34 for collection. A collection manager 31 periodically or continually scans the task queue 34 for tasks to be accomplished, and if a task is found, the collection manager 31 gets the task from the task queue 34 and retrieves the appropriate collection instruction for the requested attribute and executes its instructions using an available one of the collection engines 24. The collector then retrieves the data and stores it in the next available row of the column in collected data tables 28 that store instances of that attribute.

Figure 2:
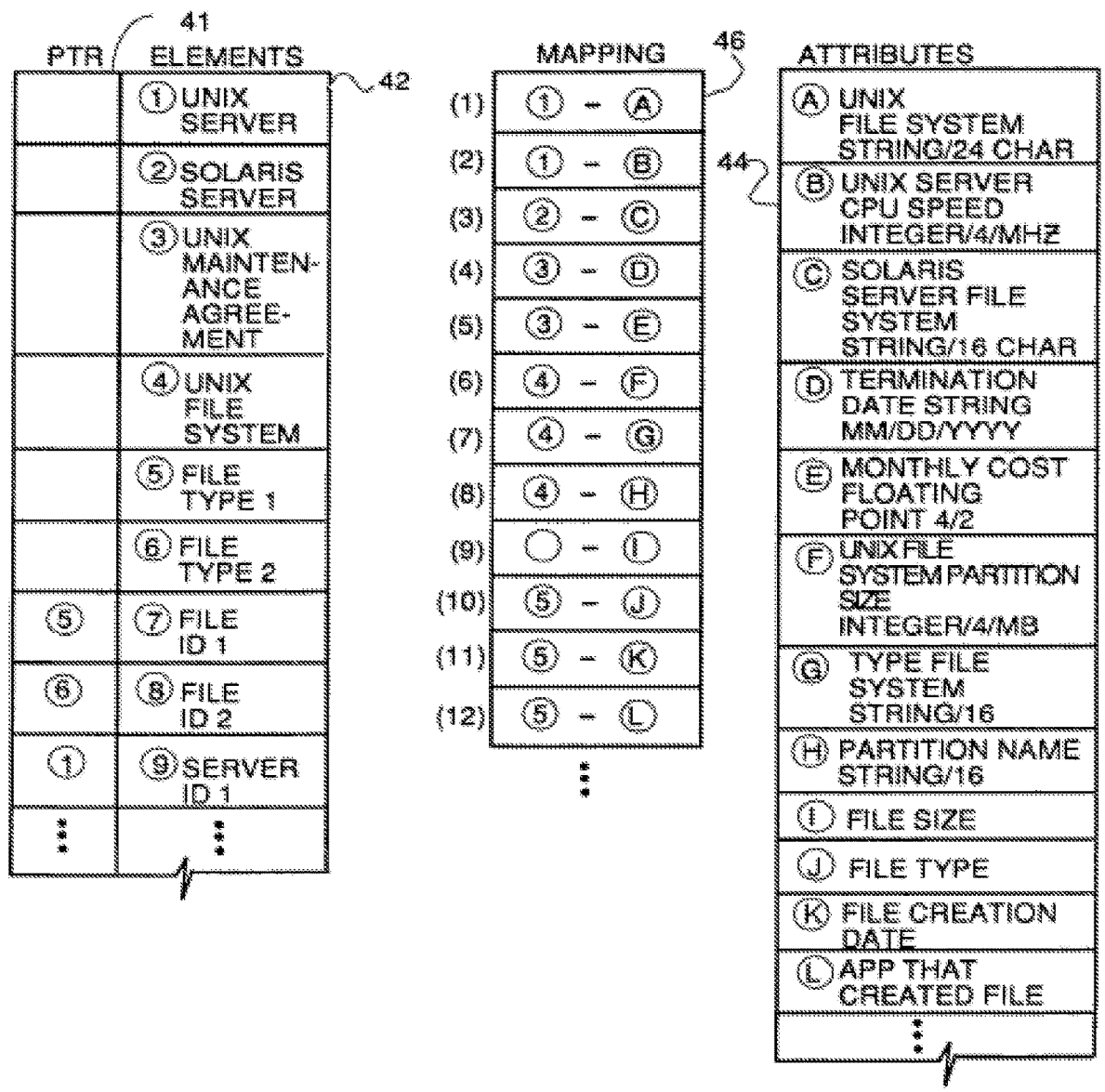
FIG. 2 is an example of the elemental attribute data structure which defines the elements and defines the attributes of each element with semantic data and format data.

Each column in the collected data table is designed to receive only attribute data of the type and length and semantics defined for the attribute in an element/attribute data structure 30. In other words, each attribute has its instances stored in only one column of the collected data table, and the instance data must be in the format defined in the element/attribute data structure of FIG. 2. If the collected attribute data is not in the proper format, it is post processed to be in the proper format before it is stored in the collected data table. This makes it easier to write programs that deal with the collected data because the programmer knows that all instances of a particular attribute will have the same format. In FIG. 5, the semantics of the attribute stored in each column and format data which defines the type of data, length and units of measure defined in the element/attribute table of FIG. 2 are listed above the double line 48, and the actual attribute data instances for each attribute are stored in each column below the double line.

An element/attribute data structure 36 stores element entries for all the elements the system can identify and defines the attributes each element in the system has. The data structure 36 also serves as a catalog of all the instances found of a particular element type. An example of an attribute/element data structure 36 is shown in FIG. 2. In the preferred embodiment, this data structure is comprised of three tables. The first table, shown at 42 in FIG. 2, has an entry for each element definition and an entry for each instance of an element that has been found by the system with a pointer to the element definition. For example, elements 7 and 8 are file instances that have been found with pointers to element entries 5 and 6, respectively. This means that the file which the system found and gave an element identification File ID 1 is an instance of file type 1 defined by the attributes mapped to entry 5 in the element column. Likewise, the file instance found by the system and entered as an element at entry 8 is an instance of file type 2 defined by the attributes mapped to and which define the file element at entry 6. Likewise, the system found a server and assigned it ID 1 and made an entry at 9 in the element table. This entry has a pointer to entry 1 indicating the server instance at 9 is a UNIX server defined by the attributes mapped to entry 1. Only instances of elements have pointers in pointer column 41, and these instances define the elements that have been found in the system. The elements with pointer entries are a catalogue of everything (all elements) that makes up the company.

Typically, the element definition will be semantic data naming the element or telling what the element is. Each element has one or more attributes which are defined in a second table shown at 44. Semantic data and form data in each entry of this second table names the attribute defined by that entry or defines what it is and what form the attribute data is to take, e.g., floating point, integer, etc. For example, entry A in this table is an attribute named Unix file system. This name is a string of alphanumeric symbols 24 characters long or fewer. Entry B is an attribute named UNIX server CPU speed which will be an integer of 4 digits or fewer with units of mHz. Entry E is an attribute named monthly cost which will be a floating point number with 4 digits to the left of the decimal and 2 digits to the right. These definitions are used to post process gathered data to the format of the definition for storage in the collected data table 28. The third table, shown at 46, is a mapping table that defines which attributes in the second table belong to which elements in the first table. For example, attribute A in table 44 is an attribute of element 1 in table 42, and attribute D is an attribute of element 3. There are subsystem relationships that are inherent in the data structure of FIG. 2, but not specifically identified. For example, element 4 "UNIX file system" is actually an attribute of UNIX server element 1 in table 42, and is defined at entry A in table 44.

Every system may have systems and subsystems. A containment table 38, an example of which is shown in FIG. 3, defines which elements are sub-elements or subsystems of other elements. Row 1 shows that the UNIX server, element 1 in table 42, FIG. 2, has as a first subsystem or child element, the UNIX file system listed as attribute A in table 44 of FIG. 2 and element 4 in table 42. The UNIX file system itself is listed as an element in table 42 because it has attributes mapped to it by rows 6-9 of the mapping table 46 of FIG. 2. Specifically, the UNIX file system has as attributes the partition size, type of file system, and the partition name attributes defined at entries F, G and H in table 44. Row 2 of the containment table shows that UNIX file server element also has another subsystem which is the UNIX maintenance agreement defined at element entry 3 in table 42. The UNIX maintenance agreement has defined attributes D and E of table 44, i.e., the termination date and monthly cost. Row 3 encodes the parent-child relationship between the UNIX file system and a file type 1 element. Row 4 of the containment table encodes the grandparent-grandchild relationship between the UNIX file server and the file type 1 element.

Figure 4:
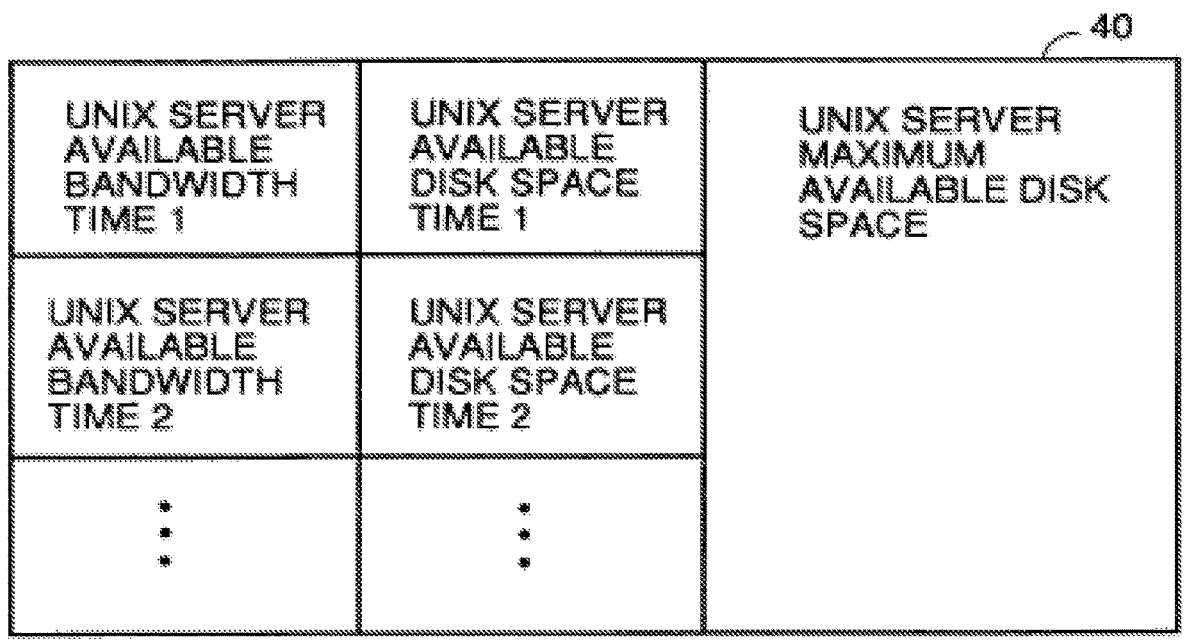
FIG. 4 is an example of a user defined correlation table which defines which attribute data combinations a user wants views, graphs or other visual widgets of on her display.

A correlation table 40 in FIG. 1 stores the attribute data that allows a user to see the relationships between different user selected attributes over time. An example of this table is shown in FIG. 4. The correlation table supports user defined visual interface "widgets" of different types such as graphs or juxtaposition views between different attributes as well as other functions. This allows the user to compare different attributes over time such as server utilization versus maintenance costs. The particular example illustrated by FIG. 4 supports a juxtaposed view widget comparing server bandwidth versus available disk space over time as compared to maximum available disk space on the server. The correlation table is an optional element and is not part of the broadest definition of the genus of the automatic asset discovery system since the immediate value of the system is believed to be its ability to automatically gather attribute data, compare it to fingerprints, identify assets and automatically extract other important information management needs from documents, files and by sending messages to people who know the needed information. The correlation table and visual widgets are nice features in various species that have greater utility within the inventive genus. Likewise, the refresh table and agenda manager functions in FIG. 1 are attributes of useful species within the genus but are not part of the broadest definition of the genus. This is because it is useful to be able to extract the attribute data and catalog it one time, and the ability to do it again periodically and automatically is nice to have but not essential to the most basic utility of the automatic asset discovery system.

Returning to the consideration of FIG. 1, once all the attribute data has been stored in the collected data table 28, a comparison process compares the attribute data to a plurality of "fingerprints" shown generally as the data structures 50. These fingerprints combine with the element/attribute definitions stored in data structure 36 illustrated in FIG. 2, to completely define the elements, i.e., systems and subsystems, the system of FIG. 1 is able to automatically detect. The element/attribute definitions in data structure 36 define what each element is and which attributes that element has. The fingerprints shown at 50 are data structures which define rules regarding which attributes may be found for that element to be deemed to exist and logical rules to follow in case not all the attributes of an element definition are found. For example, some installs of software fail, and not all the files of a complete installation are installed. Other installations of suites of software allow custom installations where a user can install only some components or tools and not others. The fingerprints 50 contain all the rules and logic to look at the found attributes and determine if a failed installation has occurred or only a partial installation of some programs and/or tools has been selected and properly identify that asset to management. For example, if all the attributes of an Oracle database are found except for the actual executable program oracle.exe, the Oracle database fingerprint will contain one or more rules regarding how to categorize this situation. Usually the rule is that if you do not find a particular main executable file for a program, you do not have that program installed even if all its DLLs and other support files and satellite programs are found.

A rules engine process 52 uses the rules in the fingerprints and the definitions in the element/attribute data structure 36 as a filter to look at the collected attribute data in collected data table 28. If all the attributes of a particular element are found in the collected data, an entry in the element catalog data store 54 is made indicating that the element is present. If only some of the attributes are present, the rules compare applies the rules in the fingerprint for that element to whatever attributes are found to determine if the element is a partial installation of only some tools or programs selected by the user or an installation failure and makes an appropriate entry in the element catalog 54.

Figure 6:
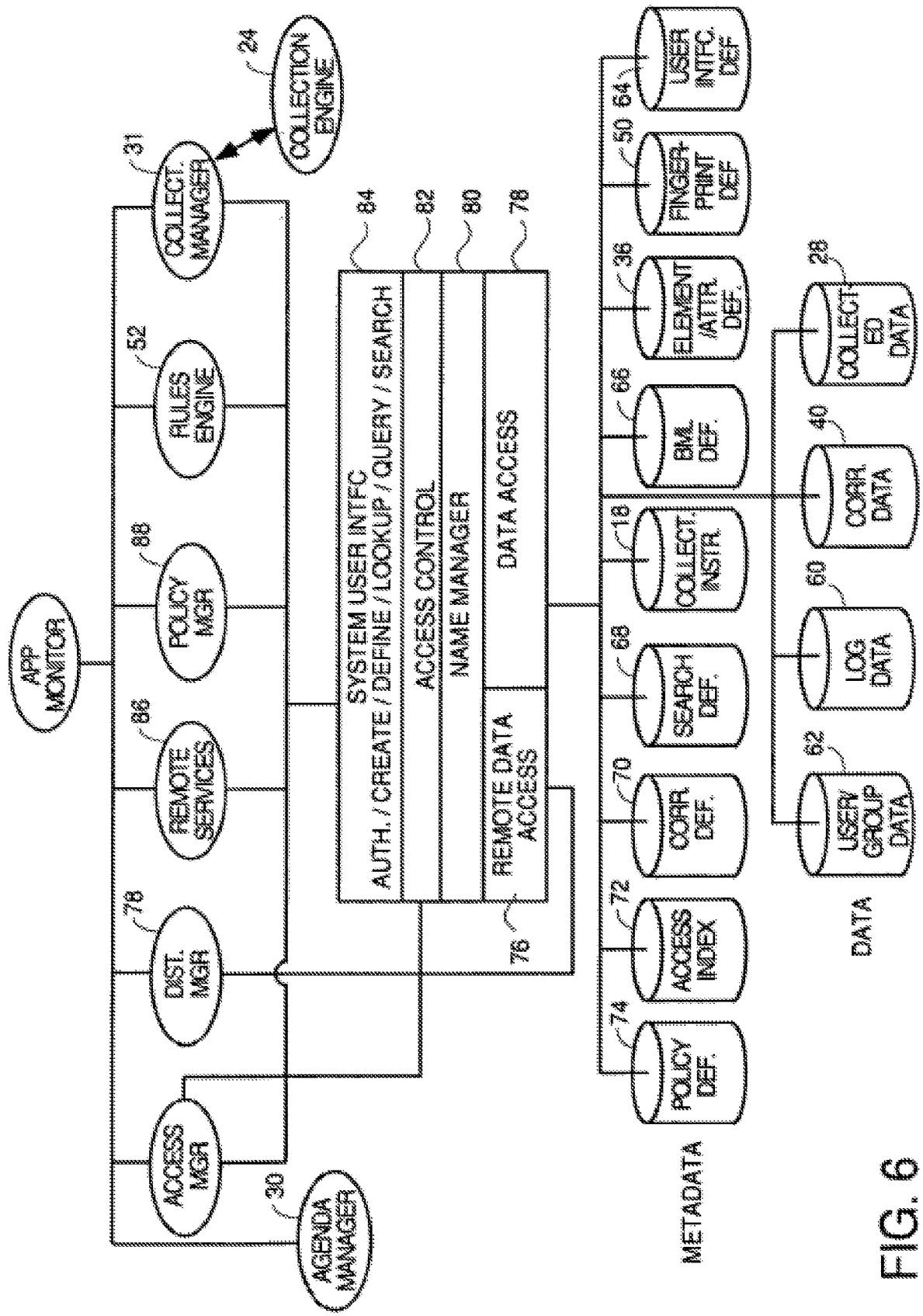
FIG. 6 is a more detailed block diagram of the preferred embodiment of the program and data structure architecture for a server within the genus of the invention.

Referring to FIG. 6, there is shown a more detailed block diagram of the preferred embodiment of the program and data structure architecture for a server within the genus of the invention. Although the actual computer is not shown, all the functionality within the square blocks and ovals represents programs running on the server, and the data structures within the canisters represent data stored on the server's disk array. The collected data of table 28 is stored on one or more hard disks storing a file system. In this file system, there are physical blocks of storage dedicated to each of the data structures represented by the canisters on the lowest two rows of FIG. 6. The data structures can also be distributed or stored remotely. Each canister name refers to the logical name of the data structure. Each data structure hereafter will just be referred to by its name without reference to where or how the data is stored. The correlation data 40 is the data selected from the collected data by the user by specification of a "correlation index" which supports the user defined visual widgets. The log data 60 is data the server logs to keep track of its activities. The user/group data 62 defines which users are in which groups and what privileges each user has to exercise various functionality of the system.

The collection and analysis server of FIG. 6 also stores a plurality of metadata structures which give meaning to the raw data stored in data structures 28, 40, 60 and, 62. A user interface data structure 64 stores data defining the pages that can be viewed via the user interface and defining the types of "widgets" that can be displayed on the user interface.

A fingerprint definitions data structure 50 contains the rules or logic used on the attribute data in collected data structure 28 to determine if all the attributes of the various elements have been found and to add the element to a catalog of elements. The data regarding which attributes each element has is stored in the elements/attributes data structure 36. The fingerprint definitions 50 also contain rules to handle situations where not all the attributes of an element are found or where an element comprises a suite of programs where the user can define which programs of the suite to install.

A BML data structure 66 stores data which defines whether a particular process is or is not running or which defines how to use the collected data in a logical, user defined sequence to determine whatever the user wants to determine. The result of a BML is another element which can be displayed as a widget.

The collection instructions data structure 18 stores sets of instructions for each attribute of each element which explains how to collect data for that element. These are the "scripts" the systems uses to collect attribute data.

A search definition data structure 68 stores data that defines searches a user wants to do such as, "show me all the servers running Solaris."

A correlation definition data structure 70 stores the user defined correlation indexes which define which views the user wants to see and which elements and attributes are to be displayed using which widgets defined in data structure 64.

An access index data structure 72 stores data restricting data and views various users can see.

A policy definitions data structure 74 stores data defining policies that restrict which users can exercise certain functionalities of the system such as those that consume large amounts of server bandwidth and when they can do those things.

A remote data access function 76 cooperates with a distribution manager function 78 to integrate two or more servers like those shown in FIG. 6 so that they operate like one server to the user. In other words, if one of the servers gathers and stores certain attribute data and the other server gathers and stores certain other attribute data, then when a user exercises some function on one server that needs data from the other server, functions 76 and 78 cooperate to go across the network to the other server and get the needed data so that the function can be performed.

Data access function 78 provides the functionality to retrieve any needed metadata or attribute data or other data stored in data structures 28, 40, 60, and 62.

A name manager function 80 creates and manages mappings between names given to data by users and the actual data to which the name pertains.

An access control function 82 uses the users and groups privilege data and the policy definition data to block unauthorized users from using the system and block authorized users from exercising functionality they have no privileges to use and implement any bandwidth protection policies.

A system interface function 84 provides the basic functionality by which client applications operate the system. This program provides the necessary functionality to: authenticate users at log-on; allow users to create new elements and define BML definitions and define new widgets; lookup definitions of attributes and collection instructions and alter them; query the system to find and show the values of specified attribute data; and provide a search template that allows the user to define what she is looking for by search keys and then decomposes the data in the search template into one or more queries.

A remote services function 86 allows an authorized client applications to exercise the functionality of the collection and analysis server from remote locations anywhere on the network.

A policy manager function 88 provides the functionality to control the server to implement the policies defined by the policy definitions data structure.

A rules engine 52 provides the functionality to control the server to automatically determine which elements are present in the business organization. Specifically, the rules engine uses the rules defined in the fingerprints and the element/attribute data structure definitions to analyze the collected attribute data in data structure 28 to determine which elements are present in the system and what partial installations or failed installations exist in the system and catalog them.

An agenda manager 30 provides the functionality to determine when attribute data collection requests to collect data from data sources need to be made. This is done by consulting a refresh table which (not shown but represented by block 32 in FIG. 1) determines the intervals at which each attribute is collected, and by consulting a collection calendar (not shown but represented by block 33 in FIG. 1) which contains data defining the dates on which various attributes are collected. When such a collection action is needed, the agenda manager places collection tasks in the task queue 34 in FIG. 1. In the preferred embodiment, collection tasks get placed in the task queue automatically in accordance with a schedule in refresh table 32 and the collection calendar. Refresh may also take place as the result of a user action. The collection manager 31 continuously or periodically scans the task queue 34 in FIG. 1, and when it finds that a task is present, locates an available collection engine 24 and the correct collection instruction (20-22 in FIG. 1) for the attribute to be collected and causes the collection engine to execute the collection instruction to gather the attribute data and put it into the collected data store 28.

FIGS. 7 through 14 are examples of the core data structures which enable the system to run. Although not all data types and fingerprints and collectors are defined in FIGS. 7-14 for a typical system, FIGS. 7-14 are good examples of the core concepts. FIGS. 7-14 include: the definitions of very important elements or data types in every system; fingerprints for these important data types; examples of data collection instructions for various attributes; examples of actual data collected for these elements; examples of fingerprint rules used to evaluate collected data to determine is an element is present or not present; the relationships between these data elements and their attributes; and examples of parent-child element containment relationships for these type elements. These data structures are believed to be unique standing alone.

Figure 15:
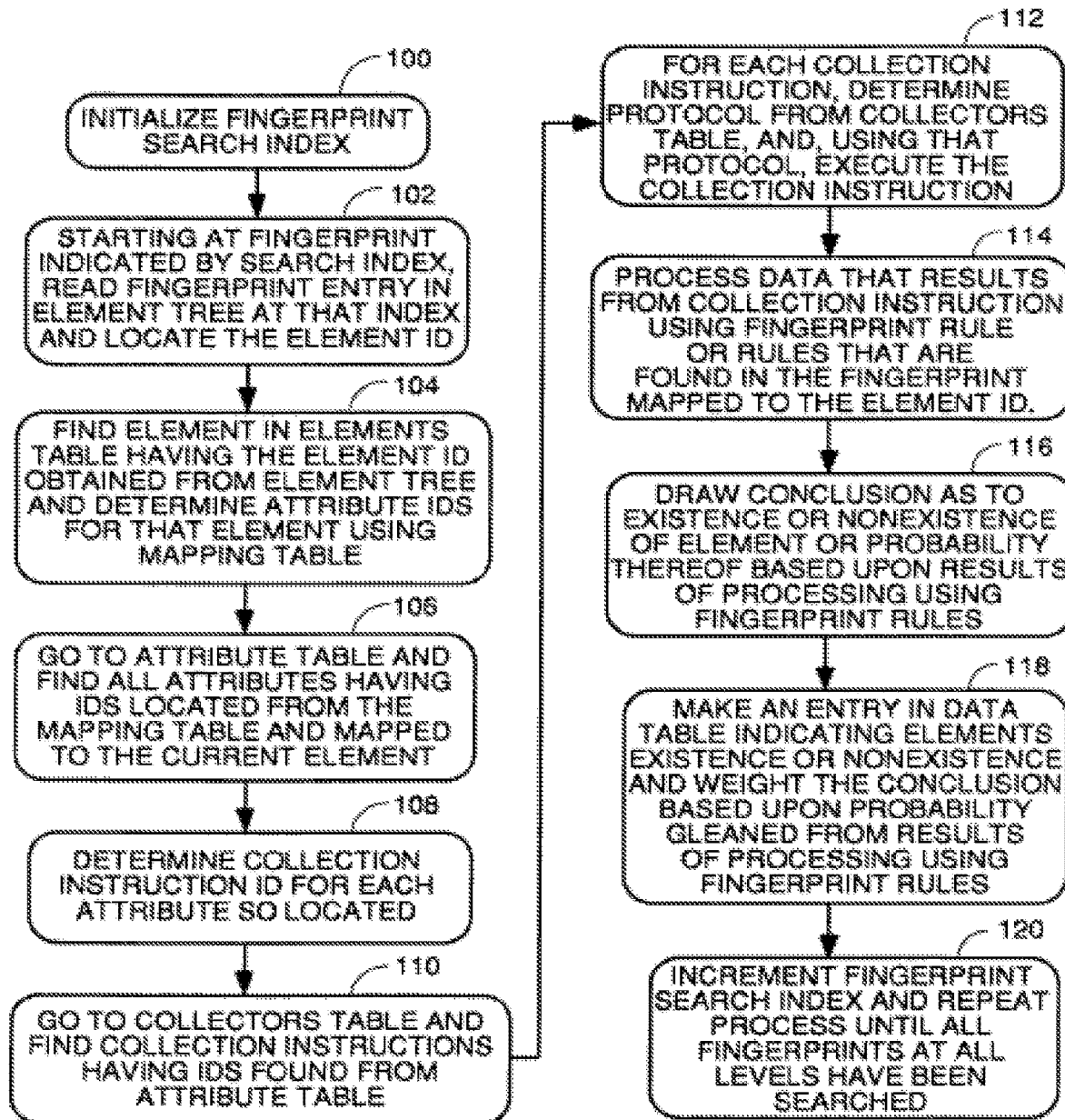
FIG. 15 is a flowchart of a process to use fingerprints to automatically collect data and categorize assets.

FIG. 15 is an example of a discovery process within the genus of processes to use the fingerprints and collection instructions defined in the data structures of FIGS. 7-14 to automatically gather data from entities in a business organization. The process of FIG. 15 also determines which of the elements defined in the data structures the organization has or does not have and/or the probabilities that the organization does or does not have each element. The data structures of FIGS. 7-14 define what the system expects to see or, more precisely, is capable of seeing using the process of FIG. 15 working with the data structures. The data structures of FIGS. 7-14 will be discussed jointly in conjunction with the discussion of the process of FIG. 15 to illustrate how the process of the attribute data collection system uses the data structure to collect attribute data about corporate assets on the network and other non network assets.

Referring to FIG. 15, step 100 initializes a fingerprint search index which is used to keep track of which fingerprint is currently being processed. Referring to the element tree data structure of FIG. 7. There is a top section called Types, starting at line 101, which defines all the different types of elements (assets and elements are used interchangeably herein) the system can recognize. The defined types are shared in that every instance of collected data for a particular type element will have the same attributes as defined in the type section. The numbers in parenthesis next to each element type is the element ID.

There is a fingerprint section starting at line 103 which defines the various fingerprints that exist in the system and defines the types of elements the system can recognize from collected attribute data. There is also a section 105 which defines the data format for each item of data representing an instance of an attribute and which also stores the instances of the attributes.

Each line below the types line 101 and above the fingerprint line 103, represents a different type element the system can gather data about and automatically recognize from the data. The element tree defines the structure of the data in the system. The indentation relationships in the element tree type section reflect the parent-child inheritance relationships between element types. For example, the file type element, ID=5, on line 121 has name and size attributes. The UNIX type on line 123 is a type of file element that inherits the attributes name and size of its parent type File element on line 121. The UNIX file type therefore has inherited attributes name and size and also has its own attribute "owner", and has an element ID of 10,5 indicating it has inherited attributes from element ID 5. The syntax and semantics of each entry in the element tree is shown at line 125 just below the title.

The indentations in the fingerprint section define the logical relationships in the discovery process of FIG. 15 which is followed to collect the data when starting from a completely unknown network configuration and identify which elements are and are not present. For example, the first fingerprint that will be used is at line 107 and determines if a network is present. The network element fingerprint shows four attributes: the network ID, a mask value, a bottom IP address and a top IP address. This type of discovery process is different than the prior art because it starts from a completely unknown configuration and automatically discovers everything it needs using fingerprints to define attributes and collection processes to collect the values of those attributes and fingerprint rules to examine the collected data to determine if the element is there, partially there or not there. In the prior art of monitoring systems, it was necessary to choose a monitoring system, identify a particular server to the monitoring system, tell the monitoring system what type of operating system the server was running and then install an agent on the server and/or every desktop in the LAN. The agent then goes out and discovers what type of network cards are installed, what processes are running etc. and reports back to the monitoring system. Thus, each time the monitoring system or agent software is modified, the agents had to be reinstalled on every server and desktop which is time consuming and expensive. The process of FIG. 15 and the data structures of FIGS. 7-14 are the enabling technologies that allow an entire business organizations assets to be found and catalogued without the huge overhead of installed agents and the labor of predefining to the monitoring system all the servers, desktops and operating systems on the LAN or LANs of the organization.

If a network is found, then the next step would be to determine all the network interface cards that are coupled to the network using the NIC fingerprint at line 109. The NICs are all coupled to computers, so the next question is what types of operating systems are running on those computers. The Solaris 2.7 fingerprint on line 111 is one type of fingerprint that can be used to determine if any of the computers are running this operating system. Other fingerprints not shown would usually be present for Windows NT, Windows 98, etc.

Typically, under each operating system fingerprint, there would be hundreds of other fingerprints defining many types of elements such as application program packages the attributes of which can be collected by invoking the proper function calls of the operating system.

Once the type of operating system on a particular computer has been determined, the next thing the system would like to know is whether it is a web server. The HTTP fingerprint on line 113 is used to determine if the server is running a web server process.

The next question of interest to the system is who is the super user of the computer just located. That is the purpose of the fingerprint at line 115. Typically, the collection instruction in this type fingerprint will cause the system to send out an e-mail to an administrative person who knows the name of the super user with a request to send back an e-mail, although other means for collecting this data attribute may be encoded in the fingerprint. Next, the amount of memory needs to be known, and that is the purpose of the fingerprint at line 117. The CPU type is of interest next, and that is the purpose of the fingerprint at line 119.

The indentations in the data section starting at line 105 just track the indentations of the fingerprint section as the order of the fingerprints is the order in which data is collected. Multiple relationships are possible between data elements.

Line 127 is the data of an instance of a network found in the hypothetical example. This network has a network ID of 1.1.1.0, a mask value of 255.255.255.0, a bottom IP address of 1.1.1.2 and a top IP address of 1.1.1.254. Line 129 represents the data of an instance of a particular NIC that has been found with an IP address of 1.1.1.20 and a response attribute of 25 milliseconds.

Step 100 in FIG. 15 starts the automated data collection process by setting the search index pointer at line 107 in FIG. 7. Step 102 is the process of reading the fingerprint entry in the element tree at the location of the pointer (line 107 on this first pass through the loop) and determining the element ID to which this fingerprint pertains. In this case, the element ID is 101. Reference to the elements table of FIG. 8 shows that there is no type ID or collector ID for this element per se. In step 104, this element ID is used as a search key to search a mapping table to determine which attributes that element has. The mapping table is shown in FIG. 10A. The element ID 101 for the network element is mapped to attribute IDs 68, 69, 70, and 71.

Step 106 represents the process of using each of the attribute IDs located in step 104 as search keys in the attribute table of FIG. 9. In the example, all the attribute IDs

68, 69, 70, and 71 which are mapped to element ID 101 are located in the table of FIG. 9.

Step 108 represents performing the step of determining the collection instruction ID for each attribute mapped to the fingerprint and element currently being processed. One or more attributes can be collected through a single collection instruction. In alternative embodiments, the attributes will be obtained one at a time during each pass through the loop and the collection instruction ID for only one attribute will be found and executed on each pass through the loop and there will be a test at the end of the loop to determine if all collection instructions for all attributes mapped to the current fingerprint have been executed. This can be an inner loop within an outer loop with the outer loop processing one fingerprint per pass through the loop and the inner loop iterating as many times as there are attributes. When all the attributes have had their collection instructions processed in this alternative embodiment, the fingerprint rules are applied to the collected data and an appropriate entry is made in the data table regarding the existence, degree or probability of existence, or nonexistence of the element. Then the fingerprint search index pointer is moved to the next fingerprint to be processed and the processing starts again for the next fingerprint. In the embodiment of FIG. 15, all the attributes are determined in step 106 and all their collection instruction IDs are determined in step 108. The collection instruction IDs are determined by using the element ID as a search key in the elements table of FIGS. 10A and 10B and looking up the collector ID in column 3 mapped to each attribute mapped to the element ID. In the example, these collector IDs are 208, 209, 210 and 211.

In step 110, the system goes to the collectors table of FIG. 13 and uses the collector IDs determined in step 108 to search for and find the collection instruction for each attribute mapped to the element and fingerprint currently being processed. Those collection instructions are circled in FIG. 13, and the collection instruction itself is in the Statement column. The protocol to use is identified in the Method column.

Step 112 is the process of determining the protocol to use for each collection instruction for each attribute mapped to the fingerprint for the element currently being processed. This is done simply by reading the entry in the Method column for each of the collector IDs mapped to the element ID currently being processed. More than one method or protocol may be used in a single fingerprint to perform system identification by multiple means. Step 112 also represents the process of accessing the protocol library identified in the Method column and using the appropriate protocol from that library to execute the command or operation specified in the Statement column.

Step 114 is the process of applying the fingerprint logical rule or rules to the attribute data collected in step 112 for the element currently being processed to draw a conclusion regarding the probability of existence or nonexistence of the element whose fingerprint is currently being processed. This is done by using the element ID as a search key to search the fingerprints table of FIG. 12. In the example, element ID maps to two different rules defined in the Rule column. The seq column defines the sequence in which these rules are to be applied to the collected data. In the example, the first rule invokes a function call of an application programmatic interface to run a program to examine the collected network ID attribute data and determine if that is a valid network ID. If the network ID is valid, a true result is returned. The Trueweight and Falseweight columns give weighting factors to use if the result of application of the rule is true or false, respectively. Step 116 represents the process of drawing conclusions regarding the existence or nonexistence, or probability thereof, of the element to which the fingerprint currently being processed pertains.

In step 118, an entry for the element mapped to the fingerprint currently being processed is made in the data table of FIG. 14. Referring to FIG. 7, line 127, the attribute data for an instance of a network having element ID 101 is shown. This data instance has its own ID which is 1001. In FIG. 14, the values for each of the attributes of the fingerprint mapped to network element ID 101 are shown on data instance ID 1001 in the first column (this column is labeled Elementid, but, more precisely, should be labeled data instance ID). The second column indicates this attribute data was collected at a time corresponding to timestamp 40. The actual values for the four attributes of the network element specified in the fingerprint are shown in columns 3 through 6 with the column Attr1 containing the network ID, column Attr2 containing the mask value for this network.

Step 120 increments the fingerprint search pointer index to point at the next fingerprint to be processed. In the example, the next fingerprint to be processed would be on line 109 of FIG. 7. In alternative embodiments, before each fingerprint is used to collect attribute data and analyze it, configuration data is checked to make sure the fingerprint is "turned on", i.e., the system administrator wants new attribute data gathered about the element that corresponds to the fingerprint. In the claims, fingerprints that are "turned on" are referred to as "active". This functionality allows the system administrator to block gathering of attribute data about some or all elements. This can be done at every level of the hierarchical organization of fingerprints shown in FIG. 7 so that entire levels are blocked off or just some elements on certain levels are blocked off. In still other alternative embodiments, configuration data is used to turn fingerprints on or off and refresh schedule data is used to determine how often to collect the attribute data for each element. Each element can have its own refresh schedule. In this alternative embodiment, step 120 in FIG. 15 represents the process of picking another fingerprint which configuration data indicates is turned on and which the refresh schedule data indicates is ripe for another discovery effort. Thus, the process of FIG. 15 would be repeated until every "active" fingerprint which was ripe for processing had been processed.

The process described above to automatically gather attribute data and analyze it using fingerprint rules to determine the existence of the element is then repeated. In the example, the next fingerprint is for a network interface card. In gathering the attribute data for this type of element, the system would cycle through all the valid IP addresses of the network just found and send out a packet to each address to determine if a response was received. Each NIC which responds represents a device coupled to the network. Then, for each NIC that responds, the system wants to know the type of operating system the device is running and information about whether the device is a web server, has a super user and who that is, its memory size and CPU type, etc. To gather that information, each of the fingerprints on lines 111, 113, 115, 117, 119 and 131 of FIG. 7 is processed as described in FIG. 15 for each NIC that responds. That is the meaning of the indentation of lines 111, 113, 115, 117, 119 and 131 under the NIC fingerprint on line 109.

Figure 16A:
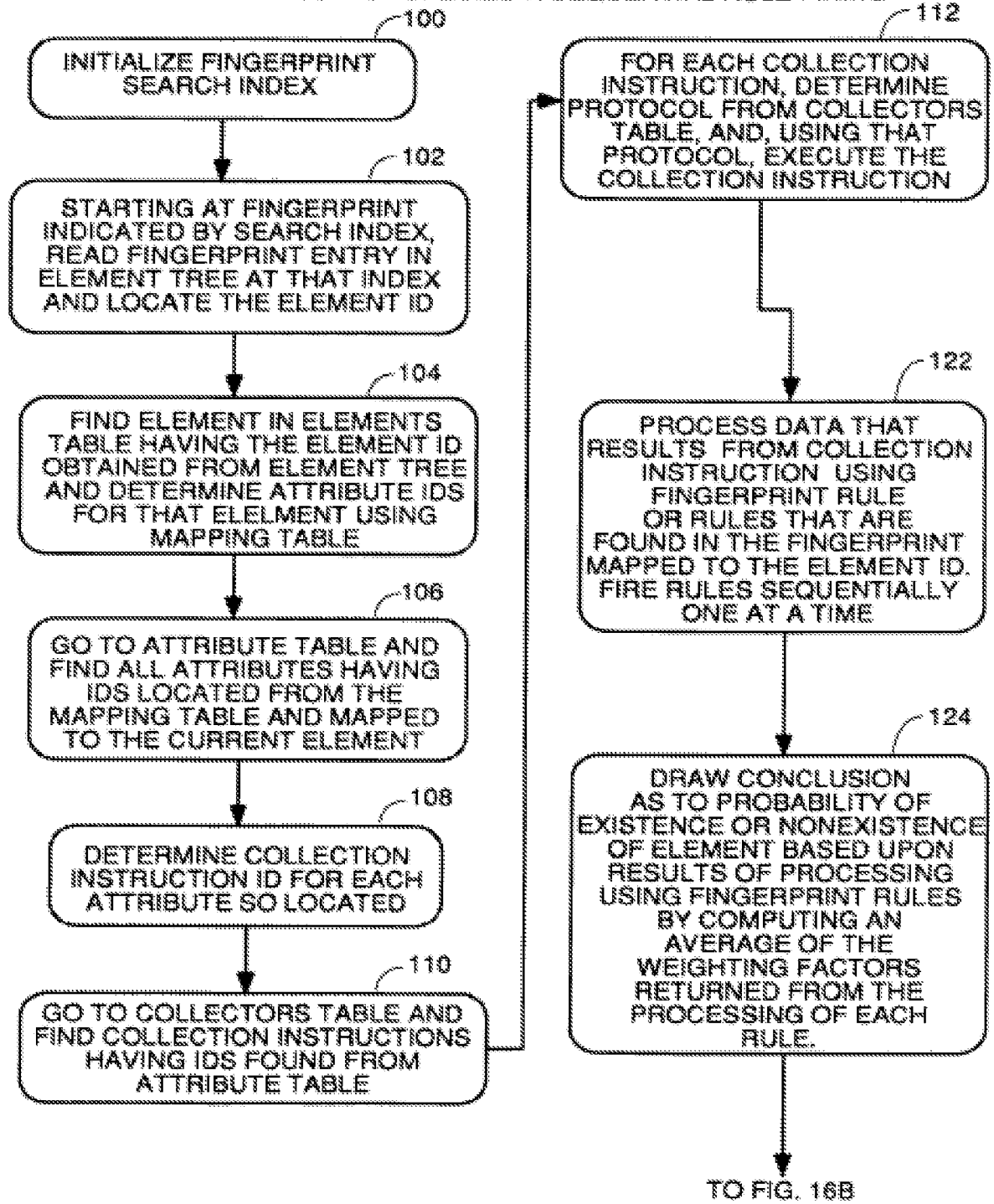
FIGS. 16A through 16B are a flowchart of a process to use fingerprints to automatically collect data using a sequential rule firing algorithm.
Figure 16B:
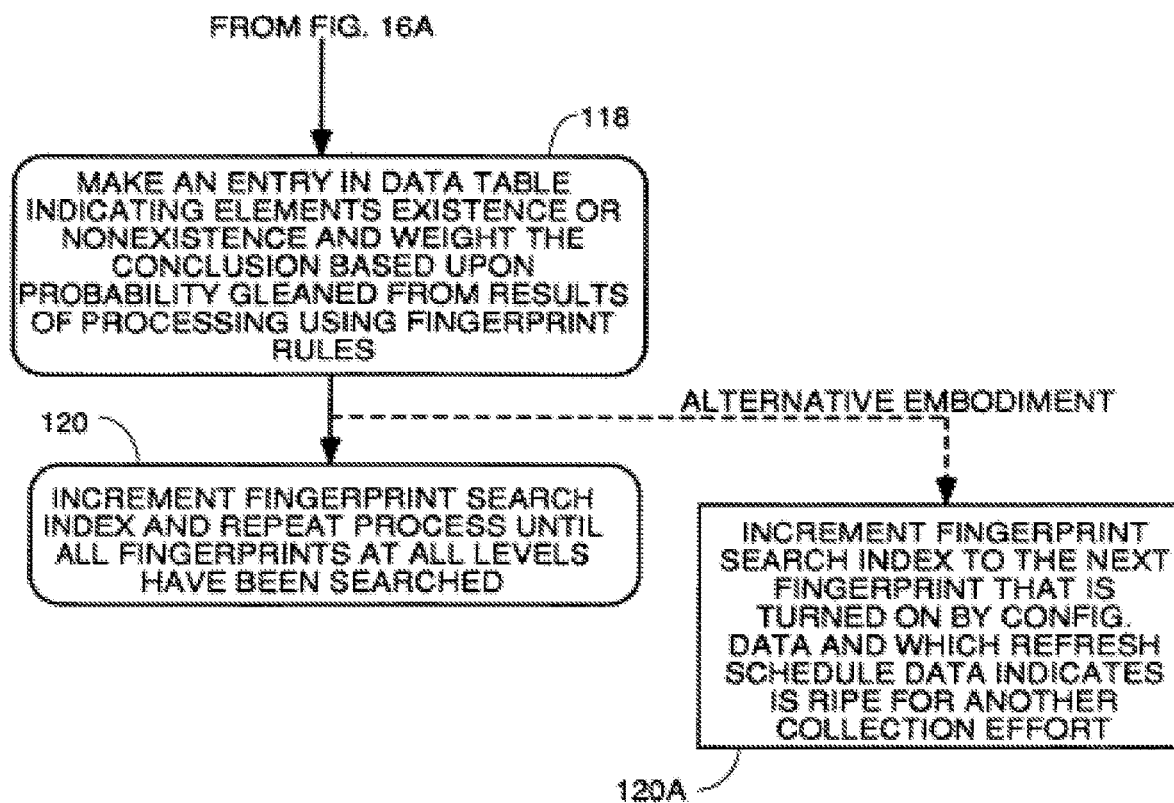

There are three different species or alternative embodiments regarding how fingerprint rules which are represented by the generic steps 114 and 116. The first is represented by the flowchart of FIGS. 16A and 16B. In this first alternative species, the one or more rules of the fingerprint are simply applied to the collected data sequentially, one at a time in step 122. A conclusion is then drawn as to the probability of the existence or nonexistence of the element by computing a running average of the weighting factors returned by application of each rule in step 124. The final weight computed from the averaging process is entered in the data table in a column not shown in step 118. All steps in FIGS. 16A and 16B having the same reference number as steps in FIG. 15 represent the same processing as they did in FIG. 15. The alternative species using configuration data to turn fingerprints on and off and refresh schedule data to control the interval between collection attempts of any fingerprints that are turned on is indicated by step 120A.

A weight of 100 means the element is definitely present. A final weight of 0 means the element is definitely not present. Any weight between these two extremes means there is some uncertainty as to the existence of the element or there was, for example, a partial installation in the case of a software application.

Figure 17A:
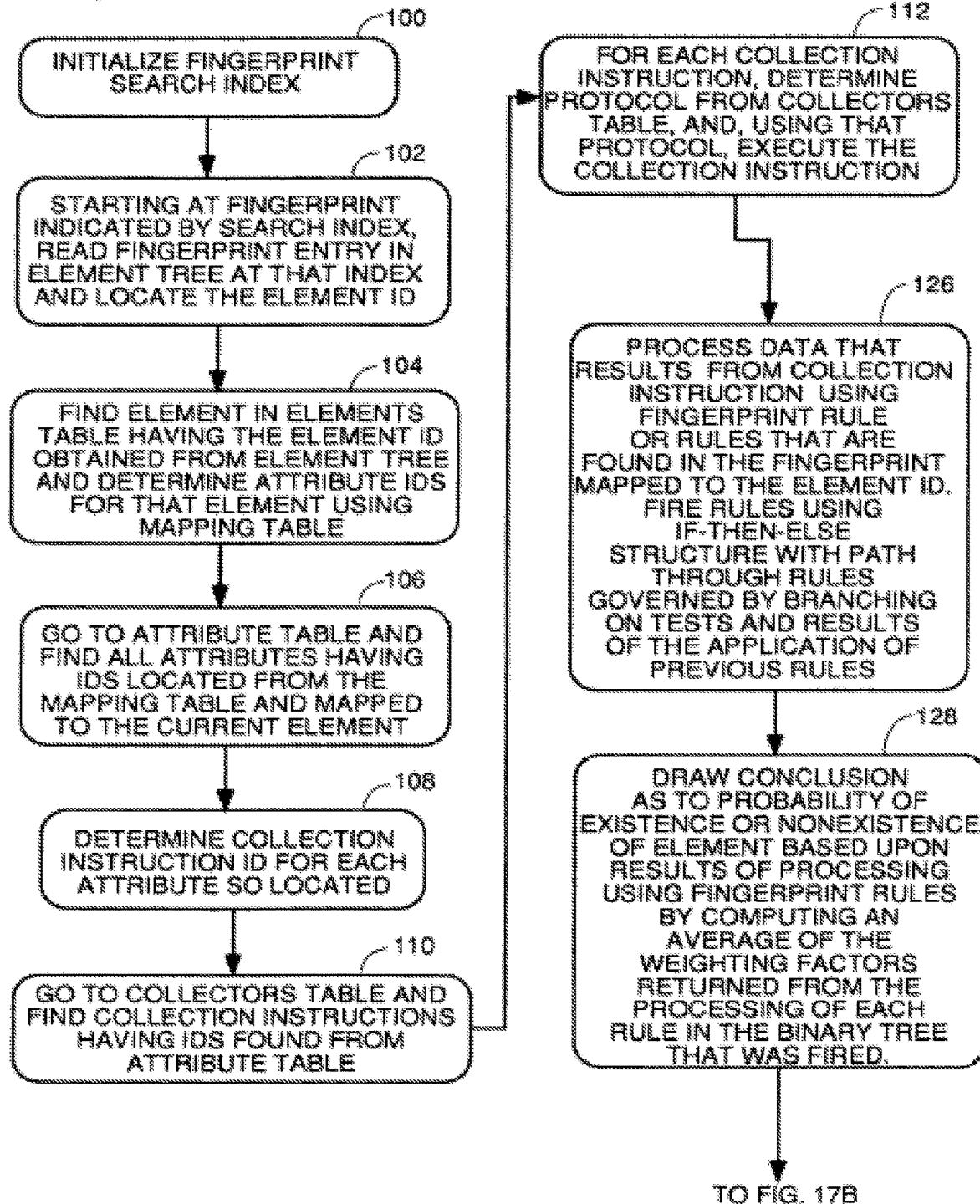
FIGS. 17A through 17B are a process to use fingerprints to automatically collect data using an if-then-else rule firing algorithm.
Figure 17B:
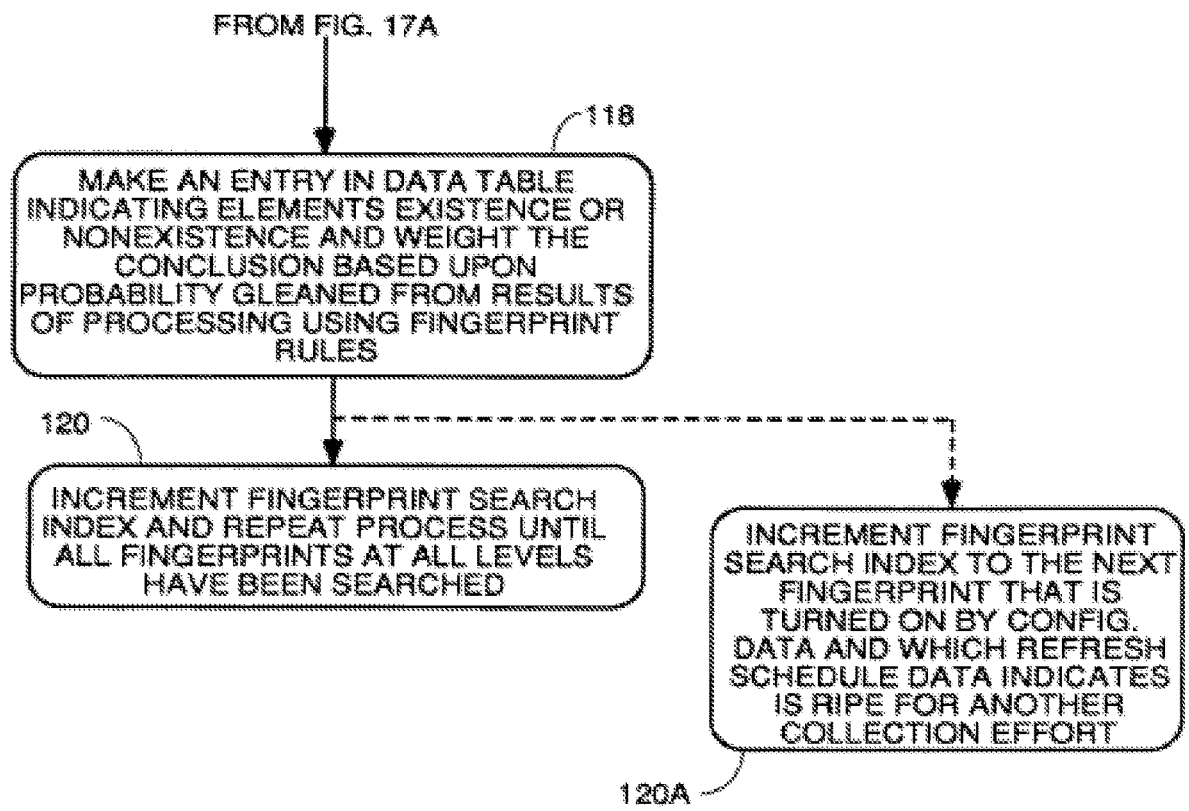

A second species represented by generic steps 114 and 116 in FIG. 15 is represented by the flowchart of FIGS. 17A and 17B. In this species, the fingerprint rules are fired in an IF-THEN-ELSE logical fashion in step 126. This means that if an element has multiple rules, the first rule will be applied to the collected attribute data, and then branching to either of two other rules will occur depending upon the results of application of the first rule to the gathered attribute data thereby defining a binary tree structure. The binary tree can have multiple levels. This selective branching based upon result can occur at every level of the tree. Step 128 represents the process of drawing a conclusion as to the probability of the existence or nonexistence of the element by computing an average of the weighting factors returned by whatever fingerprint rules in the binary tree that were fired. All other steps in the process are the same as in FIG. 15. The alternative species using configuration data to turn fingerprints on and off and refresh schedule data to control the interval between collection attempts of any fingerprints that are turned on is indicated by step 120A.

Figure 18A:
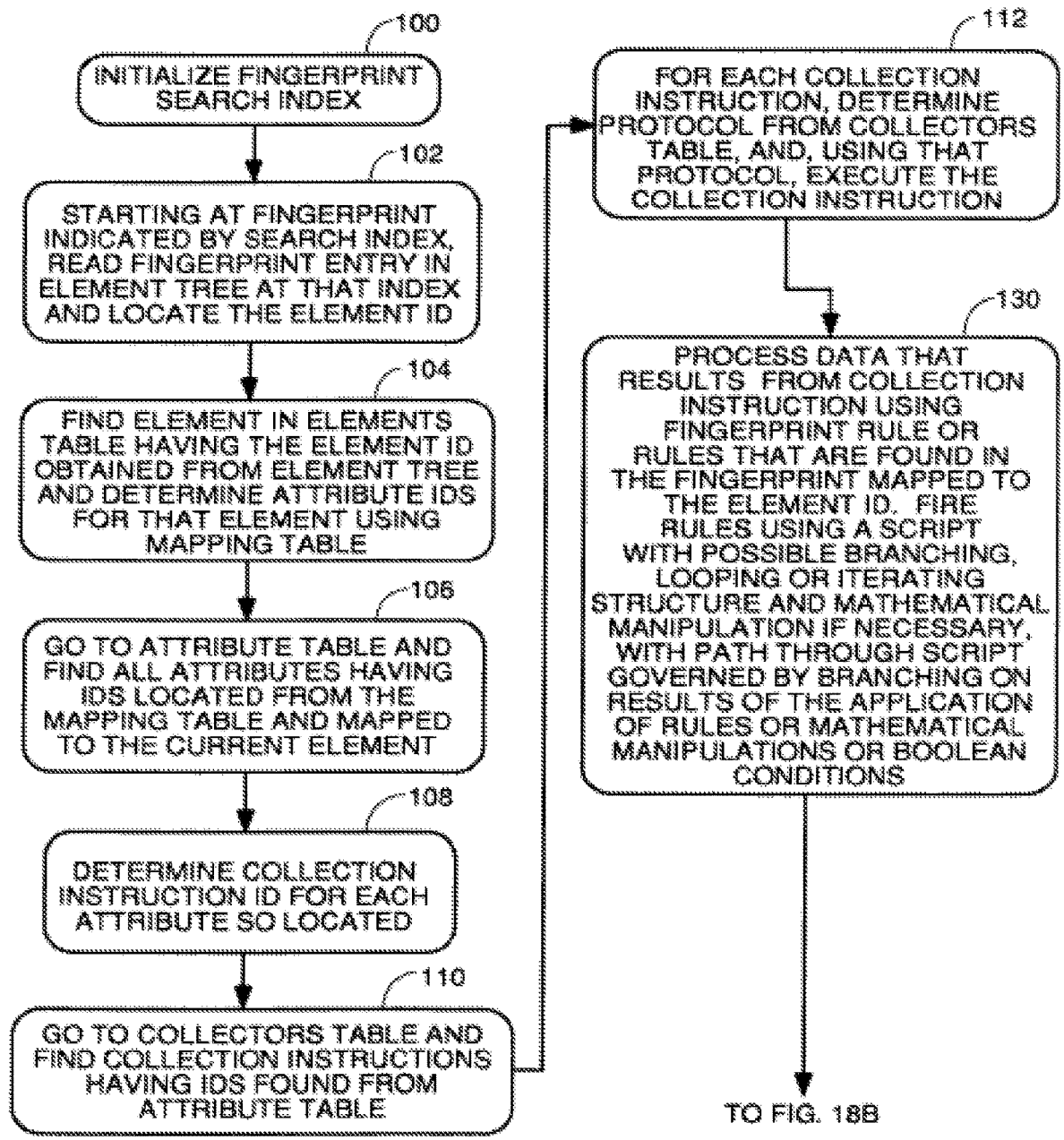
FIGS. 18A through 18B are a flowchart of a process to automatically collect data and categorize assets by firing rules and processing according to a script.
Figure 18B:
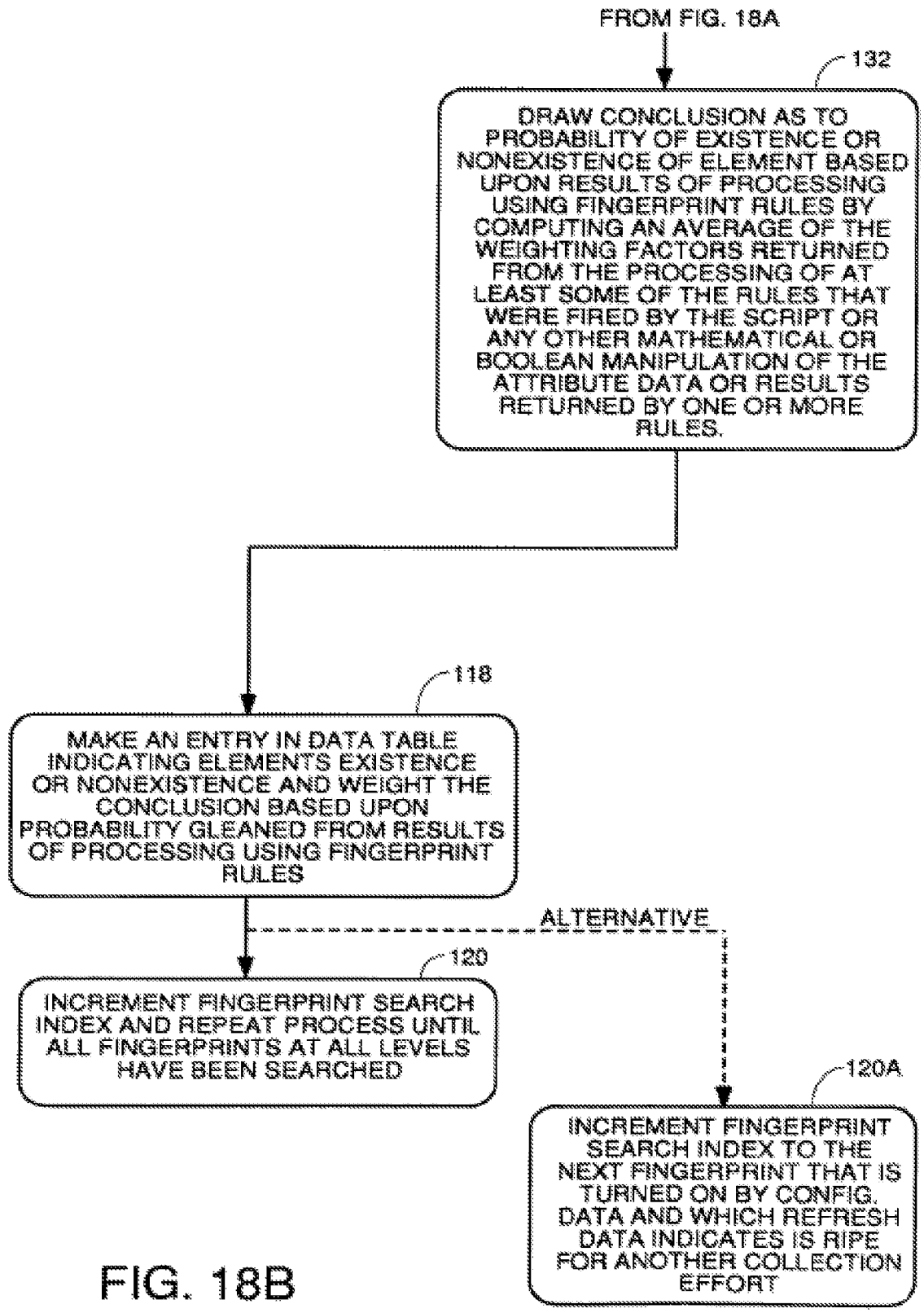

A third species represented by the generic steps 114 and 116 of FIG. 15 is represented by the flowchart of FIGS. 18A and 18B. This species uses a script such as a scripting language, initially Perl, to control the application of fingerprint rules to gathered attribute data, as represented by step 1. In this species, a script controls which rules are fired with branching or selection of the rules to be fired based upon the results of processing of other rules or mathematical manipulations of attribute data or mathematical manipulation of the results returned from the application of other fingerprint rules or upon Boolean conditions found in the attribute data or returned by the processing of other rules. The script can have looping, iteration, subroutines or any other known programming device and can any program structure and use any programming techniques required by the situation. Step 132 represents the process of drawing conclusions as to the probability of existence or nonexistence of a particular element. This can be done by computing an average of the weighting factors returned from the processing of at least some of the rules that were fired (or all of them) or by any other mathematical or Boolean manipulation of the attribute data and/or the results returned by application of one or more fingerprint rules. All other steps are the same as in FIG. 15. The alternative species using configuration data to turn fingerprints on and off and refresh schedule data to control the interval between collection attempts of any fingerprints that are turned on is indicated by step 120A.

Figure 19A:
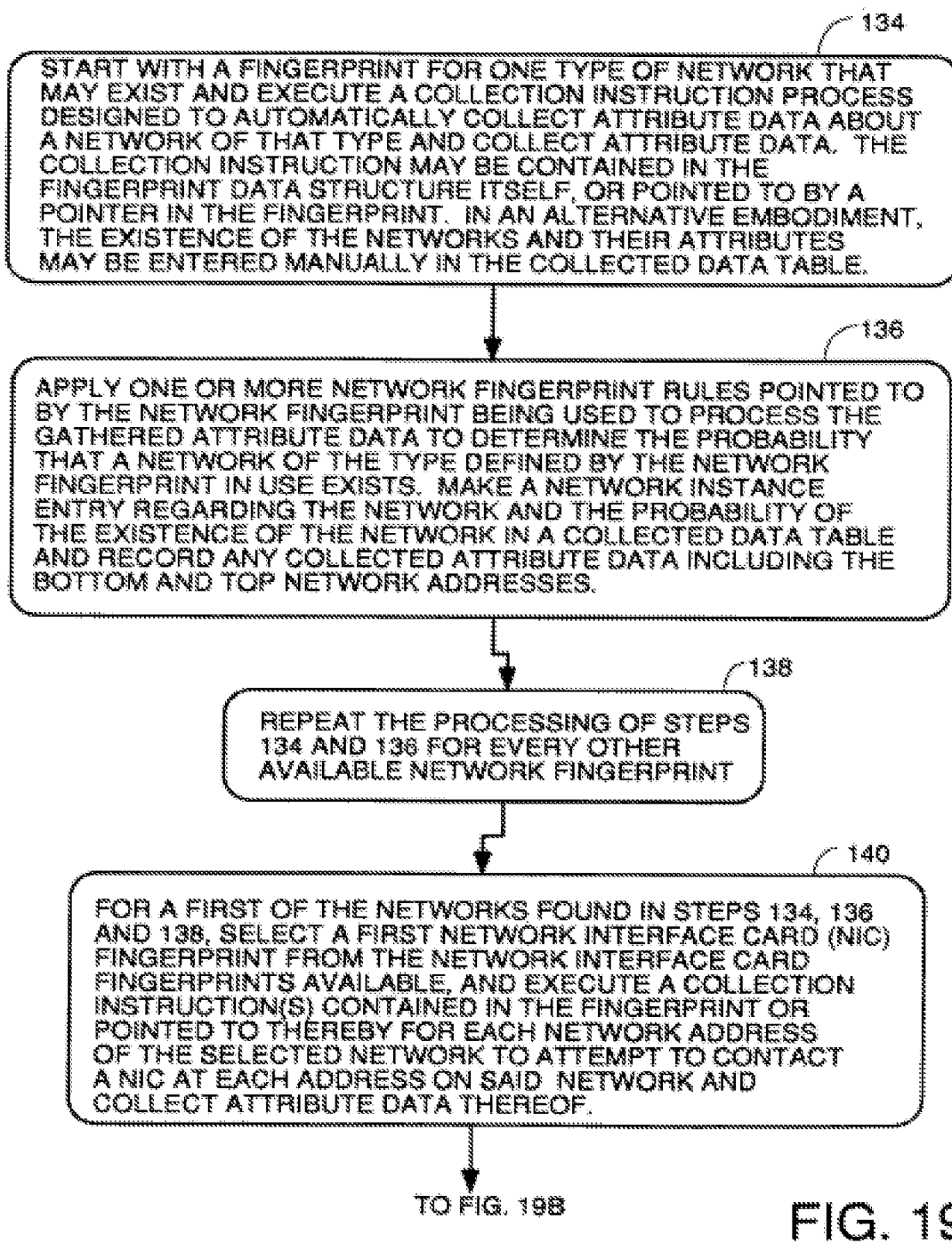
FIGS. 19A through 19C are a flowchart of a process to discover the assets in a system or designated portion of a system starting with no knowledge of the existence of any networks, servers or the operating systems thereof.
Figure 19B:
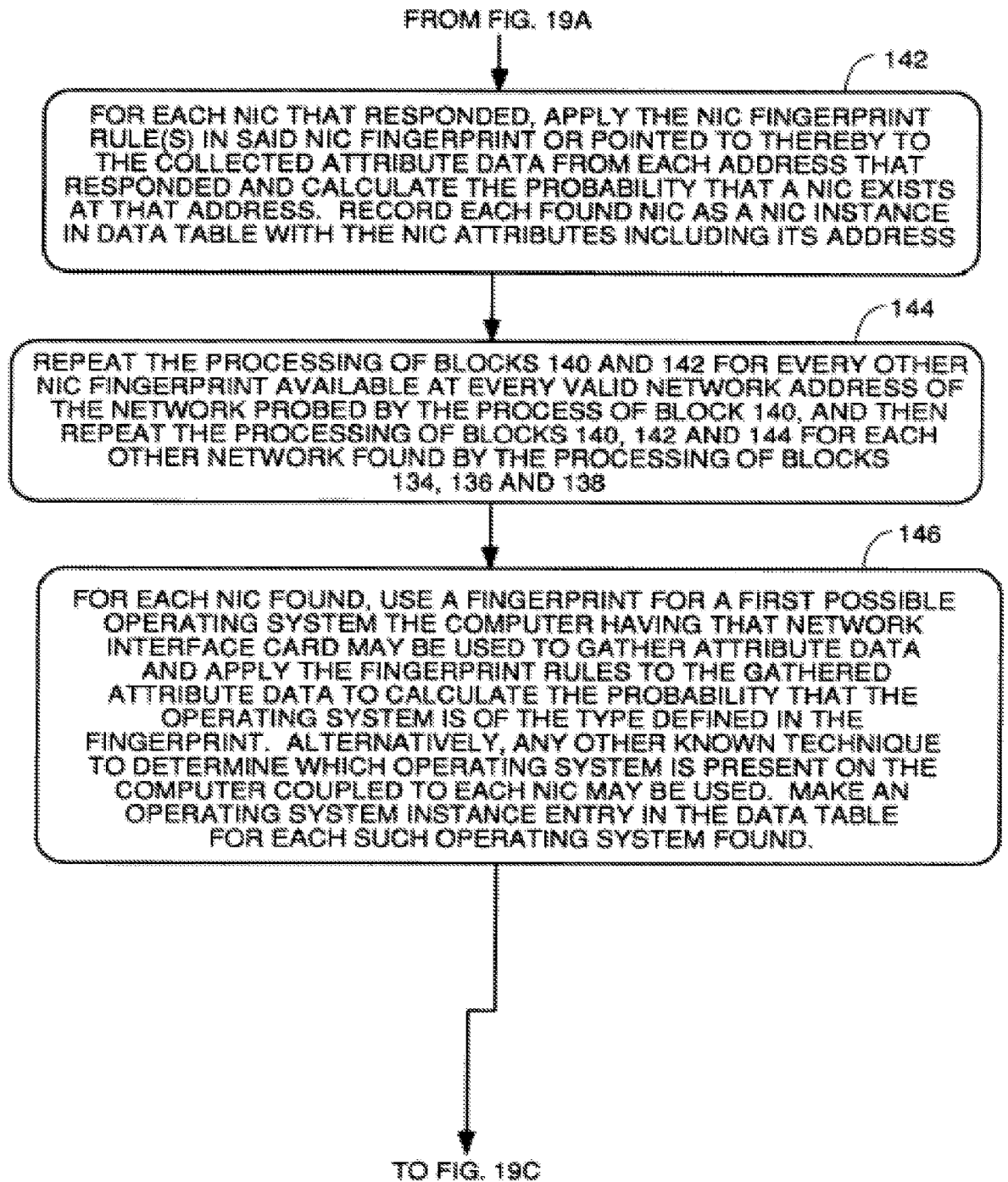

Referring to FIGS. 19A and 19B, there is shown an overview process diagram of an automated discovery process which allows the system of the invention to automatically discover and characterize the computer and software assets of a company or designated subset of computer and software assets without any prior knowledge of the networks or servers in a company. The process of FIGS. 19A and 19B uses fingerprints in a particular logical order selected to allow the assets of the company to be discovered without any pre knowledge about what or where those assets are. This allows automatic discovery of the existence of networks, which network addresses have network interface cards mapped thereto, the operating systems the computers having those network interface cards are executing and many different things that characterize each of the computers. Those things include, but are not limited to, the installed software, which software processes are in execution, CPU type, speed, memory, file system, etc.

FIGS. 19A and 19B represent the details of how to use fingerprints in a particular order to determine the assets in an organization, but the basic steps that define the genus of this automated discovery process are as follows. First, use one or more network fingerprints to determine the existence of one or more networks and gather data about them to determine the type and attributes of any discovered network and make an entry in the element and data tables. Second, using the valid addresses of each discovered network and one or more network interface card fingerprints, the system probes the discovered networks to discover all the network interface cards that exist on each discovered network and the attributes of each. Third, for each network interface card found, one or more fingerprints for the operating systems the automated attribute data collection process is capable of detecting are used to determine the operating system that is controlling each computer coupled to one of the found networks by one of the found network interface cards. An entry for each found operating system is then made in the element and data tables that record the type of operating system and its attributes. Fourth, for each found operating system, one or more fingerprints is used which define the attributes of one or more elements of interest and rules to process gathered attribute data to determine if an element exists and what it is. These fingerprints are used to gather attribute information about each element of interest via said operating system. Typically, this is done by invoking function calls of the operating system which, when executed, supply information about the existence and attributes of said one or more elements of interest. When the attribute data is gathered, an entry in a data table is made regarding each found element.

Figure 19C:
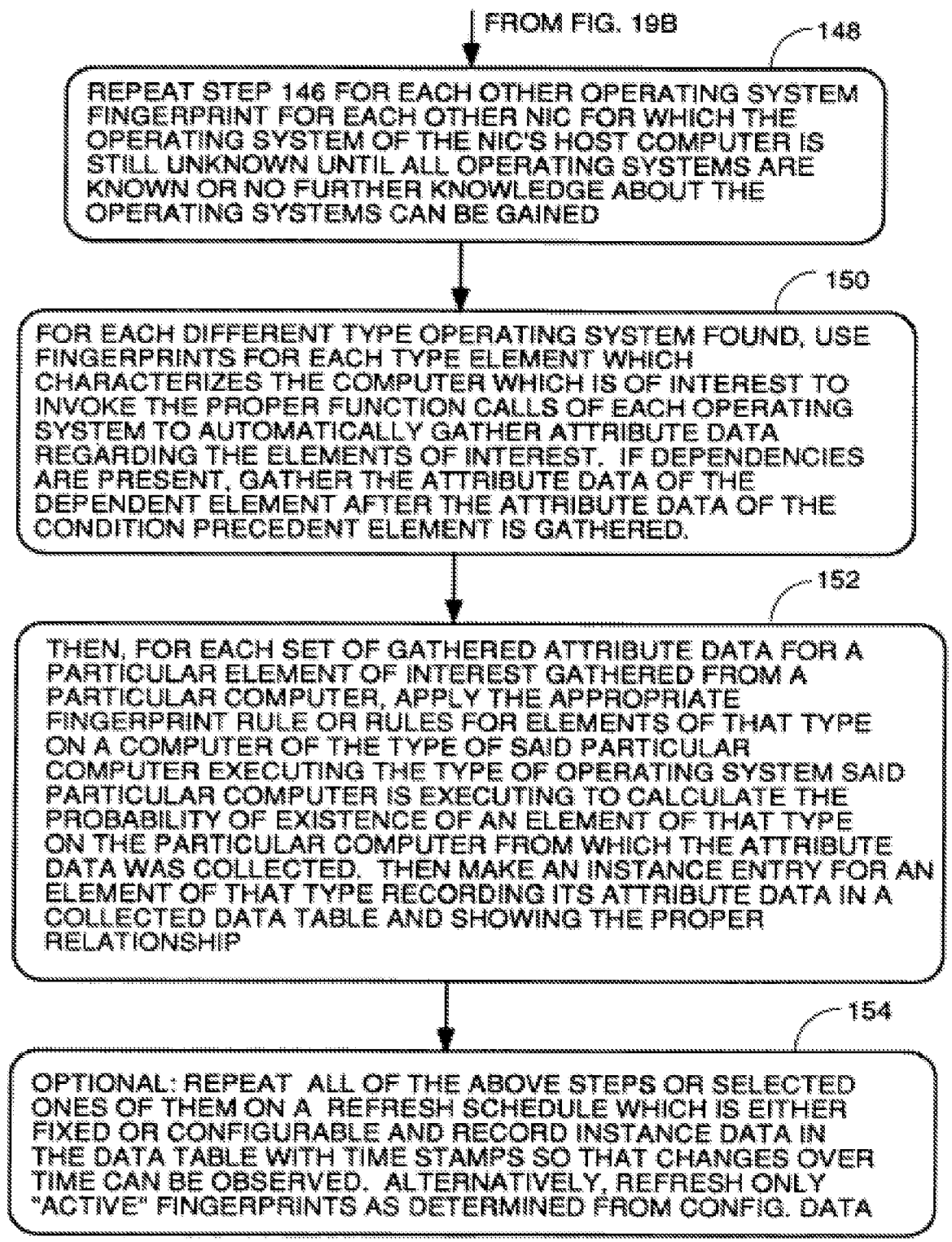

Turning to the exact details of the automated discovery process shown in FIGS. 19A through 19C, step 134 represents the step of starting with a fingerprint for one of the one or more different types of networks and executing collection instructions. These collection instructions are either in the network fingerprint or are found by following a pointer in the fingerprint to the collection instruction. The collection instruction automatically collects attribute data or at least attempts to do so. Sometimes the network will not respond to the collection attempts orchestrated by the fingerprint. That happens when the network fingerprint selected does not match the actual network in existence. This can happen when the type of network installed is unknown in the fully automatic process and a fingerprint is chosen at random from among all the network fingerprints available. In this case, the absence of attribute data will be recorded.

In the preferred embodiment, step 134 is accomplished by starting with one fingerprint for a potential network of a certain type and following a pointer in the network fingerprint to a collection instruction to gather attribute data for that type of network. The fingerprints corresponding to each element ID are stored in the table of FIG. 12. The collection instruction for each fingerprint is stored in the table of FIG. 13. The table of FIGS. 10A and 10B maps each element ID to the ID of a collector instruction and to the fingerprint for the element. Step 134 represents executing that collection instruction and gathering attribute data if possible.

In alternative embodiments, the existence of the networks and their attributes may be entered by hand in the collected data table since it is easy to do this.

In step 136, the rules in the network fingerprint used in step 134 are applied to the gathered attribute data, if any, to determine whether a network of the type defined by the network fingerprint exists. If so, the found network is recorded as a network instance in the elements table such as are illustrated in FIG. 5 or FIG. 14. The attributes of the found network including its top and bottom IP addresses are recorded in the collected data table. This has the effect of creating a map in the elements table of the networks that exist.

In step 138, the process of steps 134 and 136 is repeated using each of the other available network fingerprints to determine if any other networks are present, and, if so, to collect attribute data for these other networks.

For every network found, step 140 represents the process of selecting a fingerprint for one of the possible network interface cards (NICs) that may be coupled to the found network(s) to gather information about any NICs coupled to each network. This is done, on each network, by executing a collection instruction in the NIC fingerprint or pointed to by it for each of the network's valid addresses to attempt to contact a NIC at each address and gather attribute data about it. In the preferred embodiment, this is done by following a pointer in the fingerprint to the collection instruction. This phrase "following a pointer in the fingerprint to a collection instruction" or words to that effect includes using the element ID as a pointer in the fingerprint table to the fingerprint and also as a pointer to the collection instruction for that fingerprint in the collectors table of FIG. 13. The collection instruction is performed once for each valid address of each network. This constitutes an attempt to contact a NIC at that address in a language it understands.

As symbolized by step 144, this execution of a collection instruction is done at every address on the network being processed for which the NIC type is unknown using every NIC fingerprint until one of the fingerprints works or one runs out of NIC fingerprints and a conclusion can be drawn. That conclusion is that either there is no NIC at that address or it is not a type of NIC for which a fingerprint has been defined. Once a NIC has been found at a particular address, no further fingerprints need be used on that address, and processing can move to the next address until all addresses of the network have been processed. Then, as represented by step 144, all the addresses of all the other known networks are similarly processed to find the NICs assigned thereto or draw the conclusion that no NIC at all or a foreign NIC for which there is no fingerprint is assigned to certain addresses.

Once the NIC fingerprint that works, if any, is found, the collection instructions pointed to by that NIC fingerprint are used to gather attribute data about the NIC at that address. This process is repeated at each address upon which a NIC is found. In other words, as symbolized by steps 144, this attribute data collecting process is repeated at every valid address of every network to find all the NICs. The whole process can be done one network at a time or in parallel using multiple data collector processes working simultaneously.

Step 142 represents the process wherein the rule or rules in the NIC fingerprint currently being processed are applied to the gathered attribute data to calculate the probability that a NIC instance exists at the address being processed. For each found NIC, a NIC element instance with all the attributes of the NIC is recorded in the elements and collected data tables. As symbolized by step 144, the process of applying the appropriate NIC fingerprint rules to attribute data collected for each address which responds, is repeated for every address of every network until all NICs are found.

For each NIC that is found, processing represented by step 146 determines what type of operating system the device having the NIC is executing. This can be done in several known ways such as by sending a specific type of network packet to the unknown machine at the network address. This network packet has a defined or undefined response packet. Each operating system deals with arrival of such a packet differently. By examining the response packet, it is possible to determine which type of operating system the unknown machine is running.

Alternatively, the fingerprint for each different possible type of operating system and version can be used to point to a collection instruction list which controls a data collector process to attempt to invoke a particular function call of a programmatic interface (API), a service, utility, or program of the operating system. Each operating system has a different set of APIs, services, utilities and programs. If the operating system responds to the attempt to invoke a particular function call of an API for a known type of operating system, then the operating system must be of that type since all other operating systems would not respond or would respond in a different or unexpected manner. Thus, by trial and error elimination, the type of operating system can be determined using fingerprints in one of the species represented by step 146.

Once the type of operating system is determined, the proper fingerprint for that type operating system can be used to gather more attribute data that defines the operating system itself, and the appropriate operating system fingerprint rules can be applied to the gathered attribute data to calculate the probability that the operating system exists and is of the type the fingerprint being used defines, as symbolized by step 146. Once the operating system type has been determined and its attribute data gathered, an operating system instance entry is made in the element table to indicate that device X is running operating system Y where X is the particular device host name and Y is the type of operating system, as symbolized by step 146.

Then, step 146 is repeated for every NIC that responded to determine the operating system of every computer on the network, as symbolized by step 148.

Now that the operating system is known for every device on all the networks (unless a rogue operating system or version of an operating system with no fingerprint is present), many different things of interest about each device can be determined by invoking the proper function calls of various APIs, services, utilities, or programs of the operating system. These things include but are not limited to: whether it is a web server; who its super user is; the super user password; how much memory it has; what type CPU it has and the speed thereof; what type of file system(s) it has and which file system is mounted; the files that are in the file system; what software packages are installed on the computer; and, which software processes are in execution at any particular time. Assuming there is a fingerprint for each of these things and there is a way to obtain this data about each device, each of these things may be determined by using a fingerprint for an element of that type.

The fingerprints for these other elements of interest can be used in any order, but sometimes there are dependencies built into the fingerprints. This means that attribute data about one element cannot be gathered until the attributes of another fingerprint have been gathered. For example, sometimes attribute data about a child element cannot be gathered until the attribute data for a parent element has been gathered. If an element has a dependency, in the preferred embodiment, this fact will cause its attributes to not be gathered if the element upon which it is dependent has not had its attributes gathered. However, in the preferred embodiment, there is a refresh table which governs the frequency at which each fingerprint is used, so if the element with the dependency has had its dependency condition satisfied the next time the fingerprint for the element is scheduled to be used, the attributes will be gathered at that time. In alternative embodiments, whenever the parent element, or whatever other element is a condition precedent to gathering the attributes of the element in question, has its attributes gathered, that will automatically trigger gathering of attributes of all other elements which are dependent upon it.

The fingerprint that is used to determine each element may be, and usually is, unique to the particular type of operating system. For example, the fingerprint to determine CPU type and CPU speed is usually different as between an IBM server running AIX and a Sun server running Solaris 2.7. This is because at least the collection instructions are different. However, collection instructions may be shared between different fingerprints for the same element to be gathered from different operating systems or different versions of the same operating system. For example, if the function call that needs to be invoked to determine the amount of memory is the same on an HP UNIX machine and a Sun Solaris 2.7 machine, the memory fingerprint collection instruction for these two different type machines can be identical.

Step 150 represents the process of running the various fingerprints for the different things about the machine that are of interest once the operating system type is known. Step 150 represents this process generically, and the different species mentioned above to handle dependencies are all symbolized by step 150. To gather attribute data, the collection instruction associated with each fingerprint is executed and attribute data is collected about each element. An entry is then made in the collected data table for each element that includes the elements attributes data and, in some embodiments, the probability or confidence level that it exists. In some embodiments, the instance entry in the element table is only made for elements where the probability or confidence level is above a certain level, which can be configurable in some embodiments. Step 152 represents this processing.

The instance entry in the element table is entered in such a way to show the relationship to any parent elements or supersystems of which the element is a subsystem. For example, referring to FIG. 7, the NIC entry on line 129 is shown as indented to indicated there is some data structure to indicate that this NIC is coupled to the network corresponding to the data entry on line 127. Likewise, the data entry on line 131 indicates that the computer owning the NIC corresponding to the data entry on line 129 is running a Solaris 2.7 operating system. Likewise, the data entries on lines 133, 135 and 137 all are structured to indicate they are elements of the computer running the Solaris 2.7 operating system memorialized on line 131 and coupled to the network memorialized on line 127 by the NIC memorialized on line 129.

Step 154 represents the alternative embodiments of the process where all the steps 134 to 152 are repeated at a frequency defined by a refresh interval which is either fixed or configurable and wherein each entry for an element in the collected data table is time stamped so the changes in the attribute data for each element over time can be observed. Step 154 also represents the alternative embodiments where each fingerprint has its own configurable or fixed refresh schedule. Step 154 also represents the alternative embodiments wherein prior to using any fingerprint, configuration data is checked to make sure the fingerprint is "active" and only using the fingerprints that are marked as "active" to collect and analyze data.

In some embodiments, the discovery process of FIG. 19 will be performed completely the first time to discover all or a designated subset of networks, NICs, operating systems and all the other elements then existing in the system. After that is done, the fingerprints marked as active by configuration data may be used repeatedly according to refresh schedule data in a refresh table and collection calendar. Fingerprints may applied as the result of a user action. Collected attribute data is then analyzed with the fingerprint rules, and entries are made in the collected data table having timestamps so that how attribute data changes over time can be observed.

Process of the Financial Linkage Invention

Figure 20A:
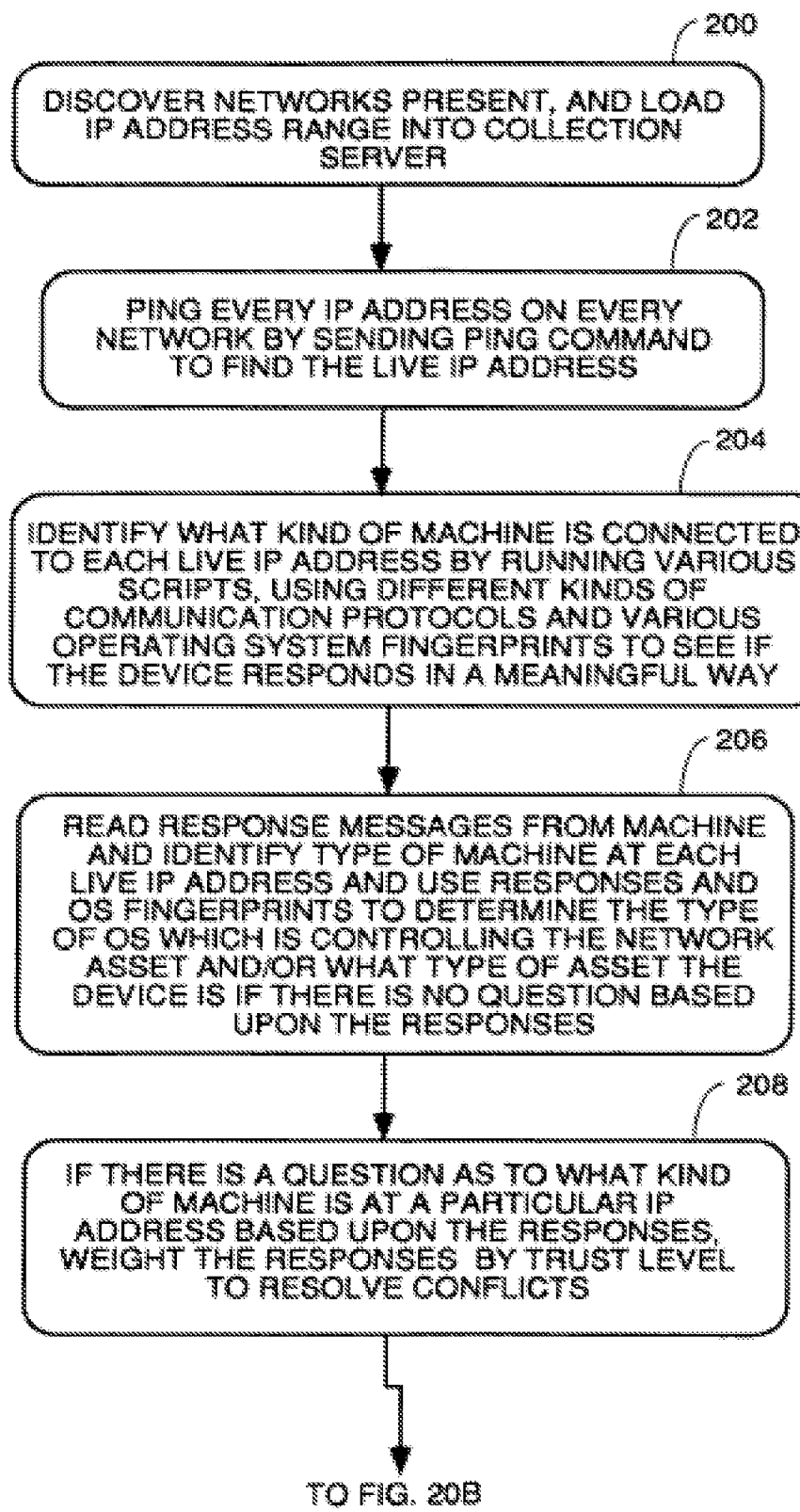
FIG. 20, comprised of FIGS. 20A, 20B and 20C, are a flowchart of the process of collecting data from the financial reporting system and the automatic discovery process of inventory of assets on the networks and reconciling them and creating linkage rules.
Figure 20B:
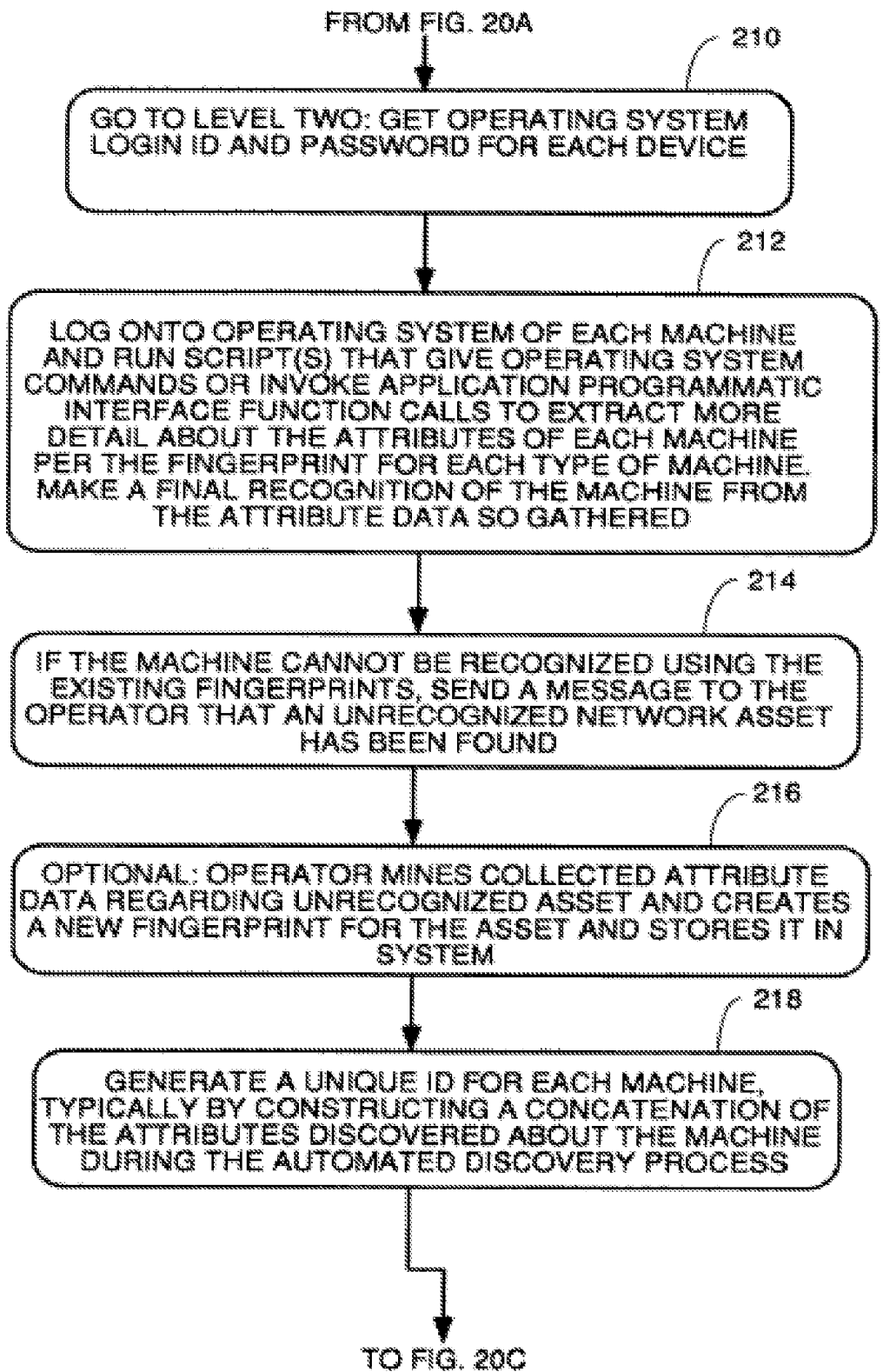
Figure 20C:
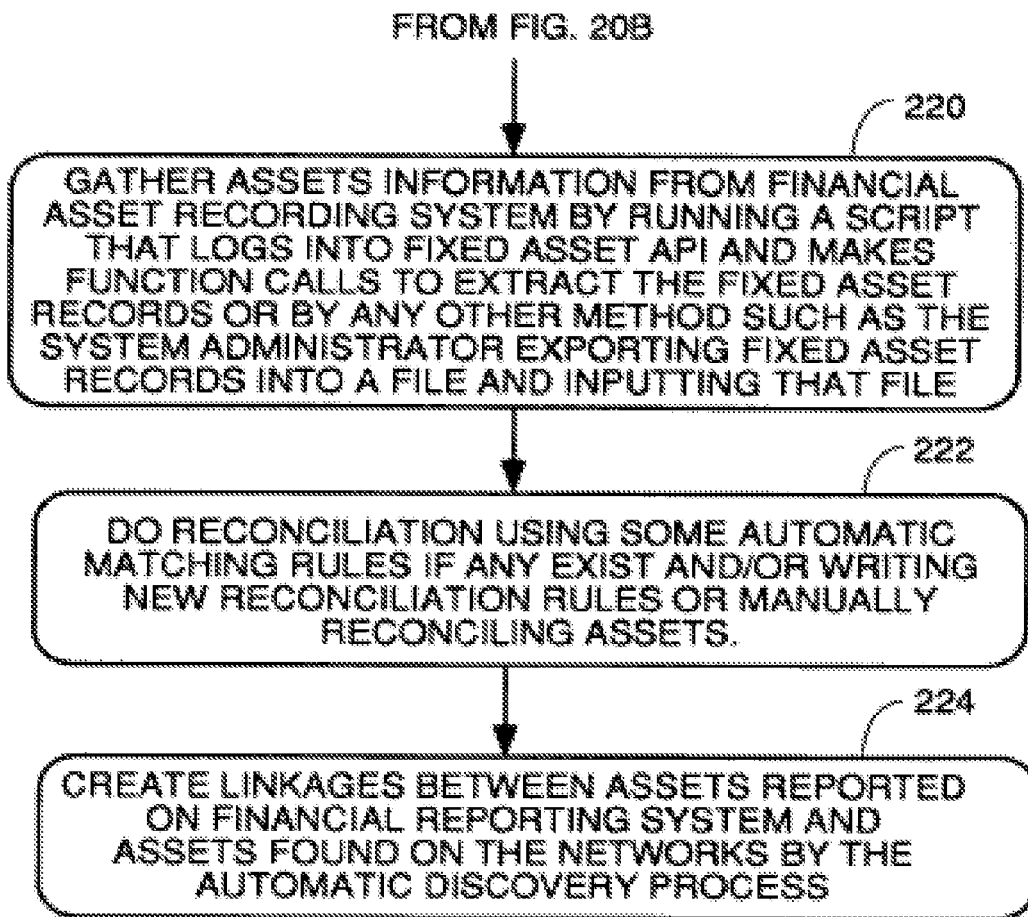

Referring to FIG. 20, comprised of FIGS. 20A and 20B, there is shown an overview flow diagram of the preferred process of the invention to automatically gather data about the assets (elements) on a company's networks, assign them unique IDs and gather information about what assets are carried on a company's books and reconcile them with the assets found on the networks. Step 200 represents the process described above of following the scripts to discover the number and types of networks a company has, and then loading an Internet Protocol IP address range into the collection server. This IP address range will be the range of IP addresses that encompasses the company's network or networks. The reason this IP address range is loaded is so that the IP addresses in the range can be pinged to determine which addresses are active with some network asset behind it. Step 202 is the process of pinging every IP address in the range to determine which IP addresses respond in a meaningful way indicating a network asset with a network interface card is present. A ping is a known command packet in the network protocol world. If a device at an IP address is live, it will respond with a certain pattern. If a device at an IP address is not active, it will respond with a different pattern. This process represents using the valid addresses of each discovered network and one or more network interface card fingerprints, the system probes the discovered networks to discover all the network interface cards that exist on each discovered network and the attributes of each.

Step 204 represents the process of determining what kind of machine is present at each live IP address using different fingerprints, collection instructions or scripts and different communication protocols such as SNMP, FTP, NMAP, SMTP, etc. For each network interface card found, one or more fingerprints for the operating systems the automated attribute data collection process is capable of detecting are used to determine the operating system that is controlling each network asset coupled to one of the found networks by one of the found network interface cards. An entry for each found operating system is then made in the element and data tables that record the type of operating system and its attributes. This process entails running various attribute collection scripts and using various communication protocols and operating system fingerprints and monitoring any responses from the device to determine which fingerprint and script elicited a meaningful response (one that indicates the presence of attributes identified in a fingerprint as present if an OS is a particular kind of OS). A meaningful response to a particular script and fingerprint means the operating system type and manufacturer has been identified for the network asset at that IP address.

Step 206 represents comparing the responses received to the OS fingerprints to determine the type of OS present on each network asset found at a live IP address. One way of doing this is to examine the responses to the different types of communication protocols. For example if one gets a first type response to an SMTP protocol inquiry and a second type of response to an FTP query, a third type of response to an SNMP query and fourth type of response to an NMAP query, then a conclusion can be drawn, for example, that the device is a Cisco router. It may only be possible to determine what type of operating system is present, but in some cases, the type of device also may be determined.

Step 208 represents the process of determining if there is any conflict as to what a machine is based upon the responses it provides and resolving the conflict based upon a weighting scheme. Sometimes it happens that a network asset will give a response to an SNMP (or other protocol) inquiry which will lead to one conclusion about what type of machine it is and will give a response to an NMAP or SMTP inquiry (or other protocol) which will lead to a different conclusion as to what kind of a machine it is. In such a case, the conflict is resolved by using a weighting procedure. For example, there may be a rule that a response to an SNMP inquiry is deemed more trustworthy than a response to an NMAP inquiry or some other similar type rule. In such a case, the weighting procedure weights the conclusion drawn from each response to an inquiry using a particular protocol and then draws a conclusion as to what type of machine gave the responses based upon these weighted conclusions.

If there is a conflict between the conclusions suggested by the responses, the weighting procedure can resolve it automatically.

Step 210 represents doing a level two scan. In a level two scan, a user name and password for each machine about which more information is desired is established. The user name and password can be newly established or pre-existing ones can be assigned for use by the automatic attribute data collection system. The automatic data collection system then uses these user names and passwords to log onto each machine and extract attribute data. This is done using collection instructions for each different type of attribute which cause the automatic data collection system to log onto a machine using the proper protocol, user name and password and give one or more commands that invoke function calls of application programmatic interfaces provided by the operating system. Invocation of these function calls cause the operating system to return various attributes about the machine such as how many CPUs it has, the operating system version, how many hard disks it has, their size and manufacturer, the amount of memory it has, which application programs are present on the machine, etc. The list of attributes which may be elicited is large and it is information about these attributes which can be used to create a unique identity for every machine.

This process of invoking the function calls of the OS APIs of each machine to extract attribute data is represented by step 212. If a machine type (element) has not yet been recognized, all the scripts from all the fingerprints can be executed to see to which function calls the machine responds. By which function calls to which the machine responds, the type of machine can be determined. In other words, when a particular fingerprint works, the machine is of the type for which the fingerprint was written.

If a fingerprint for a particular type of network asset did not exist in the system before it was installed on the customer's network, and the customer has one of those types of assets on his network, the system will find the network asset, but it will be unrecognized. It will be found because it will respond to a ping with its network interface card. And its operating system will probably be recognized since there are not that many operating systems and fingerprints for most if not all of them exist. However, new machines are being developed every day, and if one of them gets installed on the network, it will not be recognized. Step 214 recognizes this possibility and, when a machine is known to be on a customer's network but its type is uncertain, step 214 puts the machine on a list of unrecognized machine types for the operator to peruse. Step 216 represents the optional process of manually mining the collected attribute data on an unrecognized machine and trying to recognize what type of machine it is. The operator may create a new fingerprint for the machine from the attribute data so collected, and that new fingerprint can then be stored for future use in the automated attribute data collection system to recognize other instances of the same type machine or recognize the particular machine at issue again on a subsequent scan.

Step 218 represents the process of generating a unique ID for each machine on the network. Typically, this is done by doing a level 2 scan of each machine known to be on the network and collecting a large number of attributes about it. Then a unique ID is generated for that machine by doing an intelligent concatenation of the attributes discovered so as to provide a unique ID that will not match any other ID in the customer's networks but which is still tolerant to changes such as operating system upgrades, hard disk or motherboard replacements, etc. A summarization of the preferred process to generate this unique ID if found below under the heading SUMMARY OF UNIQUE ID GENERATION PROCESS. More details about the process are found in the section below under the heading DETAILS OF AUTOMATIC GENERATION OF UNIQUE ID FOR EVERY NETWORK ASSET. Any way of generating a unique ID will suffice to practice the invention, but the preferred process generates this unique ID for each asset in such a way that it is tolerant of change. In other words, the unique ID is flexible enough that the machine will still be recognized when the operating system has been upgraded or the hard disk or motherboard has been replaced.

Step 220 represents the process of gathering asset information from the financial asset recording system. This is done by running a script that logs onto the flexed asset application programmatic interface and makes function calls to extract the fixed asset records. The assets carried on the financial records of the corporation may also be extracted by any other method such as the system administrator exporting the fixed asset records of the financial records system into a file and importing that file into the system of the invention.

The next step of the process is represented by block 222. This step does reconciliation between the assets discovered by the automatic asset discovery process and the assets just imported from the financial reporting system. This reconciliation can also be done manually or by a combination of both manual reconciliation and some reconciliation done by automatic matching rules. Typically, the reconciliation is done first using automatic matching rules. Then, whatever assets that are left over after that process is accomplished can be manually examined and the list of automatically discovered assets and their attributes compared to the list of assets imported from the financial reporting system. The automatic asset matching rules are manually written in advance to match assets which have the same attributes or a subset of one or more attributes which matches. The rules can be anything that works to make matches based upon attributes between assets discovered on the network by the automatic asset discovery process and assets imported from the financial reporting system. The automatic matching rules may not be able to reconcile all assets. In such a case, the attributes of assets discovered on the network can be displayed and compared to attributes carried in the financial reporting system for the assets imported therefrom. Whenever a match is made, another rule is made that links the two systems (the asset found on the network by the automatic discovery process to the asset found in the financial reporting system) together for all time so that on subsequent scans, if these two systems are found again, they will be reconciled as the same asset. The process of creating these linkages is represented by step 224. Typically this is done by making a table entry for each match relating the asset's description in the financial reporting system to the same asset's description and attributes in the list of inventory assets discovered by the automated discovery process.

The manual reconciliation process can be done using data from purchase requisitions, purchase orders, receipts, invoices, fixed asset entries on the financial reporting system, and entries in the IT asset tracking system as well as the attribute data automatically collected using the discovery process.

Figure 21:
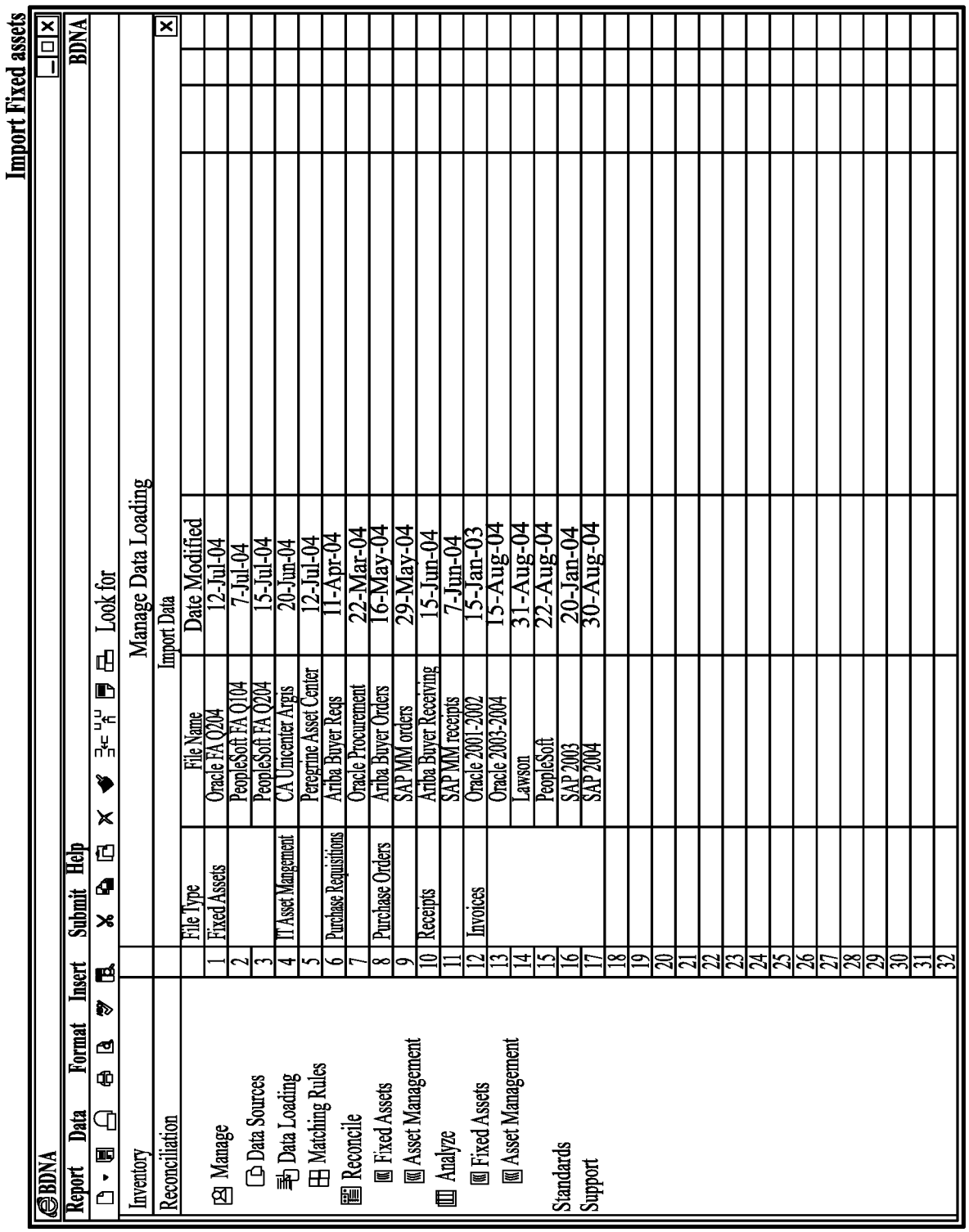
FIG. 21 is a screen shot of a typical starting point in the system of the invention after the assets on the client's networks have been automatically discovered (the so called "inventory" assets) and some fixed assets have been entered into the system manually. It also shows some assets which have been entered using entries in the IT asset management system, from purchase requisitions, purchase orders, receipts and invoices.

FIG. 21 is a screen shot of a typical starting point in the system of the invention after the assets on the client's networks have been automatically discovered (the so called "inventory" assets) and some fixed assets have been entered into the system manually. It also shows some assets which have been entered using entries in the IT asset management system, from purchase requisitions, purchase orders, receipts and invoices.

FIG. 22 is a screen shot of a typical list of fixed assets imported from the financial systems of a corporation into the asset reconciliation and linkage system the processing of which is shown in the flowchart of FIG. 20. The fixed assets shown in FIG. 21 are only a small percentage of the fixed assets the corporation owns. After importing the rest of the fixed assets from the financial systems of the corporation, the fixed asset list looks like that shown in FIG. 22. Typical data that is imported from the financial systems of the corporation are the date of acquisition (column 226), the catalog number or asset number assigned by the financial system of the corporation (column 228), the net book value (column 230), the total cost of the asset (column 232), the serial number of the asset (column 234), the text description of the asset carried in the financial system (column 236), the vendor of the asset (column 238), and the department in which the asset is located (column 240). Some minor description of attributes of the asset such as clock speed may also be included in column 236.

Figure 23:
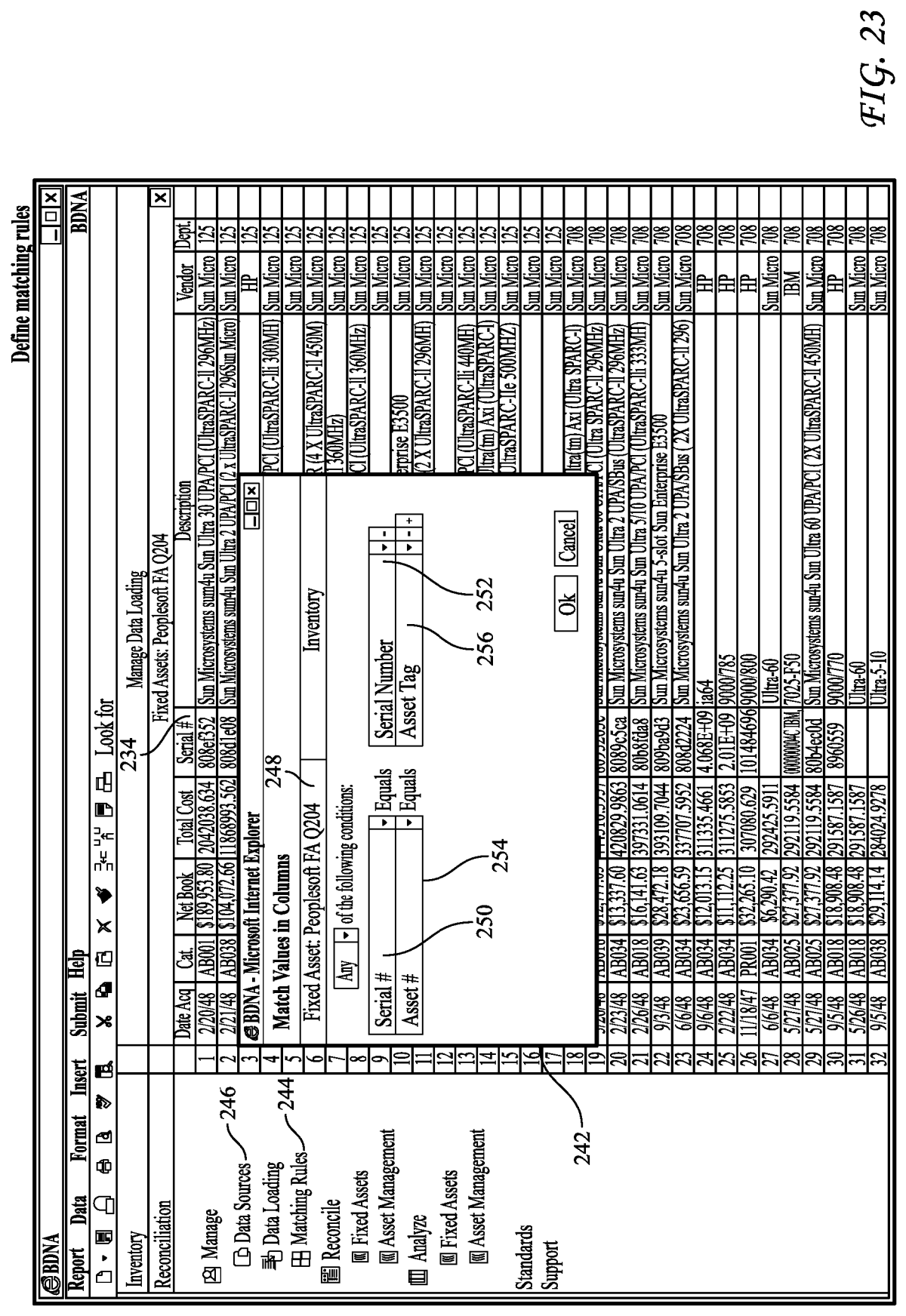

FIG. 23 is a screen shot of a rule definition screen where automatic matching rules can be defined by an operator to match fixed assets imported from the financial reporting system to "inventory" assets found on the networks by the automated asset and attribute discovery process described above. Dialog box 242 appears when the Matching Rules icon 244 is selected in the navigation pane 246. Box 248 contains text string "Peoplesoft FA Q204" which indicates that the operator wishes to define an automatic matching rule for this fixed asset so as to find a corresponding asset in the inventory discovered by the automated asset discovery process. Boxes 250 and 252 indicates by the entry "serial number in box 252 that the operator wishes to declare a match if the entry in the serial # column 234 matches a serial number attributed extracted by the automated asset discovery process. Likewise, boxes 254 and 256 indicate the operator wishes to declare a match if an asset number in the Asset # column of the fixed asset list (not shown) matches an entry in an Asset Tag attribute field of an inventory asset. The Asset Tag number is either automatically extracted by the discovery process or is manually entered by an operator after physical inspection of an asset which has an asset tag on it.

Once the automatic reconciliation rules are defined, the rules are applied to the collection of data regarding fixed assets and the inventory assets each with all their attribute data. The automatic matching rules may not look any further than serial numbers or asset numbers.

FIG. 24 is a screen shot showing the results of application of the automatic matching rules to the fixed assets imported from the financial system and the assets found in inventory on the networks. FIG. 24 shows a screen with three tabs 258, 260 and 262 across the top. The first tab "Reconciled" 258 is selected which causes the computer programmed to operate in accordance with the invention to display the list of fixed assets which have been matched using the automatic matching rules with assets in inventory. For each match, a data entry is made in some kind of data structure such as a table which links the fixed asset description in the financial reporting system to the matching inventory asset found by the automated discovery process.

Figure 25:
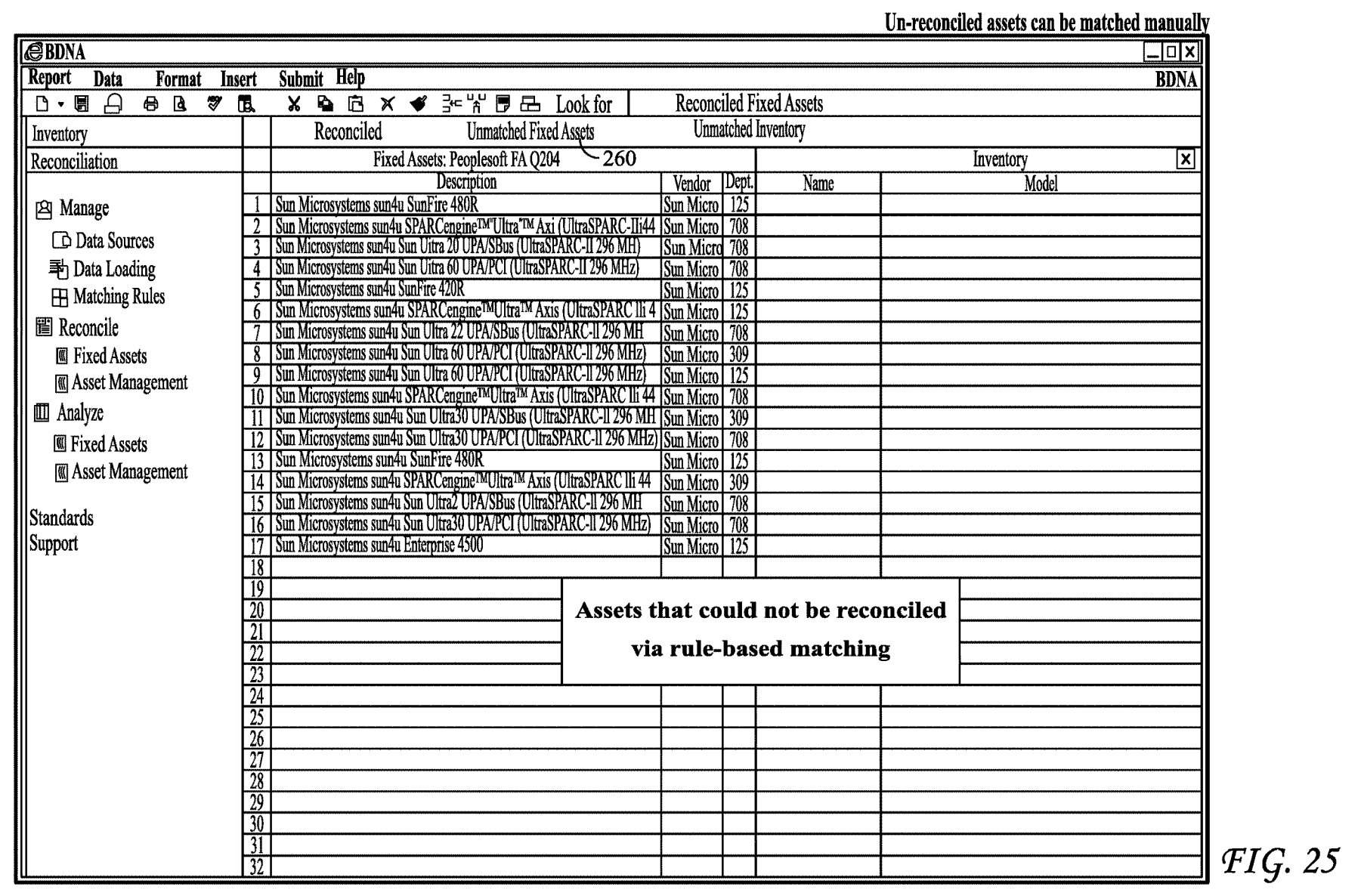

FIG. 25 is a screen shot of a screen of unmatched fixed assets imported from the financial systems for which the automatic matching rules did not find a match among the assets in inventory discovered in the network by the automatic discovery process. This screen is displayed when the "Unmatched Fixed Assets" tab 260 is selected. These assets carried on the financial reporting system will have to be matched manually.

Figure 26:
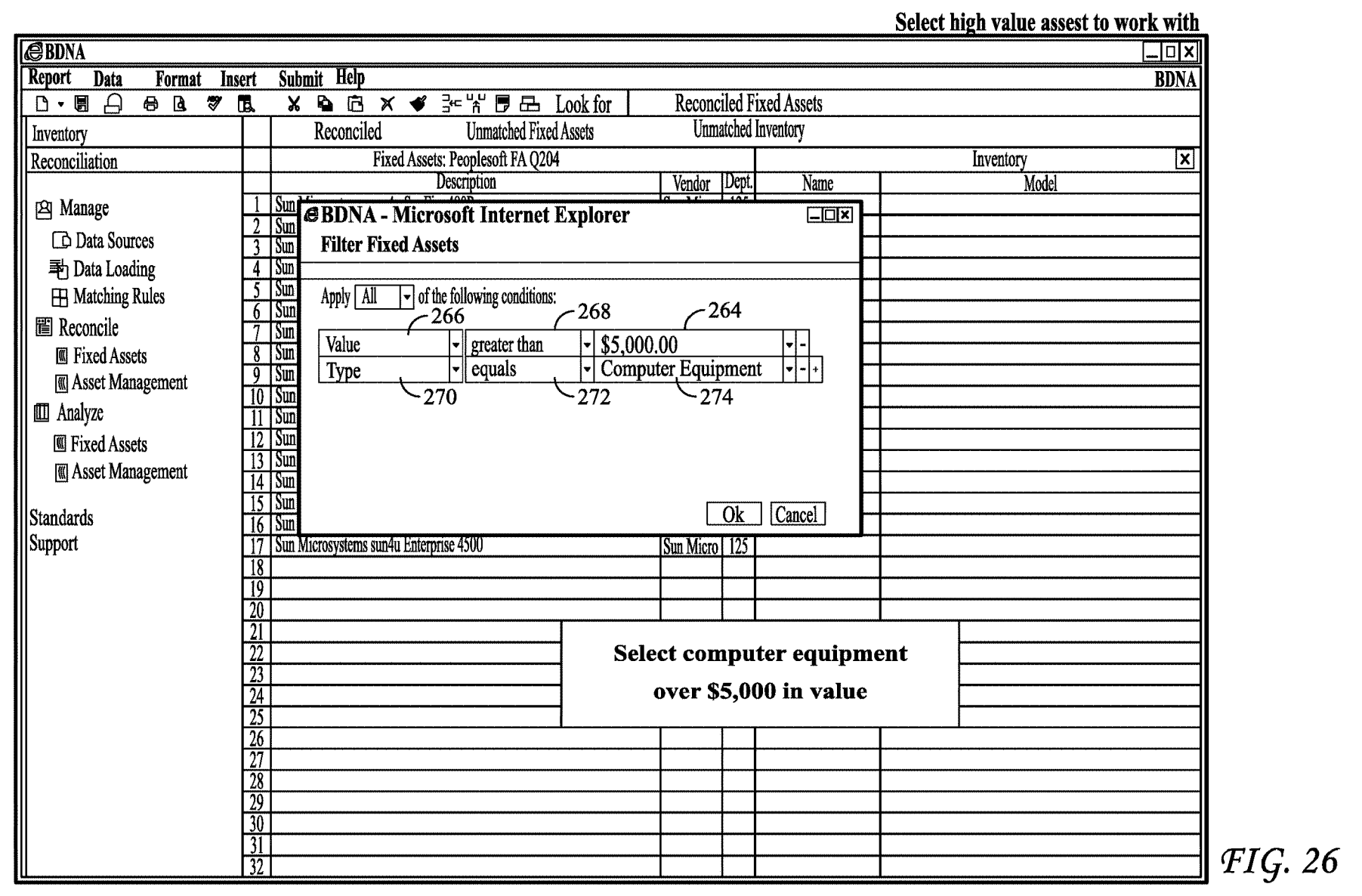

FIG. 26 is a screen shot of a screen wherein filter conditions are set to limit the number of unmatched fixed assets will be examined manually to attempt to find a match in inventory. Sometimes it is not practical to find a match for every unmatched fixed asset, so it is desirable to establish filter conditions to select only the high value assets to do further investigation to find matches for. Financial reporting is not required to be exact, but there is a need for some degree of accuracy at least to comply with the law. The dialog box shown at 264 is used to establish the filter condition. In this particular case, the filter condition is established by setting a value (field 266) to be "greater than" (field 268) $5000 (field 264) and the type of asset (field 270) must equal (field 272) computer equipment (field 274).

FIG. 27 is a screen shot of a screen used in the manual matching process showing fixed assets meeting the filter condition set in the screen of FIG. 26 and showing the unmatched assets in inventory from which a match may or may not be found. In this particular case, there are several Sunfire 480 servers in inventory which may be selected as the actual inventory asset which corresponds to the Sunfire 480 server from the financial asset reporting system shown at line 276 on the left side of the display. It is not necessary to get the exact match for purposes of auditing the corporation, so any of the Sunfire 480 servers of the three shown circled on the right side of the display can be selected as matching the Sunfire server at 276. Suppose the server at 278 is chosen as the matching server from inventory that matches the server shown at 276.

Once one of the Sunfire 480 servers on the right side of the display is selected as matching the Sunfire 480 server shown at line 276, linkage data is written which forever records the matching relationship. Therefore, a linking data structure will be created between the Sunfire server at 276 from the financial reporting system and the Sunfire server shown at 278 in the group of inventory assets circled on the right side of the display. This linkage can take any form such as a table which lists the server shown at line 276 in one column of one line of the table and the unique identification code for the server in inventory shown at 278 in a different column on the same line of the table. Likewise, the linking data can take the form of a pointer to the record in the inventory data for the Sunfire server shown at 278 this pointer being appended to the record of the server shown at 276 in the financial asset data.

Figure 28:
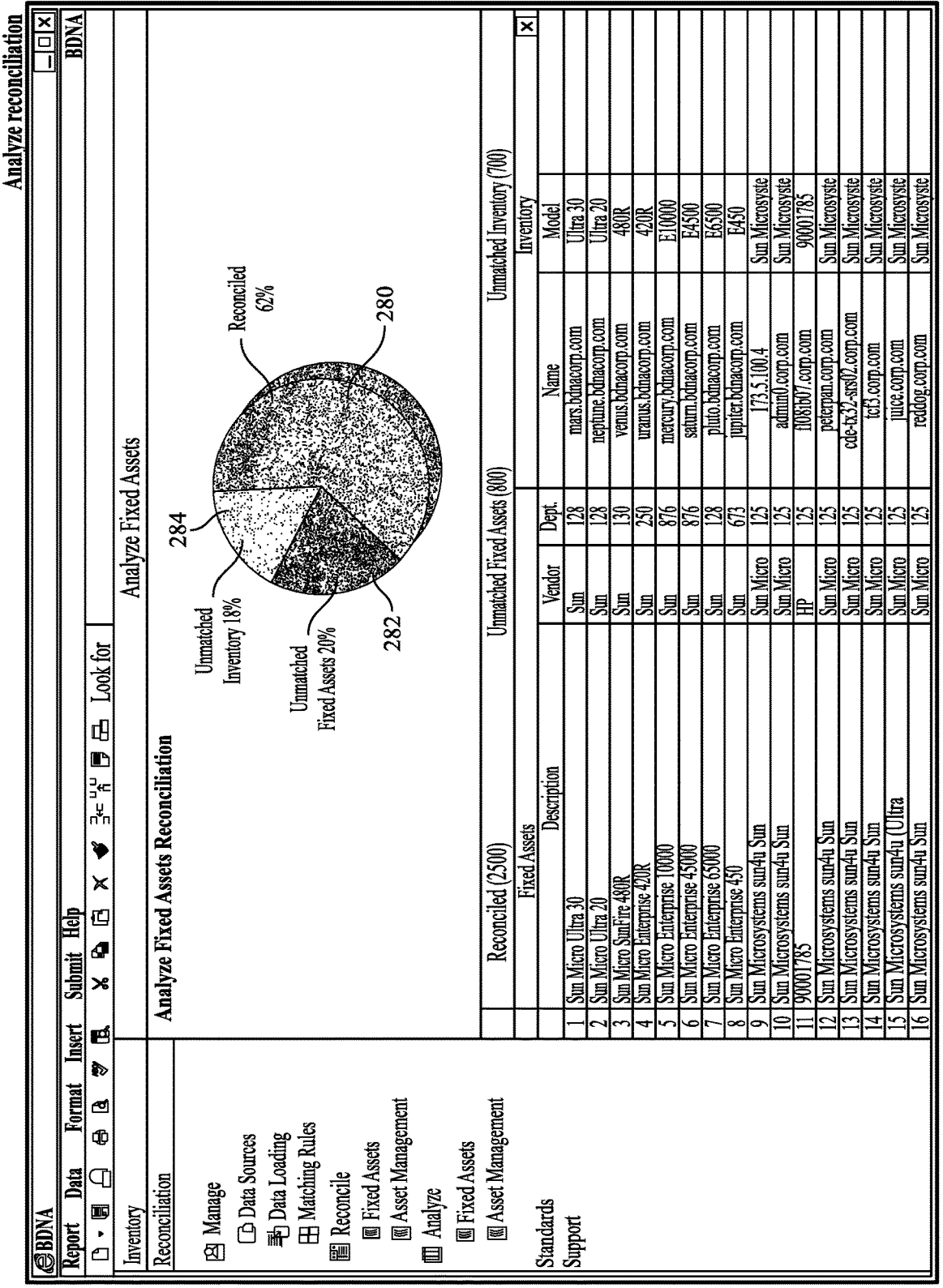
FIG. 28 is a report screen shot showing the results of applying the matching rules and doing the manual reconciliation showing the number of reconciled assets, the number of unmatched fixed assets, and the number of unmatched inventory assets.

FIG. 28 is a report screen shot showing the results of applying the matching rules and doing the manual reconciliation showing the percentage of reconciled assets (280), the number of unmatched fixed assets (282), and the number of unmatched inventory assets (284). The table shown at the bottom of the screen lists the financial reporting system assets on the left and the matching asset from inventory on the right side of the screen.

Summary of Unique ID Generation Process

The present unique ID generation system in specific embodiments is involved with and enables methods and/or systems for identifying individual information appliances or devices in an institutional environment using a communication system. In particular embodiments, the unique ID generation system is involved with and enables methods and/or systems for representing and/or managing and/or querying data in an information system that allows a data entity (herein, at times, referred to as a "signature" for an individual system or at other times referred to as a "element" or "inventory asset") to be developed for a system and further uses that data entity in other management and/or inventory functions.

According to specific embodiments of the unique ID generation system, a data entity used as a signature can be understood as having two important properties: 1) uniqueness (or variance), e.g., the data elements or signatures of two distinct resources cannot generate a match. In other words, there should be sufficient variance between the data that makes up the signatures over all resources that will be analyzed and 2) persistence or stability, e.g., data elements or signatures extracted from the same information appliance at different times or different circumstances will match, even if the element or inventory asset is upgraded or altered somewhat over time.

In selecting data to use as a signature, it is also desirable that different components of the signature data element have "independence," where independence means that the components of the data entity (or signature) should contain un-correlated information. In other words, the data entity should not have any internal redundancy. For example, a signature that consists of the hard-drive id and the network card id meets the independence requirement reasonably well, because the two ids are usually not correlated: an upgrade to a hard-drive does not necessarily imply a different network card. However, CPU speed and CPU id, for example, are not independent, because upgrading the CPU will most likely change the CPU id and the speed.

In further embodiments, the unique ID generation system is involved with and enables methods and/or systems for identifying an information system when one or more components are added and/or swapped from that system.

Thus various methods for data representation, data handling, data querying, data creating, and data reporting can be employed in specific embodiments. The unique ID generation system can also be embodied as a computer system and/or program able to provide one or more data handling functions as described herein and/or can optionally be integrated with other components for capturing and/or preparing and/or displaying data such as bar code scanning systems, wireless inventory and/or tracking systems, network management systems, etc.

Various embodiments of the present unique ID generation system provide methods and/or systems that can be implemented on a general purpose or special purpose information handling system using a suitable programming language such as Java, C++, Cobol, C, Pascal, Fortran, PL1, LISP, assembly, SQL, etc., and any suitable data or formatting specifications, such as HTML, XML, dHTML, tab-delimited text, binary, etc. In the interest of clarity, not all features of an actual implementation are described in this specification. It will be understood that in the development of any such actual implementation (as in any software development project), numerous implementation-specific decisions must be made to achieve the developers' specific goals and sub goals, such as compliance with system-related and/or business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

The unique ID generation system and various specific aspects and embodiments will be better understood with reference to the following drawings and detailed descriptions. For purposes of clarity, this discussion refers to devices, methods, and concepts in terms of specific examples. However, the unique ID generation system and aspects thereof may have applications to a variety of types of devices and systems.

Furthermore, it is well known in the art that logic systems and methods such as described herein can include a variety of different components and different functions in a modular fashion. Different embodiments of the unique ID generation system can include different mixtures of elements and functions and may group various functions as parts of various elements. For purposes of clarity, the unique ID generation system is described in terms of systems that include many different innovative components and innovative combinations of innovative components and known components. No inference should be taken to limit the unique ID generation system to combinations containing all of the innovative components listed in any illustrative embodiment in this specification.

Details of Unique ID Generation Process

An example inventory system discussed in that application used a communication media, such as an email system and/or computer network, to automatically gather information about assets of an organization and perform various management and inventory functions regarding those assets.

Example systems discussed therein used a data repository structure having elements and attributes, as well as fingerprint modules, collection rules, and other components, to automate much of the data collection of assets within the system.

The present unique ID generation system is related to systems and/or methods that allow a computerized inventory system to identify individual resources (such as computer systems, networks, other information enabled devices, etc.) in a automatic inventory discovery system and keep track of or maintain the identity of those individual items as various characteristics of the assets change over time.

In specific embodiments, the unique ID generation system can be understood as involving deployment of one or more matching rules in a computerized inventory system. Matching rules provide a powerful way to relate characteristics of external resources to data elements and attributes or signatures stored in an inventory information repository. Matching rules can be simple in some embodiments and/or in some situations, but may be complex and nested according to specific embodiments and as various situations and/or applications require.

In alternative embodiments, the unique ID generation system can be understood as involving development of signatures for external resources and storing those signatures in a data store. Signatures, according to specific embodiments of the unique ID generation system, are multiple part and capable of partially matching to external elements and furthermore capable of being updated to represent newly available external data or modified external characteristics.

For ease of understanding this discussion, the following discussion of terms is provided to further describe terms used herein. These descriptions should not be taken as limiting.

A data element or element for purposes of this description can be understood as a data object within an inventory data repository. In some situations, an element can be generally understood to represent an external asset. One or more attributes having assignable values can be associated with a data element. An element once created or instantiated or added to a data repository system generally persists in the system until it is explicitly removed or possibly joined to another element. An element generally has a unique element_id within the data repository system, and this element_id is independent of any external asset to which the element relates. An element can have various relationships to other elements, for example as parent, child, sibling.

As an example, an individual computer system might have an element structure as follows:

| Attribute Name | Attribute Value |
| --- | --- |
| Element Name: | ComputerA |
| IP ADDR_3: | 30.3.3.3 |
| NIC_MAC ADDR: | 00:E0:83:24:B7:3C |
| HDserialnumber: | SK434xzh |
| OS_serial_number: | 83084dd3 |

A signature as used for purposes of this description can be understood as a data entity (such as a data element as just described) and/or data method for uniquely and repeatably identifying a particular asset (such as a single computer server system) even after some modification of the asset or change of circumstances. According to specific embodiments of the unique ID generation system, particular types of data elements can be used as signatures. In other embodiments, signatures can be implemented in other ways, such as using hashing functions or combined values, etc.

Attributes and their attribute values are important subparts of data elements. The particular attributes defined for a data element may be determined by a detected nature of that data element, such as the operating system and may change over time as different types of information are collected or become available for a particular external resource.

Operation Examples

Figure 29:
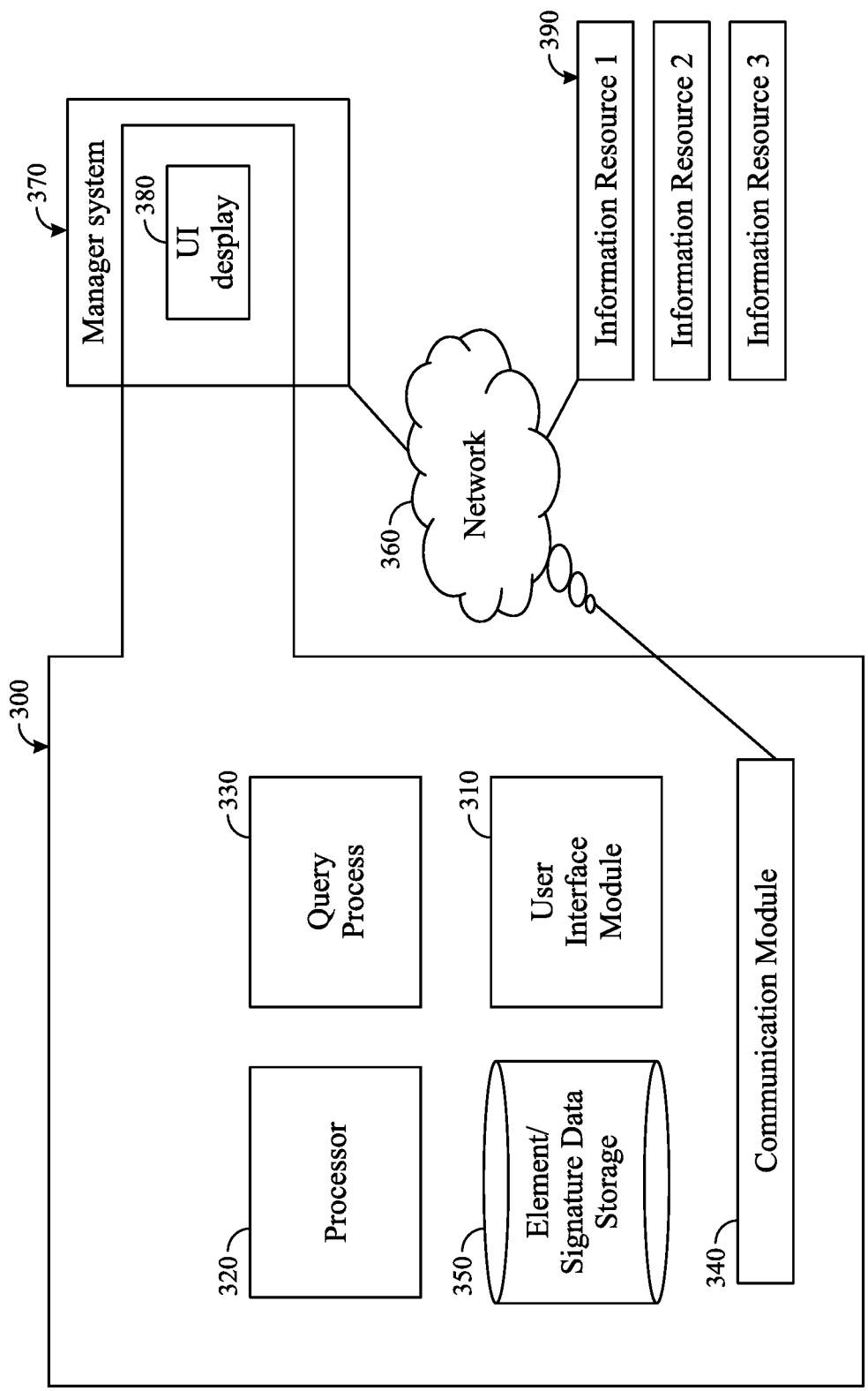
FIG. 29 illustrates a block diagram of a preferred embodiment of the current unique ID generation system in a network environment.

FIG. 29 illustrates a block diagram of a preferred embodiment of the current unique ID generation system in a network environment. According to specific embodiments of the unique ID generation system, the unique ID generation system resides in an information processing logic execution environment, such as system 300, having processor 320, scan/query process 330, a data storage 350, a user interface module 330, communications module 340, and optionally a management console 380. In such an environment, scan/query process 330 is able to scan or probe for possible resources 390 over a network 360. This configuration represents just one possible simple logic execution and network environment, and many others are suitable, as will be understood to those of skill in the art.

According to specific embodiments of the unique ID generation system, the unique ID generation system involves using a network inventory system with one or more matching rules. Matching rules allow a collected data set to be compared against one or more stored data elements in order repeatably to detect a particular external resource. The following straightforward example illustrates how matching rules according to specific embodiments of the unique ID generation system eliminates double counting of machines.

Example #1 Comparing Scan Results to Stored Data

In a first example, consider a situation of a local area network for which it is desired to build a data representation of all available devices using an automatic detection and/or inventory system. According to specific embodiments of the unique ID generation system, an inventory system includes a data repository with an interface (for example, a data repository such as described in patent application Ser. No. 10/429,270 filed 2 May 2003), an ability to scan the network to detect responding addresses and make certain queries of devices found at those addresses, and one or more matching rules. In this example, a simple matching rule is that a detected external resource matches a stored element if at least two out of the following three conditions are met:

a. the MAC address of the primary network card detected for the resource is identical to a corresponding attribute value for the stored element;
b. the serial number of the main disk drive detected for the resource is identical to a corresponding attribute value for the stored element;
c. the serial number reported by the operating system of the resource is identical to a corresponding attribute value for the stored element.

In this particular example, this matching rule can be considered to allow for a partial match. In specific embodiments, a system according to the unique ID generation system may keep track of whether a matching rule results in a partial match or a complete match. In other embodiments, a matching rule may just detect and flag a match and not keep track of whether it is partial or complete.

Matching rules according to specific embodiments of the unique ID generation system can be simple or complex and development of various matching rules is within the skill of practitioners in the art. In some embodiments, matching rules can include different weights given to different components, so that a match is always found if two highly weighted attributes match, for example, but is not found if only two lesser weighted attributes match.

In further embodiments, matching rules and associated rules can perform additional processing when it is determined that an attribute of a signature data element has changed. For example, if a network card with a particular address that was previously identified in a particular server is not detected on a future scan, a system according to the unique ID generation system can search current scan records to determine if that network card has been moved to or identified with another server. This can be used by the unique ID generation system as an indication that there could be two servers with nearly the same signature that could be getting confused, or possibly one server that is being counted twice, and would therefore require further investigation. If the network card is seen to disappear on a given asset and is replaced by a new card and does not show up anywhere else in the infrastructure, at some point after one or more scans the unique ID generation system may determine that it has been replaced and delete it from the data representation of the assets.

With a logical matching routine present, an inventory system according to specific embodiments scans or otherwise determines the active addresses in the particular network or domain of interest. Various methods and/or techniques for scanning, for example, all active network addresses are known in the art and may be used according to specific embodiments of the unique ID generation system. In this case, for example, scan results might detect active addresses 10.1.1.1 and 10.1.13.25 and further queries would determine the information as indicated in Table 1.

TABLE 1

SCAN RESULTS

| IPADDRESS | 10.1.1.1 | 10.5.13.25 |
|---|---|---|
| network card MAC address | 00:E0:81:24:B7:1C | 00:80:AB:29:C3:78 |
| disk driver serial number | SK434xzh | MD40009234 |
| OS serial number | 83084dd3 | f974df56 |

TABLE 2

KNOWN DEVICES

| IPADDRESS | 10.1.1.1: |
|---|---|
| network card MAC address | 00:E0:81:24:B7:1C |
| disk driver serial number | SK434xzh |
| OS serial number | 83084dd3 |

With this information, an inventory system according to specific embodiments of the unique ID generation system then compares each responding network address with every "known" device (e.g., a known device system in specific embodiments can be defined as every device for which an element is created and stored and retrievable from a data repository, for example as shown in Table 2) and uses the example matching rule provided above. In this case, the comparison might proceed as follows:

(1) Compare IP address value "10.1.1.1" against known devices (in this simple example, one at this point). In this case, using the matching rule above, indicates that 10.1.1.1 matches the existing element and the matching process proceeds to the next scanned device.

(2) Compare 10.5.13.25 against all known device elements using the matching rule. Since there is no match, the unique ID generation system creates a new device data element and set the data element's attribute values to the information learned from the scan (e.g., the MAC address and serial numbers) to those collected from address 10.5.23.25.

(3) Compare IP address value "10.1.1.1" against known devices (in this simple example, one at this point). In this case, using the matching rule above, indicates that 10.1.1.1 matches the existing element and the matching process proceeds to the next scanned device.

Example #2. Identifying a Device that has Changed Over Time

In a further example, consider network scan data on a particular date (e.g., January 1 of the year) with the following response:
from IP address 10.1.1.1:
network card MAC address="00:E0:81:24:B7:1C"
disk driver serial number="SK434xzh"
OS serial number="83084dd3"

If there are other device elements stored, the unique ID generation system then examines them using a matching rule such as the example described and if there is no match (for example because this is the first device), the unique ID generation system creates a new device element and sets the device element's attribute values (i.e., the MAC address and serial numbers) to those from 10.1.1.1.

On January 5, the network card of 10.1.1.1 is replaced with a faster network card. The new network card has the MAC address "00:E0:81:24:FF:EE". On January 10, a network scan using the data repository built from the January 1 proceeds as follows:

(1) if necessary, load device identification method(s) (e.g., fingerprints described in related patent applications)

(2) detect a live IP address at 10.1.1.1

(3) determine that IP address 10.1.1.1 runs HP-UX (for example using a fingerprint system as described in above referenced patent applications)

(4) attempt to collect attribute information from each system, such as network card MAC address, disk drive serial number, and operating system serial number.

For example, from 10.1.1.1:
network card MAC address="00:E0:81:24:FF:EE" (different from previous scan)
disk driver serial number="SK434xzh" OS serial number="83084dd3"

(5) Examine known device data elements and determine if currently collected data matches an existing device data using the example matching rule described above;

(6) Compare 10.1.1.1 against the data element/signature created from the January 1 scan. With an appropriate matching rule, match on two out of the three attributes (disk drive serial number and OS serial number) and thus conclude that the newly collected data is from the same external device.

(7) Update the stored attributes with the latest values collected from 10.1.1.1. the device's network card MAC address attribute is set to "00:E0:81:24:FF:EE".

As a further example, on January 15, the hard drive on 10.1.1.1 is replaced or updated, causing a new hard driver serial number "GX152248". On January 20, another network scan collects attribute data from 10.1.1.1 and a matching rule determines that the element should again be updated.

Using Elements as Signatures

In further embodiments, the unique ID generation system can be understood as a mechanism for using data elements records, with their associated attributes, as signatures to identify particular devices. As with the description above, matching rules as those described can be used to determine with signatures that include some variation in fact match the same device or are related to different devices.

Thus, according to specific embodiments, the present unique ID generation system can also be understood as involving a method that can be executed on a computer system. Methods according to the unique ID generation system can be characterized in terms of data elements and/or signature analysis.

As a further example, a number of other values can be used as signature data sets according to specific embodiments of the unique ID generation system. For example, in networked environments, it might be the case that one or more types of network requests typically generates a response packet having particular values. In such cases, the response packets can either be stored as signature data or can be combined or hashed into more standardized values. In such a case, a signature can be developed and stored as either a group or a sequence of numerical data. For example, a signature might be composed of ten order four-byte numbers, one representing an IP address for a system, one representing a hash value derived from an operating system serial number of a system, one representing a reported hard disk serial number, etc. In this case, as with above, partial matches may be allowed on some subset of the signature data, and the stored signature updated with new data. This type of updateable hashed value signature may be used instead of or in conjunction with a multipart data element as described above in specific embodiments. Thus, as an example, the attribute data shown in the table below can be transformed and stored into a signature data value as follows.

| | |
|---|---|
| IPADDRESS 10.1.1.1 | SD1: 10.1.1.1 |
| network card MAC address 00:E0:81:24:137:1C | SD2: 0.224.129.36 |
| SD3: 183.28.0.0 | |
| disk driver serial number SK434xzh | SD4: 198.234.17.65 |
| OS serial number 83084dd3 | SD5: 139.44.68.15 |

In this example, various data collected from a resource has been converted into five, 32 bit signature date words. This conversion can be by a variety of means, including various conversion and/or hash functions, as will be understood in the art.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:
1. An asset reconciliation computer system comprising:
   a data storage medium; and
   a central processing unit, wherein the central processing unit executes instructions stored in the data storage medium to:
      receive hard asset data from a computing system,
      import hard asset data from the computing system to an asset recording system,
      receive inventory asset data regarding inventory assets discovered on one or more networks, wherein the received inventory asset data includes attributes of the inventory assets,
      receive one or more reconciliation rules as user input, wherein the received reconciliation rule user inputs define one or more of reconciliation rules that reconcile the inventory assets discovered on the one or more networks with the hard assets imported to the asset recording system,
      match, via use of one or more reconciliation rules, the hard assets with the inventory assets,
      create linking data when a match is found, wherein the created linking data links each hard asset and inventory asset such that when discovery of the inventory assets on the one or more networks is performed again, the hard asset will be matched with the inventory asset again using the linking data,
      display data regarding the hard assets and the inventory assets for which no match was found using the one or more reconciliation rules,
      receive user input identifying hard assets that match particular inventory assets,
      establish a manual match between an identified hard asset and a particular inventory asset based on the received user input,
      create linking data which links each identified hard asset to each particular inventory asset for which a manual match was found for use in subsequent reconciliation processes, and
      perform an inventory discovery process, wherein inventory assets comprise machines accessible via the networks, and wherein the inventory discovery process comprises:
         accessing machines responsive to network requests provided via the networks,
         extracting attribute data regarding the attributes of each machine based on one or more fingerprints, and
         generating identifying information associated with the machines based on the extracted attribute data.
2. The system of claim 1, wherein the inventory asset discovery process is used to develop data regarding the existence and attributes of the inventory assets.
3. The system of claim 2, wherein the inventory asset discovery process is performed by:
   discovering the networks which are present which have inventory assets;
   loading the Internet Protocol (IP) address range of the networks into the asset reconciliation system;
   providing network requests via pinging every IP address on the networks;
   examining the responses to the pings, wherein the examination identifies which IP addresses are responsive and are coupled to inventory assets;
   identifying which kind of machine and operating system is present at each responsive IP address;
   obtaining a login ID and password for each machine controlled by an operating system which requires a login ID and password;

accessing the machines using respective appropriate login IDs and passwords ID and password in order to execute one or more scripts from a fingerprint to extract attribute data regarding the attributes of the machines; and using the extracted attribute data in order to generate the identifying information for the machines, the identifying information comprising unique identification codes.

4. The system of claim 3 further comprising generating a table that includes entries containing information about each IP address.

5. The system of claim 4, wherein the table also includes entries containing information about corresponding operating system and attributes.

6. The system of claim 4, wherein the table also includes entries containing information about timestamps, the time stamps associated with the entries used to illustrate how attributes can change over time.

7. The system of claim 3, wherein identifying the operating system present at each responsive IP address includes:
attempting to invoke function calls of a programmatic interface, a service, utility, or program specific to the operating system, and
verifying the operating system present at each responsive IP address based on the received response to the invoked function call.

8. The system of claim 7, wherein an unrecognized response to an attempted function call specific to an operating system indicates that the responsive IP address does not have that specific operating system.

9. The system of claim 3, wherein identifying the machine at each responsive IP address includes:
using different fingerprints, collection instructions, scripts, or communication protocols, and
monitoring responses from the fingerprints, instructions, scripts and, protocols used at each IP address.

10. The system of claim 9, wherein the fingerprints are weighted differently based on trustworthiness.

11. The system of claim 9, wherein the collection instructions are weighted differently based on trustworthiness.

12. The system of claim 9, wherein the scripts are weighted differently based on trustworthiness.

13. The system of claim 9, wherein the protocols are weighted differently based on trustworthiness.

14. The system of claim 9, wherein conclusions about each IP address is based on responses obtained from the fingerprints, instructions, scripts, or protocols used in connection with the IP addresses.

15. The system of claim 3, wherein obtaining a login ID and password includes having a new login ID and password generated for each machine.

16. The system of claim 3, wherein the extracted attribute data regarding attributes of each machine include information about processing capabilities about the machine.

17. The system of claim 16, wherein the extracted attribute data regarding attributes of each machine also include information about the operating system version of the machine.

18. The system of claim 16, wherein the extracted attribute data regarding attributes of each machine also include information about the memory and its size of the machine.

19. The system of claim 16, wherein the extracted attribute data regarding attributes of each machine also include information about the manufacturer of the machine.

20. The system of claim 16, wherein the extracted attribute data regarding attributes of each machine also include information about what applications are present on the machine.

21. The system of claim 3, wherein identifying which kind of machine is present at each responsive IP address further includes:
listing unrecognized machines on a list, wherein unrecognized machines do not return recognizable attribute data
mining attribute data for each of the unrecognized machine on the list, and
generating new fingerprints for each unrecognized machine based on the mined attribute data, the generated new fingerprints stored for future use in recognizing the previously unrecognized machines.

22. A method for asset reconciliation, the method comprising:
receiving hard asset data from a computing system;
importing hard asset data from the computing system to an asset recording system;
receiving inventory asset data regarding inventory assets discovered on one or more networks, wherein the received inventory asset data includes attributes of the inventory assets;
receiving one or more reconciliation rules as user input, wherein the received reconciliation rule user inputs define one or more of reconciliation rules that reconcile the inventory assets discovered on the one or more networks with the hard assets imported to the asset recording system;
matching, via use of one or more reconciliation rules, the hard assets with the inventory assets;
creating linking data when a match is found, wherein the created linking data links each hard asset and inventory asset such that when discovery of the inventory assets on the one or more networks is performed again, the hard asset will be matched with the inventory asset again using the linking data;
displaying data regarding the hard assets and the inventory assets for which no match was found using the one or more reconciliation rules;
receiving user input identifying hard assets that match particular inventory assets;
establishing a manual match between an identified hard asset and a particular inventory asset based on the received user input;
creating linking data which links each identified hard asset to each particular inventory asset for which a manual match was found for use in subsequent reconciliation processes; and
performing an inventory discovery process, wherein inventory assets comprise machines accessible via the networks, and wherein the inventory discovery process comprises:
accessing machines responsive to network requests provided via the networks,
extracting attribute data regarding the attributes of each machine based on one or more fingerprints, and
generating identifying information associated with the machines based on the extracted attribute data.

23. A non-transitory computer-readable storage medium having embodied thereon a program, the program being executable by a processor to perform a method of asset reconciliation comprising:
receiving hard asset data from a computing system;

importing hard asset data from the computing system to an asset recording system;

receiving inventory asset data regarding inventory assets discovered on one or more networks, wherein the received inventory asset data includes attributes of the inventory assets;

receiving one or more reconciliation rules as user input, wherein the received reconciliation rule user inputs define one or more of reconciliation rules that reconcile the inventory assets discovered on the one or more networks with the hard assets imported to the asset recording system;

matching, via use of one or more reconciliation rules, the hard assets with the inventory assets;

creating linking data when a match is found, wherein the created linking data links each hard asset and inventory asset such that when discovery of the inventory assets on the one or more networks is performed again, the hard asset will be matched with the inventory asset again using the linking data;

displaying data regarding the hard assets and the inventory assets for which no match was found using the one or more reconciliation rules;

receiving user input identifying hard assets that match particular inventory assets;

establishing a manual match between an identified hard asset and a particular inventory asset based on the received user input;

creating linking data which links each identified hard asset to each particular inventory asset for which a manual match was found for use in subsequent reconciliation processes; and performing an inventory discovery process, wherein inventory assets comprise machines accessible via the networks, and wherein the inventory discovery process comprises:

accessing machines responsive to network requests provided via the networks, extracting attribute data regarding the attributes of each machine based on one or more fingerprints, and generating identifying information associated with the machines based on the extracted attribute data.

* * * * *